US012787107B2

(12) United States Patent
Jang et al.

(10) Patent No.: US 12,787,107 B2
(45) Date of Patent: Nov. 3, 2026

(54) APPARATUS AND METHOD FOR PROVIDING CHANNEL STATE INFORMATION IN WIRELESS COMMUNICATION SYSTEM

(71) Applicant: Samsung Electronics Co., Ltd., Gyeonggi-do (KR)

(72) Inventors: Youngrok Jang, Gyeonggi-do (KR); Jinhyun Park, Gyeonggi-do (KR); Taehyoung Kim, Gyeonggi-do (KR); Hoondong Noh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 711 days.

(21) Appl. No.: 17/917,449

(22) PCT Filed: Apr. 9, 2021

(86) PCT No.: PCT/KR2021/004519

§ 371 (c)(1),
(2) Date: Oct. 6, 2022

(87) PCT Pub. No.: WO2021/206512

PCT Pub. Date: Oct. 14, 2021

(65) Prior Publication Data

US 2023/0300940 A1 Sep. 21, 2023

(30) Foreign Application Priority Data

Apr. 9, 2020 (KR) ........................ 10-2020-0043656
Apr. 10, 2020 (KR) ........................ 10-2020-0044298

(51) Int. Cl.
*H04W 76/28* (2018.01)
*H04W 24/10* (2009.01)

(52) U.S. Cl.
CPC ........... *H04W 76/28* (2018.02); *H04W 24/10* (2013.01)

(58) Field of Classification Search
CPC ..... H04W 76/15; H04W 76/28; H04W 24/10; H04W 52/0209–0232; H04W 24/08
See application file for complete search history.

(56) References Cited

U.S. PATENT DOCUMENTS

2020/0045768 A1* 2/2020 He ........................ H04W 76/28
2020/0092814 A1* 3/2020 Zhou ................. H04W 52/0235
(Continued)

FOREIGN PATENT DOCUMENTS

KR 1020210012304 2/2021
WO WO 2019/242862 12/2019

OTHER PUBLICATIONS

OPPO, "Further Considerations on Secondary DRX Group", R2-2000407, 3GPP TSG-RAN WG2 Meeting #109 Electronic, Feb. 24-Mar. 6, 2020, 6 pages.
(Continued)

*Primary Examiner* — Brendan Y Higa
(74) *Attorney, Agent, or Firm* — The Farrell Law Firm, P.C.

(57) ABSTRACT

The present disclosure relates to a method and apparatus for providing channel state information in a wireless communication system. A user equipment according to an embodiment of the present disclosure may receive configuration information for a plurality of discontinuous reception (DRX) groups corresponding to a plurality of cell groups including cells included in one cell group, may identify, based on the received configuration information, whether at least one of measurement and reporting of channel state information for the plurality of cell groups is included in a DRX activation periodicity, and may perform the measurement and the reporting of the channel state information, based on a result of the identifying.

10 Claims, 20 Drawing Sheets

(56) References Cited

U.S. PATENT DOCUMENTS

| | | | | |
|---|---|---|---|---|
| 2021/0306044 | A1* | 9/2021 | Nam | H04W 52/0229 |
| 2022/0256458 | A1 | 8/2022 | Noh et al. | |
| 2022/0408511 | A1* | 12/2022 | Dong | H04W 76/28 |

OTHER PUBLICATIONS

Ericsson et al., "Introduction of Secondary DRX Group", R2-2000345, 3GPP TSG-RAN2 Meeting #109-e, Feb. 14, 2020, 5 pages.
Ericsson, "On Secondary DRX Group", R1-2001084, 3GPP TSG-RAN WG1 Meeting #100-e, Feb. 24-Mar. 6, 2020, 4 pages.
Apple Inc., "Views on Two DRX Groups in the same Cell Group", RP-200324, 3GPP TSG RAN Meeting #87e, Electronic Meeting, Mar. 16-19, 2020, 5 pages.
International Search Report dated Jul. 19, 2021 issued in counterpart application No. PCT/KR2021/004519, 16 pages.
Korean Office Action dated Jan. 23, 2026 issued in counterpart application No. 10-2020-0044298, 8 pages.

* cited by examiner

APPARATUS AND METHOD FOR PROVIDING CHANNEL STATE INFORMATION IN WIRELESS COMMUNICATION SYSTEM

PRIORITY

This application is a National Phase Entry of PCT International Application No. PCT/KR2021/004519, which was filed on Apr. 9, 2021, and claims priority to Korean Patent Application Nos. 10-2020-0043656 and 10-2020-0044298, which were filed on Apr. 9, 2020 and Apr. 10, 2020, respectively, the entire content of each of which is incorporated herein by reference.

TECHNICAL FIELD

The present disclosure relates to a wireless communication system and to a method, performed by a terminal, of measuring and reporting channel state information between a base station and the terminal in order to achieve higher reliability and throughput.

BACKGROUND ART

To meet the explosive increase in demand with respect to wireless data traffic due to the commercialization of $4^{th}$ generation (4G) communication systems and the increase in multimedia services, improved $5^{th}$ generation (5G) communication systems or pre-5G communication systems have been developed. For this reason, 5G communication systems or pre-5G communication systems are called beyond 4G network communication systems or post long term evolution (LTE) systems.

To increase a data rate, the implementation of 5G communication systems in an ultra-high frequency band (a millimeter wave (mmWave) band) (e.g., a 60 GHz band) is under consideration. To alleviate path loss of radio waves and increase propagation distances of radio waves in a mmWave band, technologies for 5G communication systems, such as beamforming, massive multi-input multi-output (MIMO), full dimensional MIMO (FD-MIMO), array antenna, analog beamforming, and large-scale antenna system, are being discussed.

Also, in order to improve system network performance for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and received-interference cancellation, are being developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements, such as objects. An Internet of everything (IoE) technology is emerging, in which a technology related to the IoT is combined with, for example, a technology for processing big data through connection with a cloud server. In order to implement the IoT, various technical components are required, such as a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As it is possible to provide various services according to the development of wireless communication systems, there is a need for a method of seamlessly providing these services.

DESCRIPTION OF EMBODIMENTS

Technical Problem

The present disclosure provides a method of efficiently measuring and reporting channel state information when discontinuous reception (DRX) for carrier aggregation and power consumption reduction is configured for a terminal in a wireless communication system.

Solution to Problem

The present disclosure relates to a method and apparatus for providing channel state information in a wireless communication system. A user equipment according to an embodiment of the present disclosure may receive configuration information for a plurality of discontinuous reception (DRX) groups corresponding to a plurality of cell groups including cells included in one cell group, may identify, based on the received configuration information, whether at least one of measurement and reporting of channel state information for the plurality of cell groups is included in a DRX activation periodicity, and may perform the measurement and the reporting of the channel state information, based on a result of the identifying.

BEST MODE

Figure 1:
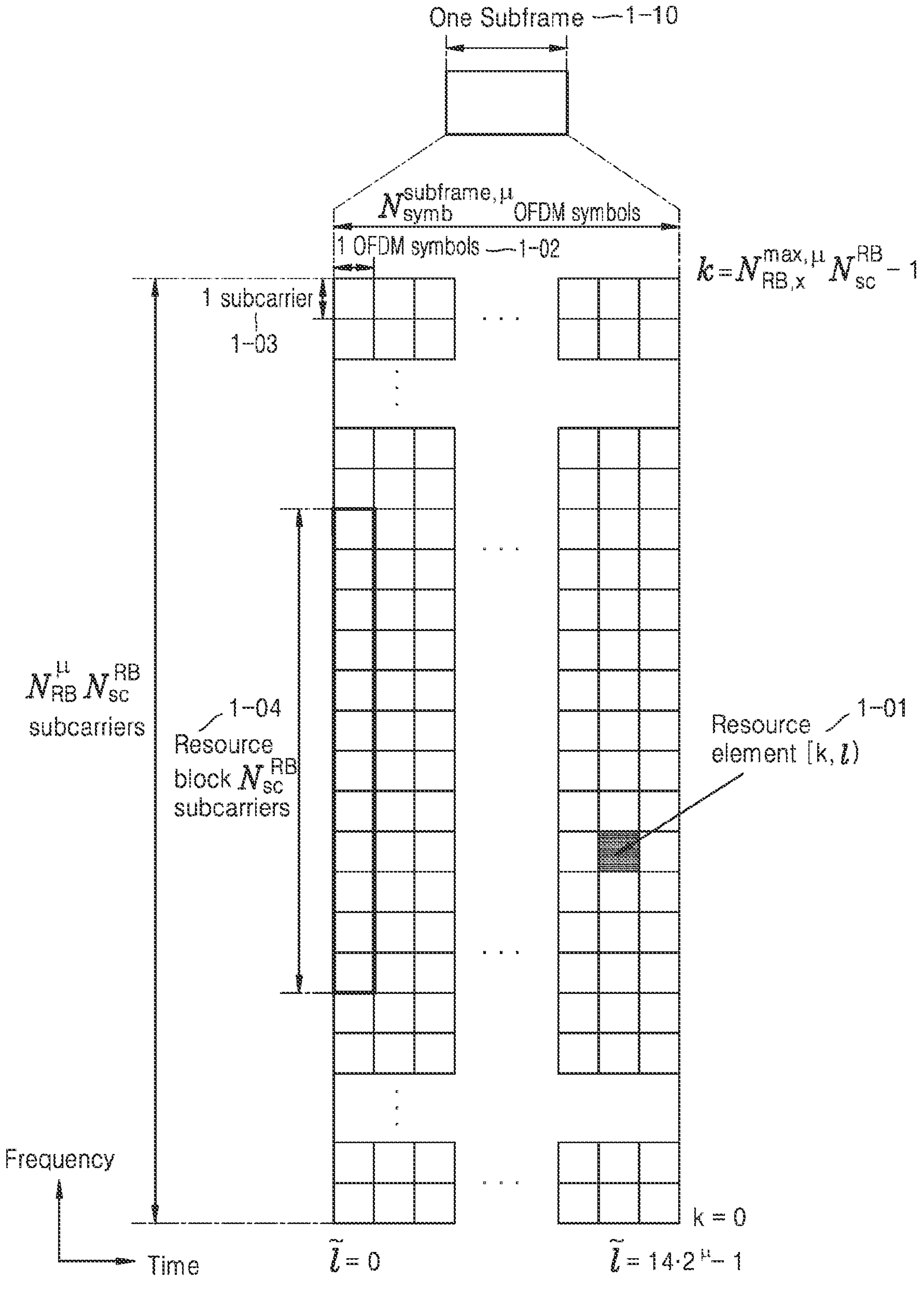
FIG. 1 is a diagram illustrating a basic structure of a time-frequency domain in a mobile communication system, according to an embodiment of the present disclosure.

A method, performed by a user equipment (UE), of providing channel state information in a wireless communication system, according to an embodiment of the present disclosure, may include: receiving configuration information for a plurality of discontinuous reception (DRX) groups corresponding to a plurality of cell groups including cells included in one cell group; identifying, based on the received configuration information, whether at least one of measurement and report of channel state information for the plurality of cell groups is included in a DRX activation periodicity; and performing the measurement and the report of the channel state information, based on a result of the identifying.

In the method, performed by the UE, of providing the channel state information in the wireless communication system, according to an embodiment of the present disclosure, the identifying may include: determining a DRX group corresponding to each of a plurality of DRX configurations, based on the configuration information; and determining a cell group corresponding to each of the identified DRX groups with respect to the plurality of cell groups.

In the method, performed by the UE, of providing the channel state information in the wireless communication system, according to an embodiment of the present disclosure, the identifying may include identifying, based on the configuration information, a first DRX group corresponding to a cell group in which the measurement of the channel state information is performed and a second DRX group corresponding to a cell group in which the report of the channel state information is performed, among the plurality of cell groups, and the performing of the measurement and the report of the channel state information may include measuring the channel state information, based on a reference signal transmitted in a most recent DRX activation periodicity of the second DRX group.

In the method, performed by the UE, of providing the channel state information in the wireless communication system, according to an embodiment of the present disclosure, the measuring of the channel state information may include measuring the channel state information, based on a reference signal transmitted in a most recent DRX activation periodicity of the first DRX group and the most recent DRX activation periodicity of the second DRX group.

In the method, performed by the UE, of providing the channel state information in the wireless communication system, according to an embodiment of the present disclosure, the identifying may include identifying, based on the configuration information, a first DRX group corresponding to a cell group in which the measurement of the channel state information is performed and a second DRX group corresponding to a cell group in which the report of the channel state information is performed, among the plurality of cell groups, and the performing of the measurement and the report of the channel state information may include, when a most recent reference signal associated with the report of the channel state information is transmitted in a DRX activation periodicity of the second DRX group, measuring the channel state information, based on the reference signal.

In the method, performed by the UE, of providing the channel state information in the wireless communication system, according to an embodiment of the present disclosure, the measuring of the channel state information may include, when the most recent reference signal is transmitted in a DRX activation periodicity of the first DRX group and the DRX activation periodicity of the second DRX group, measuring the channel state information, based on the reference signal.

In the method, performed by the UE, of providing the channel state information in the wireless communication system, according to an embodiment of the present disclosure, the identifying may include identifying, based on the configuration information, a DRX group corresponding to a cell group in which the report of the channel state information is performed among the plurality of cell groups, and the performing of the measurement and the report of the channel state information may include measuring the channel state information, based on a reference signal associated with the report of the channel state information, as at least one of the measurement and the report is included in in a DRX activation periodicity of the identified DRX group.

In the method, performed by the UE, of providing the channel state information in the wireless communication system, according to an embodiment of the present disclosure, the identifying may include, when the plurality of cell groups are configured, determining, as a same cell group, a cell group in which the measurement of the channel state information is performed and a cell group in which the report of the channel state information is performed.

The method, performed by the UE, of providing the channel state information in the wireless communication system, according to an embodiment of the present disclosure, may further include receiving information about whether to apply a power saving signal to the plurality of DRX groups through higher layer signaling received through the transceiver.

The performing may include performing the measurement and the report of the channel state information, based on whether to apply the power saving signal and a result of the identifying.

A method, performed by a base station, of providing channel state information in a wireless communication system, may include: transmitting configuration information for a plurality of discontinuous reception (DRX) groups corresponding to a plurality of cell groups including cells included in one cell group; and receiving, based on the transmitted configuration information, channel state information measured by a user equipment, wherein whether at least one of measurement and report of channel state information for the plurality of cell groups is included in a DRX activation periodicity may be identified based on the configuration information, and the measurement and the report of the channel state information may be performed based on a result of the identifying.

MODE OF DISCLOSURE

Hereinafter, embodiments of the present disclosure will be described in detail with reference to the accompanying drawings.

In describing the embodiments, descriptions of technical contents that are well known in the technical field to which the present disclosure pertains and are not directly related to the present disclosure will be omitted. By omitting unnecessary description, the present disclosure may be described more clearly without obscuring the gist of the present disclosure.

For the same reason, some elements in the accompanying drawings are exaggerated, omitted, or schematically illustrated. Also, the size of each element does not entirely reflect the actual size. The same reference numerals are assigned to the same or corresponding elements in the drawings.

Effects and features of the present disclosure, and methods of achieving them will be clarified with reference to embodiments described below in detail with reference to the drawings. In this regard, the embodiments of the present disclosure may have different forms and should not be construed as being limited to the descriptions set forth herein. Rather, these embodiments of the present disclosure are provided so that the present disclosure will be thorough and complete and will fully convey the concept of the embodiments of the present disclosure to those of ordinary skill in the art. The present disclosure is only defined by the scope of the claims. The same reference numerals denote the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "... er/or" as used herein refers to a software element or a hardware element, such as field programmable gate array (FPGA) or application specific integrated circuit (ASIC), and the "... er/or" performs certain functions. However, the term "... er/or" is not limited to software or hardware. The term "... er/or" may be configured in an addressable storage medium or may be configured to reproduce one or more processors. Therefore, according to some embodiments, the term "... er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "... ers/ors" may be combined with fewer elements and "... ers/ors," or may be separated into additional elements and "... ers/ors." Furthermore, the elements and the "... ers/ors" may be implemented to reproduce one or more central processing units (CPUs) in the device or secure multimedia card. Also, according to some embodiments, the "... er/or" may include one or more processors.

Hereinafter, an operation principle of the present disclosure will be described in detail with reference to the accompanying drawings. In describing the present disclosure, when a detailed description of the relevant known functions or configurations is determined to unnecessarily obscure the gist of the present disclosure, the detailed description thereof may be omitted. The terms as used herein are those defined by taking into account functions in the present disclosure, but the terms may vary depending on the intention of users or those of ordinary skill in the art, precedents, or the like. Therefore, the definitions should be made based on the contents throughout the specification. Hereinafter, a base station allocates resources to a terminal, and may include at least one of a gNode B, an eNode B, a Node. B, a base station (BS), a radio access unit, a base station controller, or a node on a network. Examples of a terminal may include a user equipment (UE), a mobile station (MS), a cellular phone, a smartphone, a computer, and a multimedia system capable of performing a communication function. Of course, the present disclosure is not limited to the above examples. Hereinafter, a technology for a terminal to receive broadcast information from a base station in a wireless communication system will be described. The present disclosure relates to a communication scheme that converges $5^{th}$ generation (5G) communication systems for supporting a higher data rate than beyond $4^{th}$ generation (4G) systems with Internet of things (IoT) technology, and a system therefor. The present disclosure may be applied to intelligent services (e.g., smart homes, smart buildings, smart cities, smart cars or connected cars, health care, digital education, retail, security and safety related services, etc.) based on 5G communication technologies and IoT-related technologies.

The term referring to broadcast information, the term referring to control information, the term related to a communication coverage, the term referring to a state change (e.g., events), and the term referring to network entities, the term referring to messages, the terms referring to elements of a device, etc. as used herein are exemplified for convenience of description. Therefore, the present disclosure is not limited to the terms to be described below, and other terms referring to an equivalent technical meaning may be used.

For convenience of description, the terms and names defined in the 3rd generation partnership project long term evolution (3GPP LTE) standard may be used herein. However, the present disclosure is not limited by the terms and names and may be equally applied to systems conforming to other standards.

A wireless communication system has evolved from a system providing voice-oriented services to a broadband wireless communication system providing high-speed high-quality packet data services of communication standards, such as high speed packet access (HSPA) of 3GPP, LTE or evolved universal terrestrial radio access (E-UTRA), LTE-A, LTE-Pro, high rate packet data (HRPD) of 3GPP2, ultra mobile broadband (UMB), and IEEE 802.16e.

In an LTE system as a representative example of a broadband wireless communication system, an orthogonal frequency division multiplexing (OFDM) scheme is employed in a downlink (DL), and a single carrier frequency division multiple access (SC-FDMA) scheme is employed in an uplink (UL). The UL refers to a radio link through which a terminal (UE or MS) transmits data or a control signal to a base station (eNode B or BS), and the DL refers to a radio link through which a base station transmits data or a control signal to a terminal. In the multiple access scheme as described above, data or control information of each user may be distinguished by performing allocation and operation so that time-frequency resources for carrying data or control information for each user do not overlap each other, that is, orthogonality is established.

Future communication systems after LTE, that is, 5G communication systems have to be able to freely reflect various requirements of users and service providers. Therefore, services that satisfy various requirements at the same time have to be supported. Services considered for 5G communication systems include enhanced mobile broadband (eMBB), massive machine type communication (mMTC), and ultra reliability low latency communication (URLLC).

According to some embodiments, eMBB aims to provide a data rate higher than a data rate supported by LTE, LTE-A, or LTE-Pro. For example, in 5G communication systems, eMBB has to be able to provide a peak data rate of 20 Gbps in a DL and a peak data rate of 10 Gbps in an UL in terms of a single base station. An increased user perceived data rate of a terminal has to be simultaneously provided. In order to satisfy such requirements, there is a need to improve transmission and reception technologies including more improved multi-input multi-output (MIMO) transmission technologies. Also, because a frequency bandwidth wider than 20 MHz is used in 3-6 GHz frequency bands or 6 GHz or higher frequency bands, instead of a 2 GHz bandwidth used by an existing LTE, a data rate required by 5G communication systems may be satisfied.

At the same time, mMTC is under consideration so as to support application services such as IoT in 5G communication systems. In order to efficiently provide IoT, mMTC needs to support access of a massive terminal in a cell, improve coverage of the terminal, improve battery time, and reduce costs of the terminal. Because IoT is attached to various sensors and various devices to provide a communication function, IoT has to be able to support a large number of terminals (e.g., 1,000,000 terminals/$km^2$) in a cell. Also, due to the nature of the service, the terminal supporting mMTC is likely to be located in a shaded area that is not covered by the cell, such as the basement of a building. Therefore, wider coverage than other services provided by the 5G communication systems may be required. The terminal supporting mMTC has to be configured as an inexpensive terminal, and it is difficult to frequently replace a battery of the terminal. Therefore, a very long battery life time may be required.

Finally, URLLC is a cellular-based wireless communication service used for a specific purpose (mission-critical). URLLC may be used for services used in remote control for robots or machinery, industrial automation, unmanned aerial vehicles, remote health care, emergency alerts, or the like. URLLC has to provide communications that provide ultra-low latency and ultra-high reliability. For example, a service supporting URLLC has to satisfy air interface latency of less than 0.5 milliseconds and simultaneously has a packet error rate of 10-5 or less. Therefore, for services supporting URLLC, the 5G systems have to provide a smaller transmit time interval (TTI) than other services and simultaneously require a design matter that has to allocate a wide resource in a frequency band. However, mMTC, URLLC, and eMBB are only examples of different service types, and the service types to which the present disclosure is applied are not limited to the above-described examples.

The services considered in the 5G communication systems described above have to be provided by convergence with each other based on a single framework. That is, for efficient resource management and control, it is preferable that the respective services are integrated, controlled, and transmitted by a single system rather than being operated independently.

Also, although the embodiments of the present disclosure will be described below with reference to an LTE, LTE-A, LTE Pro, or NR system as an example, the embodiments of the present disclosure may also be applied to other communication systems having a similar technical background or channel form. Also, the present disclosure may be applied to other communication systems through some modifications by those of ordinary skill in the art, without departing from the scope of the present disclosure.

The present disclosure relates to a method and apparatus for reporting channel state information in order to improve power saving efficiency of a terminal in a wireless communication system.

According to the present disclosure, when a terminal operates in a power saving mode in a wireless communication system, a channel state information reporting method is optimized accordingly, thereby further improving a power saving effect.

Hereinafter, a frame structure of a 5G system will be described in more detail with reference to the drawings.

FIG. 1 is a diagram illustrating a basic structure of a time-frequency domain in a mobile communication system, according to an embodiment of the present disclosure.

Referring to FIG. 1, the horizontal axis represents a time domain, and the vertical axis represents a frequency domain. A basic unit of a resource in the time-frequency domain is a resource element (RE) 1-01 and may be defined as one orthogonal frequency division multiplexing (OFDM) symbol 1-02 on the time domain and one subcarrier 1-03 on the frequency domain. In the frequency domain, $$N_{sc}^{RB}$$

(e.g., 12) consecutive REs may constitute one resource block (RB) 1-04. In an embodiment, a plurality of OFDM symbols may constitute one subframe 1-10.

Figure 2:
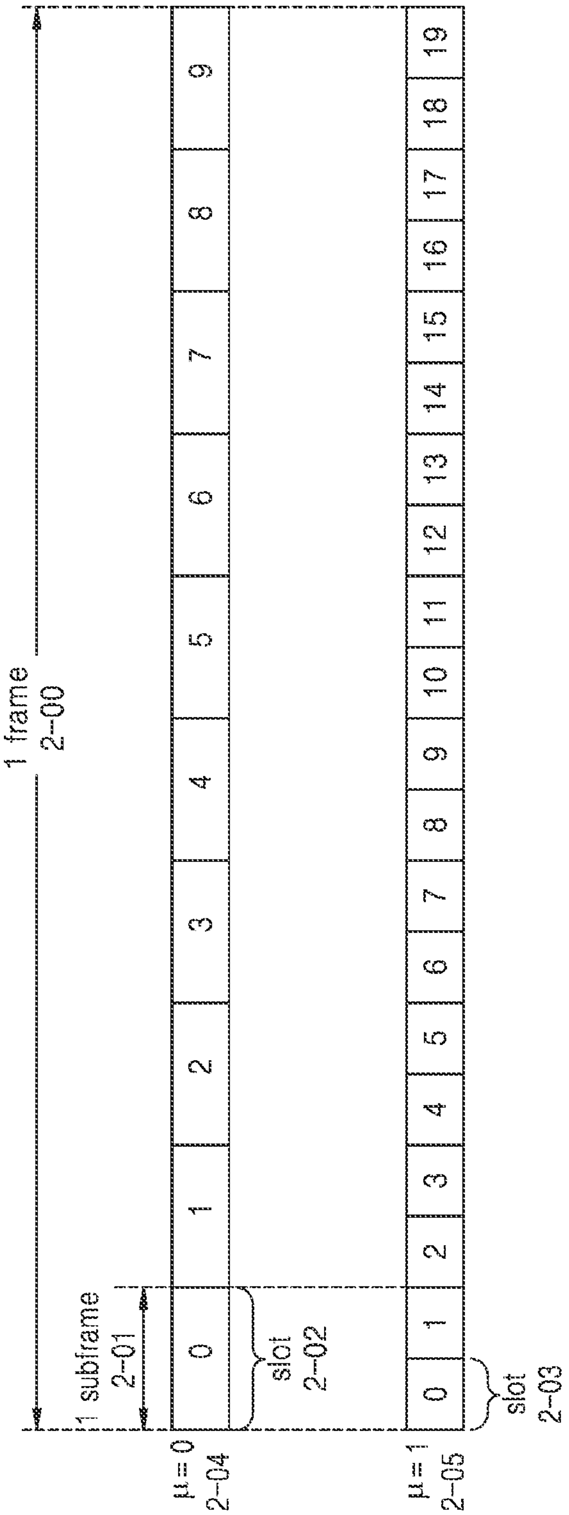
FIG. 2 is a diagram for describing a frame, subframe, and slot structure of a next-generation mobile communication system, according to an embodiment of the present disclosure.

FIG. 2 is a diagram for describing a frame, subframe, and slot structure of a next-generation mobile communication system, according to an embodiment of the present disclosure.

Referring to FIG. 2, one frame 2-00 may include one or more subframes 2-01, and one subframe may include one or more slots 2-02. For example, one frame 2-00 may be defined as 10 ms. One subframe 2-01 may be defined as 1 ms. Iri this case, one frame 2-00 may include a total of 10 subframes 2-01. One slot 2-02 or 2-03 may be defined as 14 OFDM symbols (i.e., the number $$N_{symb}^{slot}$$

of symbols per slot=14). One subframe 2-01 may include one or more slots 2-02 or 2-03, the number of slots 2-02 or 2-03 per subframe 2-01 may be changed according to a subcarrier spacing set value t 2-04 or 2-05. An example of FIG. 2 illustrates a case where the subcarrier spacing setting value is μ=0 2-04 and a case where the subcarrier spacing setting value is μ=05 2-05. In the case of μ=0 2-04, one subframe 2-01 may include one slot 2-02, and in the case of μ=1 2-05, one subframe 2-01 may include two slots 2-03. That is, the number $$N_{slot}^{subframe,\mu}$$

of slots per subframe may be changed according to the subcarrier spacing setting value μ. Accordingly, the number $$N_{slot}^{frame,\mu}$$

of slots per frame may be changed.

$$N_{slot}^{subframe,\mu} \text{ and } N_{slot}^{frame,\mu}$$

according to each subcarrier spacing setting value y may be defined as shown in [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the NR, one the component carrier (CC) or serving cell may include up to 250 or more RBs. Therefore, when the UE always receives the full serving cell bandwidth as in the LTE, the power consumption of the UE may be extreme. In order to solve this problem, the base station may configure one or more bandwidth parts (BWPs) for the UE and support the UE to change the reception area within the cell. In the NR, the base station may configure 'initial BWP', which is a bandwidth of control resource set (CORESET) #0 (or common search space (CSS)), for the UE through a master information block (MIB). Thereafter, the base station may configure the initial BWP (first BWP) of the UE through radio resource control (RRC) signaling, and may notify at least one piece of BWP configuration information that may be indicated through downlink control information (DCI). Thereafter, the base station may indicate which band to be used by the UE by announcing a BWP ID through DCI. When the UE does not receive DCI in the currently allocated BWP for a specific time or longer, the UE may return to a 'default BWP' and attempt to receive DCI.

Figure 3:
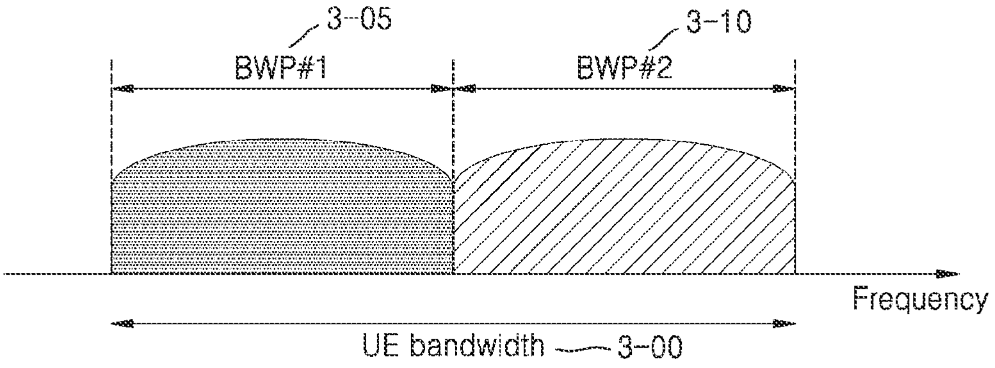
FIG. 3 is a diagram illustrating an example of a configuration of a bandwidth part in a wireless communication system, according to an embodiment of the present disclosure.

FIG. 3 is a diagram illustrating an example of a configuration of a BWP in a wireless communication system, according to an embodiment of the present disclosure.

FIG. 3 illustrates an example in which a UE bandwidth 3-00 is configured as two BWPs, i.e., BWP #1 3-05 and BWP #2 3-10. The base station may configure one or more BWPs for the UE, and may configure the following information shown in [Table 2] with respect to each BWP.

TABLE 2

```
BWP ::=                         SEQUENCE {
    bwp-Id                          BWP-Id,
  (Bandwidth part identifier)   INTEGER (1..65536),
    locationAndBandwidth
    (Bandwidth part location)
    subcarrierSpacing               ENUMERATED {n0, n1, n2,
n3, n4, n5},
    (Subcarrier spacing)            ENUMERATED { extended }
    cyclicPrefix
    (Cyclic prefix)
}
```

Of course, the information configured in relation to the BWP is not limited to the examples described above. In addition to the configuration information described above, various parameters related to the BWP may be configured for the UE. The configuration information may be transmitted from the base station to the UE through higher layer signaling, for example, RRC signaling. At least one of the configured one or more BWPs may be activated. Whether to activate the configured BWP may be semi-statically transmitted from the base station to the UE through RRC signaling, or may be dynamically transmitted from the base station to the UE through a medium access control control element (MAC CE) or DCI.

According to an embodiment, the UE before RRC connection may be configured with an initial BWP for initial access from the base station through a MIB. More specifically, the UE may receive configuration information about a search space and a control resource set (CORESET) in which a physical downlink control channel (PDCCH) is transmittable for receiving system information (which may correspond to remaining system information (RMSI) or system information block 1 (SIB1)) required for initial access through an MIB in an initial access stage. The CORESET and the search space set by the MIB may each be regarded as identity (ID) 0.

The base station may notify the UE of configuration information, such as frequency allocation information, time allocation information, and numerology for CORESET #0, through the MIB. Also, the base station may notify the UE of configuration information about a monitoring periodicity and occasion for CORESET #0, that is, configuration information about search space #0, through the MIB. The UE may regard the frequency domain set as CORESET #0 obtained from the MIB as the initial BWP for initial access. In this case, the ID of the initial BWP may be regarded as 0.

The configuration of the BWP supported by the next-generation mobile communication system (5G or NR system) may be used for various purposes.

For example, when the bandwidth supported by the UE is less than the system bandwidth, the bandwidth supported by the UE may be supported through BWP configuration. For example, in <Table 2>, the frequency location of the BWP (configuration information 2) may be configured for the UE in order to allow the UE to transmit and receive data at a specific frequency position within the system bandwidth.

As another example, the base station may configure a plurality of BWPs for the UE in order to support different numerologies from each other. For example, in order to support data transmission and reception using both subcarrier spacing of 15 kHz and subcarrier spacing of 30 kHz with respect to an arbitrary UE, two BWPs be configured to use subcarrier spacing of 15 kHz and subcarrier spacing of 30 kHz, respectively. Different BWPs may be frequency-division-multiplexed (FDMed). When attempting to transmit and receive data at specific subcarrier spacing, the BWP configured at the corresponding subcarrier spacing may be activated.

As another example, in order to reduce power consumption of the UE, the base station may configure BWPs having different bandwidths for the UE. For example, when the UE supports a very great bandwidth, for example, a bandwidth of 100 MHz, and always transmits and receives data at the corresponding bandwidth, very high power consumption may be caused. In particular, it may be very inefficient in terms of power consumption for the UE to monitor an unnecessary DL control channel with respect to a great bandwidth of 100 MHz in a situation in which there is no traffic. Therefore, in order to reduce power consumption of the UE, the base station may configure, for the UE, a BWP of a relatively small bandwidth, for example, a BWP of 20 MHz. In a situation in which there is no traffic, the UE may perform a monitoring operation in the BWP of 20 MHz, and when data is generated, the UE may transmit and receive data by using the BWP of 100 MHz according to the indication of the base station.

In the method of configuring the BWP, UEs before RRC connection may receive configuration information for the initial BWP through a MIB in an initial access stage. More specifically, the UE may be configured with a CORESET for a downlink control channel, on which DCI for scheduling a SIB is transmittable, from a MIB of a physical broadcast channel (PBCH). The bandwidth of the CORESET configured through the MIB may be regarded as the initial BWP, and the UE may receive a physical downlink shared channel (PDSCH), on which the SIB is transmitted, in the configured initial BWP. In addition to the purpose of receiving the SIB, the initial BWP may be utilized for other system information (OSI), paging, and random access.

Hereinafter, a synchronization signal (SS)/PBCH block of a next-generation mobile communication system (a 5G or NR system) will be described.

The SS/PBCH block may refer to a physical layer channel block including a primary SS (PSS), a secondary SS (SSS), and a PBCH. More specifically, the SS/PBCH block may be defined as follows.

- PSS: may serve as a reference for downlink time/frequency synchronization and provide information about a part of a cell ID.
- SSS: may serve as a reference for DL time/frequency synchronization and provide information about a remaining cell ID that is not provided by the PSS. Additionally, the SSS may serve as a reference signal for demodulation of the PBCH.
- PBCH: may provide essential system information necessary for transmitting and receiving a data channel and a control channel of the UE. The essential system information may include search space-related control information indicating radio resource mapping information of the control channel, scheduling control information about a separate data channel for transmitting system information, and the like.
- SS/PBCH block: may include a combination of the PSS, the SSS, and the PBCH. One or more SS/PBCH blocks may be transmitted within 5 ms, and each transmitted SS/PBCH block may be distinguished by an index.

The UE may detect the PSS and the SSS in the initial access stage and may decode the PBCH. The UE may obtain the MIB from the PBCH, and may be configured with CORESET #0 through the MIB. The UE may perform monitoring on CORESET #0 on the assumption that a selected SS/PBCH block and a demodulation reference signal (DMRS) transmitted in CORESET #0 are in quasi co-location (QCL) relationship. The UE may receive system information as DCI transmitted in CORESET #0. The UE may obtain, from the received system information, configuration information related to random access channel (RACH) necessary for initial access. The UE may transmit a physical RACH (PRACH) to the base station based on a selected SS/PBCH index, and the base station receiving the PRACH may obtain information about the SS/PBCH block index selected by the UE. The base station may know which one of the SS/PBCH blocks has been selected by the UE and may know that CORESET #0 corresponding to (or associated with) the SS/PBCH block selected by the UE is monitored.

Hereinafter, DCI in a next-generation mobile communication system (a 5G or NR system) will be described in detail.

In the next-generation mobile communication system (the 5G or NR system), scheduling information for UL data (or physical uplink shared channel (PUSCH)) or DL data (or PDSCH) may be transmitted from the base station to the UE through the DCI. The UE may monitor a fallback DCI format and a non-fallback DCI format with respect to the PUSCH or the PDSCH. The fallback DCI format may include a fixed field predefined between the base station and the UE, and the non-fallback DCI format may include a configurable field.

The DCI may be transmitted on a PDCCH through a channel coding and modulation process. A cyclic redundancy check (CRC) may be attached to a payload of a DCI message. The CRC may be scrambled by a radio network temporary identifier (RNTI) corresponding to the identity of the UE. Different RNTIs may be used for the scrambling of the CRC attached to the payload of the DCI message according to the purpose of the DCI message, for example, UE-specific data transmission, a power control command, or a random access response (RAR). That is, the RNTI is not explicitly transmitted, but may be transmitted by being included in a CRC calculation process. When the DCI message transmitted on the PDCCH is received, the UE may check the CRC by using the allocated RNTI. When a result of checking the CRC is correct, the UE may know that the corresponding message is transmitted to the UE.

For example, DCI that schedules a PDSCH for system information (SI) may be scrambled by an SI-RNTI. DCI that schedules a PDSCH for a RAR message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies transmit power control (TPC) may be scrambled by a TPC-RNTI. DCI that schedules a UE-specific PDSCH or PUSCH may be scrambled by a cell RNTI (C-RNTI).

DCI format 0_0 may be used as fallback DCI that schedules a PUSCH. In this case, a CRC may be scrambled by a C-RNTI. In an embodiment, DCI format 0_0 in which the CRC is scrambled by the C-RNTI may include, for example, pieces of information shown in [Table 3] below.

TABLE 3

| |
|---|
| Identifier for DCI formats - [1] bit |
| Frequency domain resource assignment - |
| $[\lceil \log_2(N_{RB}^{UL,BWP}(N_{RB}^{UL,BWP}+1)/2) \rceil]$ bits |
| Time domain resource assignment - X bits |
| Frequency hopping flag - 1 bit. |
| Modulation and coding scheme - 5 bits |
| New data indicator - 1 bit |
| Redundancy version - 2 bits |
| HARQ process number - 4 bits |
| TPC command for scheduled PUSCH- [2] bits |
| UL/SUL indicator - 0 or 1 bit |

DCI format 0_0 may be used as non-fallback DCI that schedules a PUSCH. In this case, a CRC may be scrambled by a C-RNTI. In an embodiment, DCI format 0_1 in which the CRC is scrambled by the C-RNTI may include, for example, pieces of information shown in [Table 4] below.

TABLE 4

| |
|---|
| Carrier indicator - 0 or 3 bits |
| UL/SUL indicator - 0 or 1 bit |
| Identifier for DCI formats - [1] bits |
| Bandwidth part indicator - 0, 1 or 2 bits |
| Frequency domain resource assignment |
| For resource allocation type 0, $\lceil N_{RB}^{UL,BWP}/P \rceil$ bits |
| For resource allocation type 1, $\lceil \log_2(N_{RB}^{UL,BWP}(N_{RB}^{UL,BWP}+1)/2) \rceil$ bits |
| Time domain resource assignment - 1, 2, 3, or 4 bits |
| VRB-to-PRB mapping - 0 or 1 bit, only for resource allocation type 1. |
| 0 bit if only resource allocation type 0 is configured; |
| 1 bit otherwise. |
| Frequency hopping flag - 0 or 1 bit, only for resource allocation type 1. |
| 0 bit if only resource allocation type 0 is configured; |
| 1 bit otherwise. |
| Modulation and coding scheme - 5 bits |
| New data indicator - 1 bit |
| Redundancy version - 2 bits |
| HARQ process number - 4 bits |
| 1st downlink assignment index - 1 or 2 bits |
| 1 bit for semi-static HARQ-ACK.codebook; |
| 2 bits for dynamic HARQ-ACK codebook with single HARQ-ACK codebook. |
| 2nd downlink assignment index - 0 or 2 bits |
| 2 bits for dynamic HARQ-ACK codebook with two HARQ-ACK sub-codebooks; |
| 0 bit otherwise. |
| TPC command for scheduled PUSCH - 2 bits |
| SRS resource indicator - $\left\lceil \log_2\left(\sum_{k=1}^{L_{max}} \binom{N_{SRS}}{k}\right) \right\rceil$ or $\lceil \log_2(N_{SRS}) \rceil$ bits |
| $\left\lceil \log_2\left(\sum_{k=1}^{L_{max}} \binom{N_{SRS}}{k}\right) \right\rceil$ bits for non-codebook based PUSCH transmission; |
| $\lceil \log_2(N_{SRS}) \rceil$ bits for codebook based PUSCH transmission. |
| Precoding information and number of layers - up to 6 bits |
| Antenna ports - up to 5 bits |
| SRS request - 2 bits |
| CSI request - 0, 1, 2, 3, 4, 5, or 6 bits |
| CBG transmission information - 0, 2, 4, 6, or 8 bits |
| PTRS-DMRS association - 0 or 2 bits. |
| beta_offset indicator - 0 or 2 bits |
| DMRS sequence initialization - 0 or 1 bit |

DCI format 1_0 may be used as fallback DCI that schedules a PDSCH. In this case, a CRC may be scrambled by a C-RNTI. In an embodiment, DCI format 1_0 in which the CRC is scrambled by the C-RNTI may include, for example, pieces of information shown in [Table 5] below.

TABLE 5

| |
|---|
| Identifier for DCI formats - [1] bit |
| Frequency domain resource assignment - |
| $\left[\left\lceil \log_2\left(N_{RB}^{DL,BWP}\left(N_{RB}^{DL,BWP}+1\right)/2\right)\right\rceil\right]$ bits |
| Time domain resource assignment - X bits |
| VRB-to-PRB mapping - 1 bit. |
| Modulation and coding scheme - 5 bits |
| New data indicator - 1 bit |
| Redundancy version - 2 bits |
| HARQ process number - 4 bits |
| Downlink assignment index - 2 bits |
| TPC command for scheduled PUCCH - [2] bits |
| PUCCH resource indicator - 3 bits |
| PDSCH-to-HARQ feedback timing indicator - [3] bits |

DCI format 1_1 may be used as non-fallback DCI that schedules a PDSCH. In this case, a CRC may be scrambled by a C-RNTI. In an embodiment, DCI format 1_1 in which the CRC is scrambled by the C-RNTI may include, for example, pieces of information shown in [Table 6] below.

TABLE 6

| |
|---|
| Carrier indicator - 0 or 3 bits |
| Identifier for DCI formats - [1] bits |
| Bandwidth part indicator - 0, 1 or 2 bits |
| Frequency domain resource assignment |
| For resource allocation type 0, $\lceil N_{RB}^{DL,BWP}/P\rceil$ bits |
| For resource allocation type 1, $\left\lceil \log_2\left(N_{RB}^{DL,BWP}\left(N_{RB}^{DL,BWP}+1\right)/2\right)\right\rceil$ bits |
| Time domain resource assignment - 1, 2, 3, or 4 bits |
| VRB-to-PRB mapping - 0 or 1 bit, only for resource allocation type 1. |
| 0 bit if only resource allocation type 0 is configured; |
| 1 bit otherwise. |
| PRB bundling size indicator - 0 or 1 bit |
| Rate matching indicator - 0, 1, or 2 bits |
| ZP CSI-RS trigger - 0, 1, or 2 bits |
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |

TABLE 6-continued

| |
|---|
| PDSCH-to-HARQ_feedback timing indicator - 3 bits |
| Antenna ports - 4, 5 or 6 bits |
| Transmission configuration indication - 0 or 3 bits |
| SRS request - 2 bits |
| CBG transmission information - 0, 2, 4, 6, or 8 bits |
| CBG flushing out information - 0 or 1 bit |
| DMRS sequence initialization -1 bit |

Figure 4:
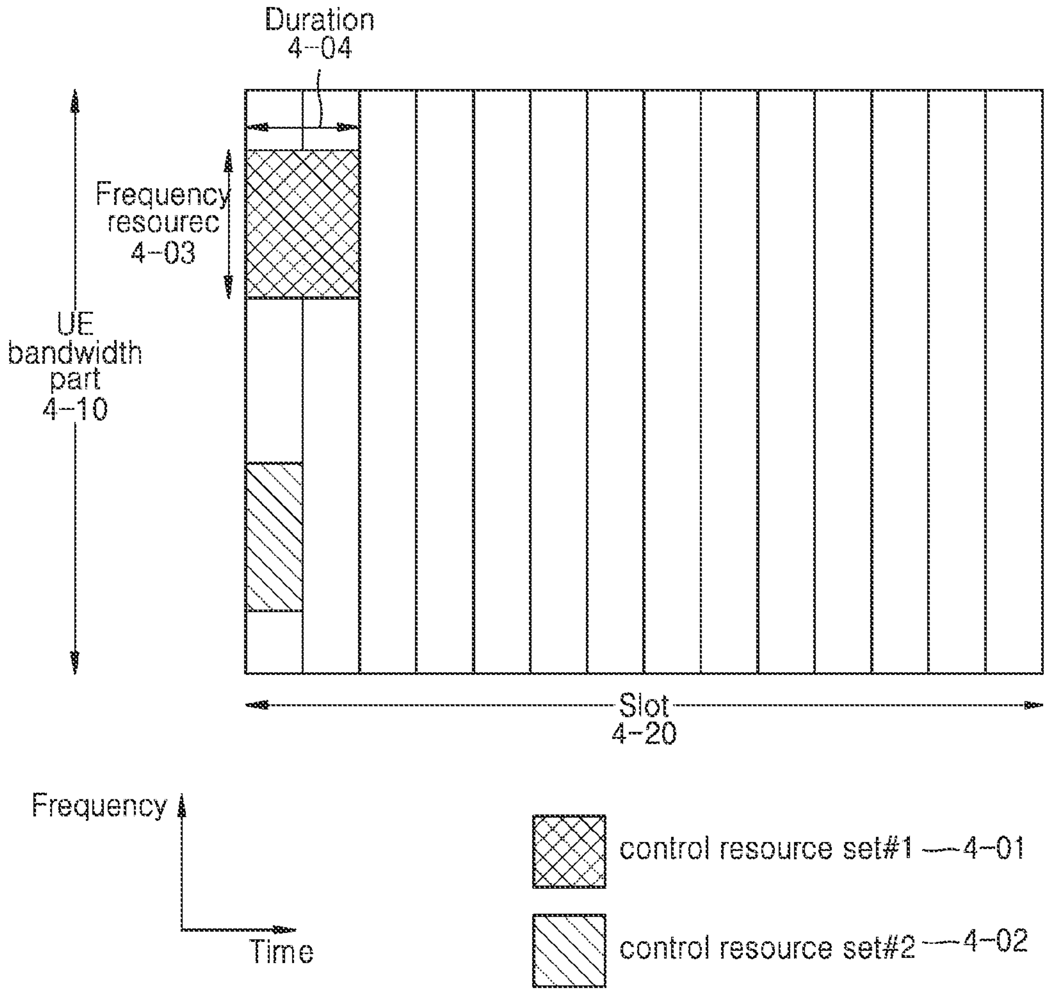
FIG. 4 is a diagram for describing a configuration of a control resource set of a downlink control channel in a next-generation mobile communication system, according to an embodiment of the present disclosure.

FIG. 4 is a diagram for describing a configuration of a CORESET of a DL control channel in a next-generation mobile communication system, according to an embodiment of the present disclosure. That is, FIG. 4 is a diagram illustrating an embodiment of a CORESET in which a DL control channel is transmitted in a 5G wireless communication system, according to an embodiment of the present disclosure.

Referring to FIG. 4, FIG. 4 illustrates an embodiment in which a UE BWP 4-10 is configured on a frequency domain and two CORESETs (CORESET #1 4-01 and CORESET #2 4-02) are configured in one slot 4-20 on a time domain. The CORESETs 4-01 and 4-02 may be configured on a specific frequency resource 4-03 within the entire UE BWP 4-10 on the frequency domain. The CORESETs 4-01 and 4-02 may be configured with one or more OFDM symbols on the time domain, and this may be defined as a CORESET duration 4-04. Referring to FIG. 4, CORESET #1 4-01 may be configured to have a CORESET duration of two symbols, and CORESET #2 4-02 may be configured to have a CORESET duration of one symbol.

In the next-generation mobile communication system (the 5G or NR system) described above, the base station may configure the CORESET to the UE through higher layer signaling (e.g., SI, MIB, or RRC signaling). Configuring the CORESET for the UE may mean providing information, such as a CORESET identity, a frequency position of the CORESET, a symbol duration of the CORESET, and the like. For example, the configuration of the CORESET may include pieces of information shown in [Table 7] below.

TABLE 7

```
ControlResourceSet ::=
SEQUENCE{
        -- Corresponds to L1 parameter 'CORESET-ID'
        controlResourceSetId                              ControlResourceSetId,
(Control resource set identity))
        frequencyDomainResources             BIT STRING (SIZE (45)),
(Frequency domain resource allocation information
        duration                             INTEGER (1..maxCoReSetDuration),
(Time domain resource allocation information)
        cce-REG-MappingType                                        CHOICE {
    (CCE-to-REG mapping type)
                interleaved                             SEQUENCE {
                        reg-BundleSize              ENUMERATED {n2, n3, n6},
                        (REG bundle size)
                        precoderGranularity      ENUMERATED {sameAsREG-
bundle, allContiguousRBs},
                        interleaverSize            ENUMERATED {n2, n3, n6}
                        (interleaver size)
```

TABLE 7-continued

```
                    shiftIndex
                    INTEGER(0..maxNrofPhysicalResourceBlocks-1)
                    (Interleaver shift))
    },
    nonInterleaved                                              NULL
    },
    tci-StatesPDCCH                 SEQUENCE(SIZE (1..maxNrofTCI-
    StatesPDCCH)) OF TCI-StateId                                   OPTIONAL,
    (QCL configuration information)
    tci-PresentInDCI                ENUMERATED {enabled}
}
```

tci-StatesPDCCH (hereinafter referred to as 'TCI state') configuration information in [Table 7] may include information of one or more SS/PBCH block indexes or CSI-RS indexes that are in QCL relationship with DMRS transmitted in the corresponding CORESET. Also, information on what kind of relationship the QCL relationship is may be included. For example, the configuration of the TCI state may include pieces of information shown in [Table 8] below.

TABLE 8

```
    TCI-State ::=                           SEQUENCE {
    tci-StateId                             TCI-StateId,
    qcl-Type1                               QCL-Info,
    qcl-Type2                               QCL-Info,         OPTIONAL,
    ...
 }
QCL-Info ::=                  SEQUENCE {
          cell (cell index)             ServCellIndex         OPTIONAL,
          bwp-Id (BWP index)            BWP-Id                OPTIONAL,
          referenceSignal (reference RS index) CHOICE {
               csi-rs                        NZP-CSI-RS-ResourceId,
               ssb                           SSB-Index
          },
     qcl-Type              ENUMERATED {typeA, typeB, typeC, typeD},
       ...
 }
```

Referring to the configuration of the TCI state, a cell index and/or a BWP index and a QCL type of the reference RS together with the index of the reference RS that is in the QCL relationship, that is, the SS/PBCH block index or the CSI-RS index, may be configured. The QCL type indicates a channel characteristic assumed to be shared by the reference RS and the CORESET DMRS, and examples of possible QCL types are as follows.

QCL typeA: Doppler shift, Doppler spread, average delay, delay spread.

QCL typeB: Doppler shift, Doppler spread.

QCL typeC: Doppler shift, average delay.

QCL typeD: Spatial Rx parameter.

The TCI state may be configured similarly not only for the CORESET DMRS but also for other target RSs, for example, a PDSCH DMRS and a CSI-RS, but a detailed description thereof is omitted in order not to obscure the gist of the description.

Figure 5:
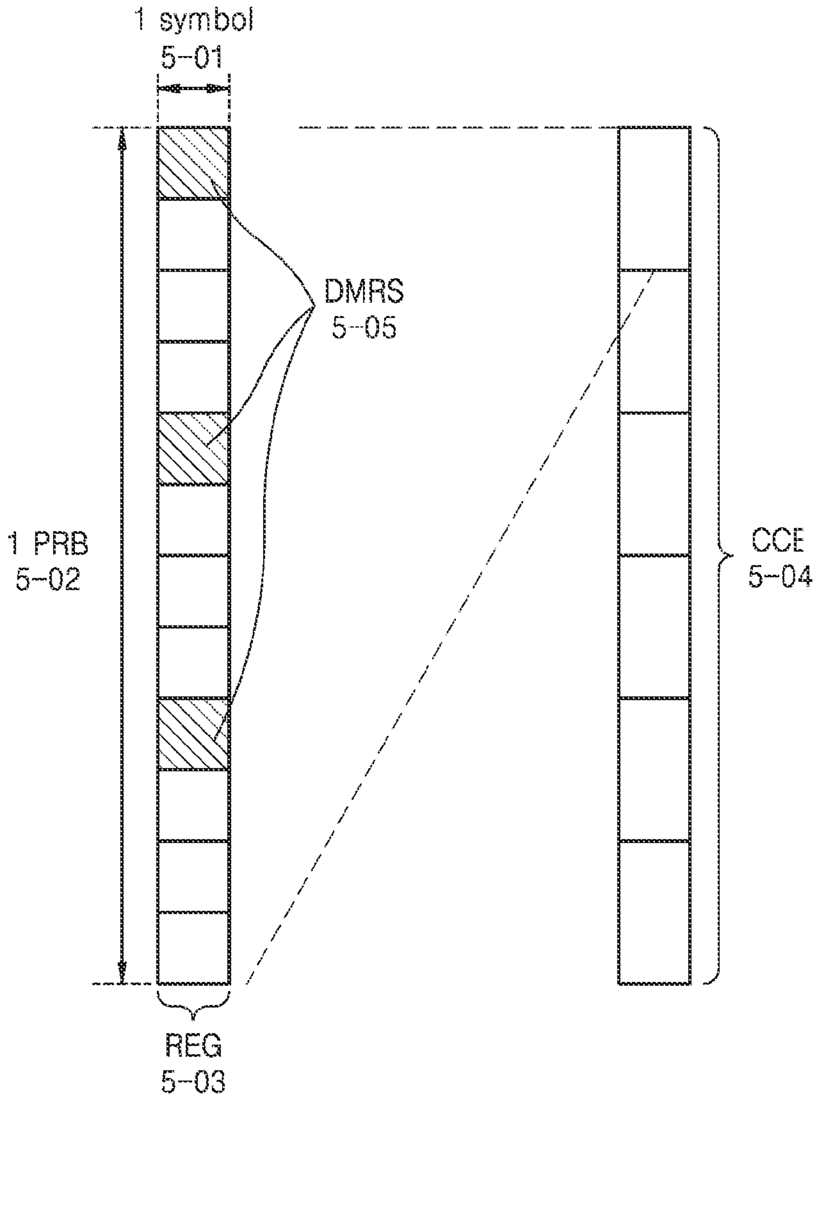
FIG. 5 is a diagram for describing a structure of a downlink control channel in a next-generation mobile communication system, according to an embodiment of the present disclosure.

FIG. 5 is a diagram for describing a structure of a DL control channel in a next-generation mobile communication system, according to an embodiment of the present disclosure. That is, FIG. 5 is a diagram illustrating an example of a basic unit of time and frequency resources constituting a DL control channel that is usable in 5G, according to an embodiment of the present disclosure.

Referring to FIG. 5, the basic unit of the time and frequency resources constituting the control channel may be defined as a resource element group (REG) 5-03. The REG 5-03 may be defined as one OFDM symbol 5-01 on the time domain and one physical resource block (PRB) 5-02, that is, 12 subcarriers, on the frequency domain. A base station may configure a DL control channel allocation unit in concatenation with the REG 5-03.

As illustrated in FIG. 5, in the 5G, when the basic unit for DL control channel allocation is a control channel element (CCE) 5-04, one CCE 5-04 may include a plurality of REGs 5-03. For example, the REG 5-03 illustrated in FIG. 5 may include 12 REs, and when one CCE 5-04 includes six REGs 5-03, one CCE 5-04 may include 72 REs. When a DL CORESET is configured, the DL CORESET may include a plurality of CCEs 5-04, and a specific DL control channel may be transmitted by being mapped to one or more CCEs 5-04 according to an aggregation level (AL) in the CORESET. The CCEs 5-04 in the CORESET may be identified by numbers. In this case, the numbers of the CCEs 5-04 may be assigned according to a logical mapping method.

The basic unit of the DL control channel illustrated in FIG. 5, that is, the REG 5-03 may include REs to which DCI is mapped and a region to which a DMRS 5-05, which is a reference signal for decoding the same, is mapped. As illustrated in FIG. 5, three DMRSs 5-05 may be transmitted in one REG 5-03. The number of CCEs required to transmit a PDCCH may be 1, 2, 4, 8, or 16 according to an AL. A different number of CCEs may be used to implement link adaptation of the DL control channel. For example, when AL=L, one DL control channel may be transmitted through L CCEs.

The UE has to detect a signal without knowing information about the DL control channel. For blind decoding, a search space indicating a set of CCEs may be defined. The search space is a set of DL control channel candidates including CCEs that the UE has to attempt to decode on a given AL. Because there are various ALs that make one bundle with 1, 2, 4, 8, or 16 CCEs, the UE may have a plurality of search spaces. A search space set may be defined as a set of search spaces in all set ALs.

The search spaces may be classified into common search spaces and UE-specific search spaces. According to an embodiment of the present disclosure, a certain group of UEs or all UEs may detect the common search space of the PDCCH in order to receive cell-common control information, such as a dynamic scheduling or paging message for system information.

For example, the UE may receive PDSCH scheduling assignment information for transmission of the SIB including cell operator information by detecting the common search space of the PDCCH. In the case of the common search space, because a certain group of UEs or all UEs have to receive the PDCCH, the common search space may be defined as a set of predefined CCEs. On the other hand, the UE may receive scheduling assignment information for UE-specific PDSCH or PUSCH by detecting the UE-specific search space of the PDCCH. The UE-specific search space may be UE-specifically defined as a function of the UE identity and various system parameters.

In the 5G, the parameter for the search space of the PDCCH may be set from the base station to the UE through higher layer signaling (e.g., SIB, MIB, or RRC signaling). For example, the base station may set, to the UE, the number of PDCCH candidates at each AL L, a monitoring periodicity for the search space, monitoring occasion of a symbol unit in a slot for the search space, a search space type (common search space or UE-specific search space), a combination of a DCI format and a RNTI to be monitored in the search space, a CORESET index to monitor the search space, and the like. For example, the configuration described above may include pieces of information shown in [Table 9] below.

TABLE 9

```
SearchSpace ::=                                   SEQUENCE {
            -- Identity of the search space. SearchSpaceId = 0 identifies the --
SearchSpace configured via PBCH (MIB) or ServingCellConfigCommon.
            searchSpaceId                         SearchSpaceId,
         (Search space identity)
            controlResourceSetId                  ControlResourceSetId,
         (Control resource set identity)
            monitoringSlotPeriodicityAndOffset CHOICE {
(Monitoring slot periodicity)
            sl1                                   NULL,
            sl2                                   INTEGER (0..1),
            sl4                                   INTEGER (0..3),
            sl5                                   INTEGER (0..4),
            sl8                                   INTEGER (0..7),
            sl10                                  INTEGER (0..9),
            sl16                                  INTEGER (0..15),
            sl20                                  INTEGER (0..19),
        }
            duration (Monitoring duration) INTEGER (2..2559)
            monitoringSymbolsWithinSlot        BIT STRING (SIZE (14))
(Monitoring symbols within slot)
            nrofCandidates                SEQUENCE {
            (Number of PDCCH candidates per aggregation level)
            aggregationLevel1                        ENUMERATED {n0, n1, n2,
n3, n4, n5, n6, n8},
            aggregationLevel2                        ENUMERATED {n0, n1, n2,
n3, n4, n5, n6, n8},
            aggregationLevel4                        ENUMERATED {n0, n1, n2,
n3, n4, n5, n6, n8},
            aggregationLevel8                        ENUMERATED {n0, n1, n2,
n3, n4, n5, n6, n8},
            aggregationLevel16                       ENUMERATED {n0, n1, n2,
n3, n4, n5, n6, n8}
            }
            searchSpaceType                              CHOICE {
            (Search space type)
            -- Configures this search space as common search space (CSS) and
DCI formats to monitor.
            common                                   SEQUENCE {
         (Common search space)
        }
         ue-Specific                                     SEQUENCE {
        (UE-specific search space)
          -- Indicates whether the UE monitors in this USS for DCI formats 0-0 and 1-
0 or for formats 0-1 and 1-1.
        formats                                   ENUMERATED {formats0-0-
And-1-0, formats0-1-And-1-1},
       ...
      }
```

Based on the configuration information, the base station may configure one or more search space sets for the UE. According to an embodiment of the present disclosure, the base station may configure search space set 1 and search space set 2 for the UE, search space set 1 may be configured so that DCI format A scrambled by an X-RNTI may be monitored in the common search space, and search space set 2 may be configured so that DCI format B scrambled by a Y-RNTI may be monitored in the UE-specific search space.

According to the configuration information, one or more search space sets may be present in the common search space or the UE-specific search space. For example, search space set #1 and search space set #2 may be set as the common search space, and search space set #3 and search space set #4 may be set as the UE-specific search space.

In the common search space, a combination of the DCI format and the RNTI described below may be monitored. Of course, the present disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of the DCI format and the RNTI described below may be monitored. Of course, the present disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and uses.

Cell RNTI (C-RNTI): For UE-specific PDSCH scheduling

Temporary cell RNTI (TC-RNTI): Used for UE-specific PDSCH scheduling

Configured scheduling RNTI (CS-RNTI): Used for semi-statically configured UE-specific PDSCH scheduling Random access RNTI (RA-RNTI): Used for PDSCH scheduling in random access phase Paging RNTI (P-RNTI): Used for PDSCH scheduling on which paging is transmitted System information RNTI (SI-RNTI): Used for PDSCH scheduling on which system information is transmitted Interruption RNTI (INT-RNTI): Used for indicating whether to puncture PDSCH Transmit power control for PUSCH RNTI (TPC-PUSCH-RNTI): Used for indicating power control indication for PUSCH Transmit power control for PUCCH RNTI (TPC-PUCCH-RNTI): Used for indicating power control indication for PUCCH Transmit power control for SRS RNTI (TPC-SRS-RNTI): Used for indicating power control indication for SRS In an embodiment, the DCI formats described above may be defined as shown in [Table 10] below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment of the present disclosure, in the 5G, a plurality of search space sets may be configured with different parameters (e.g., the parameters in [Table 9]. Therefore, the UE may monitor a different search space set every time. For example, when search space set #1 is configured with X-slot periodicity and search space set #2 is configured with Y-slot periodicity, where X and Y are different from each other, the UE may monitor both search space set #1 and search space set #2 in a particular slot, and may monitor one of search space set #1 and search space set #2 in another particular slot.

When a plurality of search space sets are configured for the UE, the following conditions may be taken into account in a method of determining a search space set to be monitored by the UE.

[Condition 1: Restriction on Maximum Number of PDCCH Candidates]

The number of PDCCH candidates to be monitored per slot does not exceed $M^{\mu}$. $M^{\mu}$ may be defined as the maximum number of PDCCH candidates per slot on a cell configured with $15\cdot 2^{\mu}$ kHz subcarrier spacing, as in the following [Table 11].

TABLE 11

| μ | Maximum number of PDCCH candidates per slot and per serving cell ($M^{\mu}$) |
|---|---|
| 0 | 44 |
| 1 | 36 |
| 2 | 22 |
| 3 | 20 |

[Condition 2: Restriction on Maximum Number of CCEs]

The number of CCEs constituting an entire search space (wherein the entire search space may refer to an entire CCE set corresponding to a union region of a plurality of search space sets) per slot does not exceed $C^{\mu}$. $C^{\mu}$ may be defined as the maximum number of CCEs per slot on a cell configured with $15\cdot 2^{\mu}$ kHz subcarrier spacing, as in the following [Table 12].

TABLE 12

| μ | Maximum number of CCEs per slot and per serving cell ($C^{\mu}$) |
|---|---|
| 0 | 56 |
| 1 | 56 |
| 2 | 48 |
| 3 | 32 |

For convenience of explanation, a situation that satisfies both conditions 1 and 2 at a particular time point may be exemplarily defined as "condition A." Accordingly, failing to satisfy condition A may mean that at least one of conditions 1 and 2 described above is not satisfied.

Depending on how the base station configures the search space sets, condition A may not be satisfied at a particular time point. When condition A is not satisfied at a particular time point, the UE may select and monitor some of the search space sets, which are configured to satisfy condition A at the time, and the base station may transmit a PDCCH in the selected search space set.

According to an embodiment of the present disclosure, a method of selecting some of the entire configured search space sets may be as follows.

[Method 1]

In a case where condition A relating to a PDCCH is not satisfied at a particular time point (slot), a UE (a base station) may select a search space set configured to have a search space type of a common search space among search space sets existing at the time point in preference to a search space set configured to have a search space type of a UE-specific search space.

When all search space sets configured as a common search space are selected (that is, when condition A is satisfied even after all search spaces configured as a common search space are selected), the UE (or the base station) may select search space sets configured as a UE-specific search space. In this case, when there are a plurality of search space sets configured as a UE-specific search space, as the index of the search space set is smaller, the priority of the search space set may be higher. The UE or the base station may select UE-specific search space sets within a range of satisfying condition A based on the priorities.

Time and frequency resource allocation methods for data transmission in NR are described below.

Figure 6:
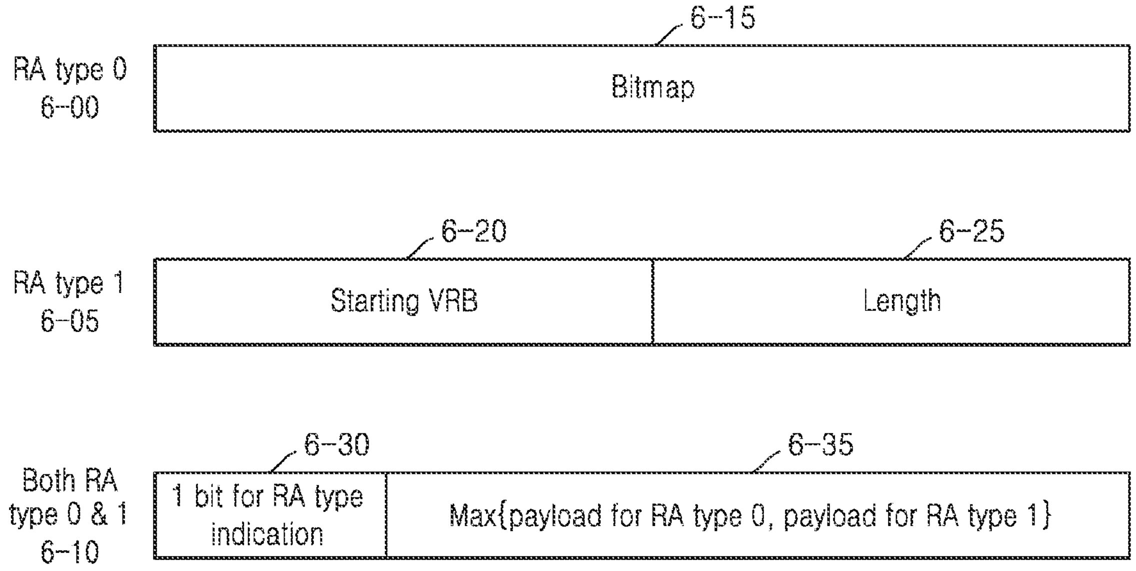
FIG. 6 is a diagram for describing frequency domain resource allocation methods configurable through an upper layer in new radio (NR).

In the NR, there may be provided the following detailed frequency domain resource allocation (FD-RA) in addition to the frequency domain resource candidate allocation through BWP indication. FIG. 6 is a diagram illustrating an example of PDSCH frequency domain resource allocation in a wireless communication system, according to an embodiment of the present disclosure.

FIG. 6 is a diagram for describing frequency domain resource allocation methods configurable through an upper layer in NR.

According to an embodiment of the present disclosure, frequency domain resource allocation methods may include three frequency domain resource allocation methods: type 0 6-00, type 1 6-05, and dynamic switch 6-10.

Referring to FIG. 6, when the UE is configured to use only resource type 0 through higher layer signaling (6-00), partial DCI for allocating the PDSCH to the UE has a bitmap including NRBG bits. The conditions for this will be described again below. At this time, NRBG refers to the number of resource block groups (RBGs) determined as shown in [Table 13] below according to a BWP size and an upper layer parameter rbg-Size allocated by a BWP indicator, and data is transmitted to the RBG that the bitmap indicates by 1.

TABLE 13

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher layer signaling (6-05), partial DCI for allocating the PDSCH to the UE has frequency domain resource allocation information including $$\lceil \log_2(N_{RB}^{DL,BWP}(N_{RB}^{DL,BWP}+1)/2)\rceil$$

bits. The conditions for this will be described again below. In this manner, the base station may set a starting virtual resource block (VRB) 6-20 and a length 6-25 of frequency domain resources consecutively allocated therefrom.

When the UE is configured to use both resource type 0 and resource type 1 through higher layer signaling (6-10), partial DCI for allocating the PDSCH to the UE has frequency domain resource allocation information including bits of a larger value 6-35 among a payload 6-15 for setting resource type 0 and payloads 6-20 and 6-25 for setting resource type 1. The conditions for this will be described again below. At this time, one bit may be added to a most significant bit (MSB) of the frequency domain resource allocation information in the DCI. When the corresponding bit is 0, it may indicate that resource type 0 is used, and when the corresponding bit is 1, it may indicate that resource type 1 is used.

Hereinafter, the method of allocating time domain resources for a data channel in the next-generation mobile communication system (the 5G or NR system) will be described.

The base station may set a table for time domain resource allocation information for a PDSCH and a PUSCH in the UE through higher layer signaling (e.g., RRC signaling). For example, the base station may set a table including a maximum of maxNrofDL-Allocations (=16) entries for the PDSCH, and may set a table including a maximum of maxNrofUL-Allocations (=16) entries for the PUSCH. In an embodiment, the time domain resource allocation information may include a PDCCH-to-PDSCH slot timing (corresponds to a time interval in slot units between a time when the PDCCH is received and a time when the PDSCH scheduled by the received PDCCH is transmitted, denoted by K0) or a PDCCH-to-PUSCH slot timing (corresponds to a time interval in slot units between a time when the PDCCH is received and a time when the PUSCH scheduled by the received PDCCH is transmitted, denoted by K2), information about a position and a length of a start symbol in which the PDSCH or the PUSCH is scheduled in the slot, a PDSCH or PUSCH mapping type, etc. For example, pieces of information as shown in [Table 14] or [Table 15] below may be notified from the base station to the UE.

TABLE 14

| PDSCH-TimeDomainResourceAllocationList information element |
|---|
| PDSCH-TimeDomainResourceAllocationList ::= SEQUENCE (SIZE(1..maxNrofDL-Allocations)) OF PDSCH-TimeDomainResourceAllocation<br>PDSCH-TimeDomainResourceAllocation ::= SEQUENCE {<br>k0 INTEGER(0..32)<br>OPTIONAL, -- Need S<br>(PDCCH-to-PDSCH timing, slot unit)<br>mappingType ENUMERATED {typeA, typeB},<br>(PDSCH mapping type)<br>startSymbolAndLength INTEGER (0..127)<br>(Start symbol and length of PDSCH)<br>} |

TABLE 15

| PUSCH-TimeDomainResourceAllocation information element |
| --- |
| PUSCH-TimeDomainResourceAllocationList ::= SEQUENCE (SIZE(1..maxNrofUL-Allocations)) OF PUSCH-TimeDomainResourceAllocation<br>PUSCH-TimeDomainResourceAllocation ::= SEQUENCE {<br>k2 INTEGER(0..32) OPTIONAL, -- Need S<br>(PDCCH-to-PUSCH<br>mappingType timing, slot unit ) ENUMERATED {typeA, typeB},<br>(PUSCH mapping type)<br>startSymbolAndLength INTEGER (0..127)<br>(Start symbol and length of PUSCH)<br>} |

The base station may notify the UE of one of the entries in the table for time domain resource allocation information through L1 signaling (e.g., DCI) (for example, one of the entries may be indicated by a 'time domain resource allocation' field in DCI). The UE may obtain time domain resource allocation information for the PDSCH or PUSCH, based on the DCI received from the base station.

Figure 7:
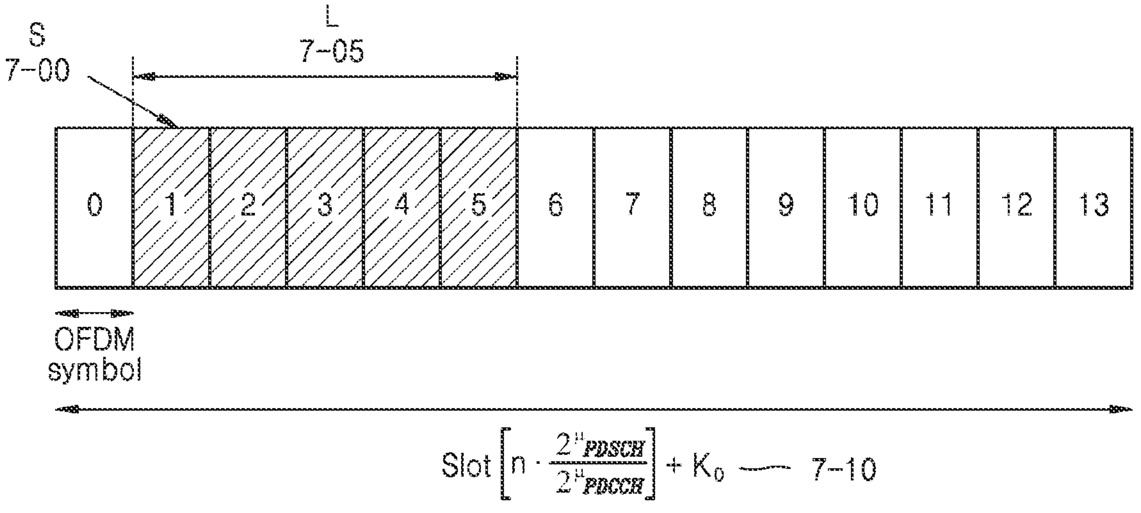
FIG. 7 is a diagram illustrating an example of time domain resource allocation in NR.

FIG. 7 is a diagram illustrating an example of time domain resource allocation in NR.

Referring to FIG. 7, the base station may indicate a time domain position of a PDSCH resource according to subcarrier spacing (SCS) ($\mu_{PDSCH}$, $\mu_{PDCCH}$) of a data channel and a control channel configured by using an upper layer, a scheduling offset ($K_0$) value, and a start position 7-00 and a length 7-05 of an OFDM symbol within one slot dynamically indicated through DCI.

Figure 8:
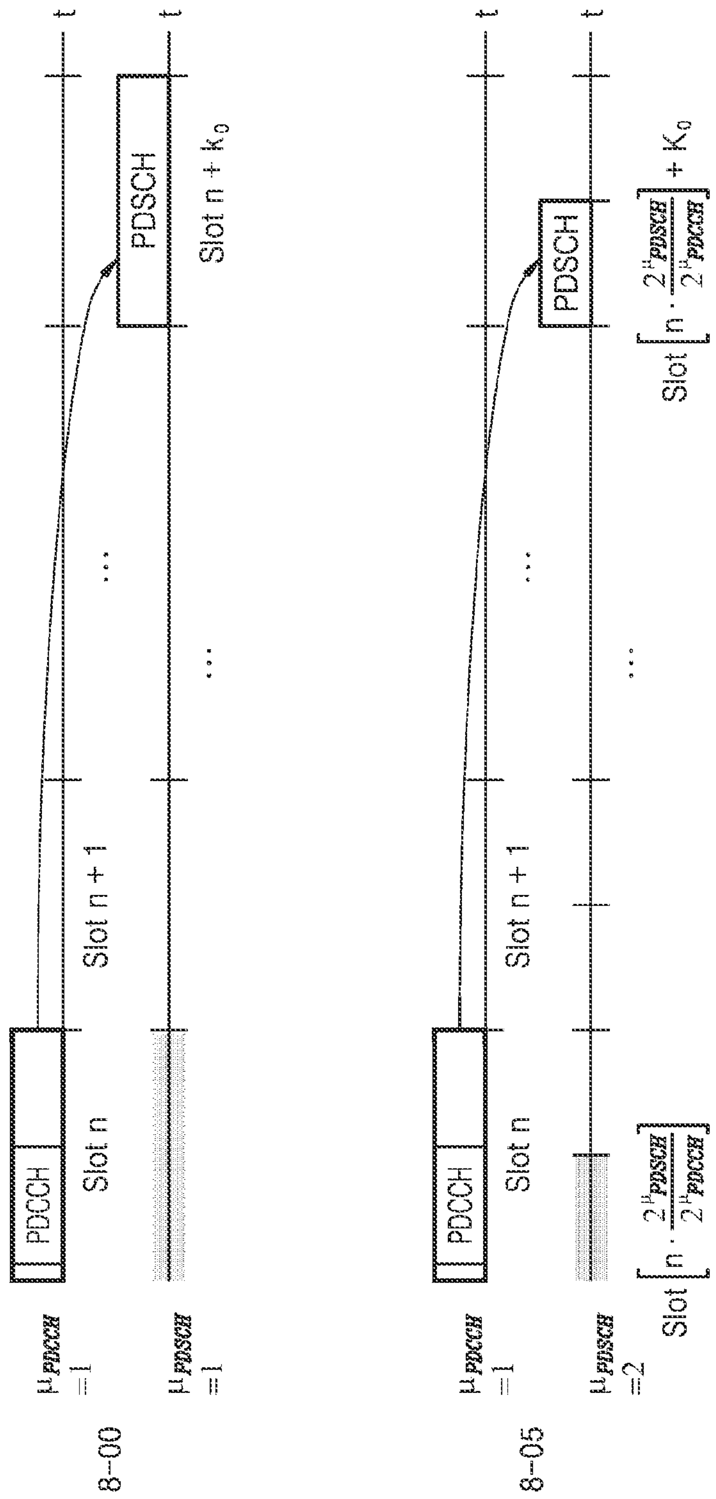
FIG. 8 is a diagram illustrating an example of time domain resource allocation according to subcarrier spacing of a data channel and a control channel in a wireless communication system, according to an embodiment of the present disclosure.

FIG. 8 is a diagram illustrating an example of time domain resource allocation according to subcarrier spacing of a data channel and a control channel in a wireless communication system, according to an embodiment of the present disclosure.

Referring to FIG. 8, in a case 8-00 ($\mu_{PDSCH}=\mu_{PDCCH}$) where the subcarrier spacing of the data channel is the same as the subcarrier spacing of the control channel, the slot number for data is the same as the slot number for control. Therefore, the base station and the UE may know that a scheduling offset occurs in accordance with a predefined slot offset $K_0$. On the other hand, in a case 8-05 ($\mu_{PDSCH}\neq\mu_{PDCCH}$) where the subcarrier spacing of the data channel is different from the subcarrier spacing of the control channel, the slot number for data is different from the slot number for control. Therefore, the base station and the UE may know that a scheduling offset occurs in accordance with a predefined slot offset $K_0$ with respect to the subcarrier spacing of the PDCCH.

Next, a network configuration for dual connectivity (DC) will be described. In general, communication in a low frequency band may achieve greater coverage than in a high frequency band due to relatively low path attenuation. On the other hand, communication in a high frequency band may use a wider bandwidth than in a low frequency band. Therefore, a system may be configured so that a UE connects to both a base station using a low frequency band f1 and a base station using a high frequency band f2, receives control information and system information in which coverage is important at f1, and receives high-capacity data and data related to ultra-low latency services at f2. The operation of the UE described above is referred to as DC. At this time, the UE receives, for example, upper layer configuration information for initial access and DC in the frequency band f1, and a cell group to which the base station operating in the frequency band f1 belongs is referred to as a master cell group (MCG). Next, the UE performs random access in the frequency band f2 based on the upper layer configuration information, and becomes a DC state in which data may be transmitted and received even in the frequency band f2. In this case, a cell group to which the base station operating in the frequency band f2 belongs is referred to as a secondary cell group (SCG). For convenience of explanation, a description has been focused on a case where the base station in the frequency band f1 belongs to the MCG and the base station in the frequency band f2 belongs to the SCG, but this is only an example. In another embodiment, for example, the above description is equally applicable even to a case where the base station in the frequency band f2 belongs to the MCG and the base station in the frequency band f1 belongs to the SCG.

Table 16 shows a simplified example of an abstract syntax notation (ASN. 1) structure, which is an upper layer configuration structure for the MCG or the SCG that the base station transmits to the UE.

TABLE 16

| |
| --- |
| Serving cell group<br>0> CellGroupConfig<br>1> mac-CellGroupConfig<br>2> drx-Config<br>2> ...<br>1> PhysicalCellGroupConfig<br>1> spCellConfig<br>2> servCellIndex<br>2> spCellConfigDedicated <-- ServingCellConfig<br>2> ...<br>1> sCellToAddModList (list of SCellConfig)<br>2> SCellConfig<br>3> sCellIndex<br>3> sCellConfigDedicated <-- ServingCellConfig<br>3> sCellConfigCommon<br>3> ... |

As described above, the cell group includes one special cell (SpCell) and zero or more secondary cells (SCells). The SpCell refers to a serving cell in which the UE performs initial access or random access for establishing a connection to the corresponding cell group. The SpCell of the MCG is referred to as a PCell, and the SpCell of the SCG is referred to as a PSCell. A serving cell index corresponding to the SpCell of the cell group may be indicated in a servCellIndex parameter, and a ServingCellConfig IE, which is a detailed configuration parameter of the SpCell, may be indicated in spCellConfigDedicated. Also, the SCell refers to a serving cell in which the UE may additionally transmit and receive data besides the SpCell. A serving cell index sCellIndex of the SCell and a detailed configuration parameter ServingCellConfig IE and/or ServingCellConfigCommon IE of the SCell may be indicated in sCellConfigDedicated and sCellConfigCommon, respectively. An example of the ASN.1 structure for the ServingCellConfig IE is shown in Table 17.

TABLE 17

```
Serving cell (SpCell or SCell)
    2> ServingCellIndex
    2> ServingCellConfig
        3> physCellld
        3> downlink
            4> ARFCN ·
            4> PDSCH-ServingCellConfig
                5> pucch-Cell
            4> BWP
                5> PDCCH-Config
                5> PDSCH-Config
        3> uplink
            4> ARFCN
            4> BWP
                5> PUCCH-Config
                5> PUSCH-Config
                5> SRS-Config
                5> RACH-Config
        3> CSI-MeasConfig
            4> CSI-ReportConfig
            4> CSI-ResourceConfig
            4> CSI-RS-ResourceSet
            4> aperiodicTriggerStateList
            4> semiPersistentOnPUSCH-TriggerStateList
```

Next, the AL will be described. The base station and/or the UE may transmit and receive DL and/or UL signals on multiple carriers through the AL.

Figure 9:
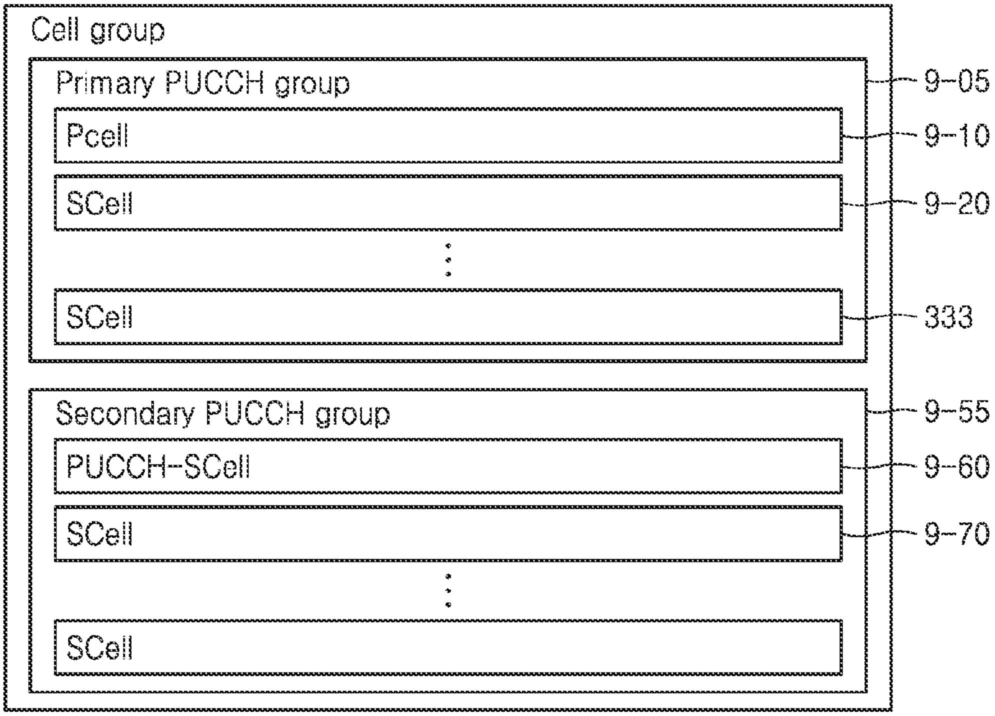
FIG. 9 is a diagram for describing an example of types of carriers configurable in a cell group and types of transmittable channels for each carrier.

FIG. 9 is a diagram for describing an example of types of carriers configurable in a cell group and types of transmittable channels for each carrier. In Rel-15 NR, whether DL and UL transmissions are possible for each carrier may be configured. That is, a specific carrier may be configured to transmit both DL and UL channels, and a specific carrier may be configured to transmit only a DL or UL channel. Also, the type of channel to be transmitted and received in each of the DL and the UL may be different depending on the type of carrier. For example, in the Rel-15 NR, a PUSCH may be transmitted on all carriers in which UL transmission is configured, but a PUCCH may be transmitted only on a specific carrier. The specific carrier may be a PCell or a PUCCH-SCell. The PUCCH-SCell refers to a serving cell that is a SCell configured with an upper layer to enable PUCCH transmission. A maximum of one PUCCH-SCell may be configured in a cell group, and a PUCCH-SCell may not be configured. When a PUCCH-SCell is configured, it is necessary to indicate on which UL carrier of the PCell and the PUCCH-SCell a PUCCH for hybrid automatic repeat request-acknowledgement (HARQ-ACK) transmission of a PDSCH transmitted on each DL carrier is transmitted. This may be indicated by a pucch-Cell parameter in the PDSCH-ServingCellConfig of Table 17. When the pucch-Cell is not indicated, the HARQ-ACK of the DL carrier may be transmitted on the PCell. A group of carriers for transmitting HARQ-ACK on the PUCCH of the PCell is referred to as a primary PUCCH group (9-05), and the primary PUCCH group includes a PCell (9-10). Also, one or more SCells may be included in the primary PUCCH group (9-20). Next, a group of carriers for transmitting HARQ-ACK on the PUCCH-SCell is referred to as a secondary PUCCH group (9-55), and the secondary PUCCH group may not be configured. When the secondary PUCCH group is configured, the secondary PUCCH group includes one PUCCH-SCell (9-60). Also, one or more SCells may be included in the secondary PUCCH group (9-70).

The term "carrier" used in the embodiments described above and embodiments described below may be used interchangeably with other terms. For example, the term "carrier" may be used interchangeably with a cell, a serving cell, a component carrier (CC), etc., and all the terms described above may have the same meaning.

The NR has a channel state information (CSI) framework for indicating the base station to measure and report CSI of the UE. The CSI framework of the NR may include at least two elements, that is, resource setting and report setting. The report setting may have a connection relationship with each other by referring to at least one ID of the resource setting.

According to an embodiment of the present disclosure, the resource setting may include information relating to a reference signal (RS) for the UE to measure CSI. The base station may configure at least one resource setting for the UE. As an example, the base station and the UE may exchange signaling information shown in [Table 18] in order to transmit information relating to the resource setting.

TABLE 18

```
-- ASN1START
-- TAG-CSI-RESOURCECONFIG-START
CSI-ResourceConfig ::=        SEQUENCE {
    csi-ResourceConfigId              CSI-ResourceConfigId,
    csi-RS-ResourceSetList            CHOICE {
        nzp-CSI-RS-SSB                    SEQUENCE {
            nzp-CSI-RS-ResourceSetList SEQUENCE (SIZE (1..maxNrofNZP-CSI-
RS- ResourceSetsPerConfig)) OF NZP-CSI-RS-ResourceSetId
OPTIONAL, -- Need R
            csi-SSB-ResourceSetList SEQUENCE (SIZE (1..maxNrofCSI-SSB-
ResourceSetsPerConfig)) OF CSI-SSB-ResourceSetId
OPTIONAL -- Need R
        },
        csi-IM-ResourceSetList            SEQUENCE (SIZE (1..maxNrofCSI-IM-
ResourceSetsPerConfig)) OF CSI-IM-ResourceSetId
        },
        bwp-Id                    BWP-Id,
    resource Type                     ENUMERATED { aperiodic, semiPersistent, periodic },
...
}
-- TAG-CSI-RESOURCECONFIG-STOP
-- ASN1STOP
```

In [Table. 18], signaling information CSI-ResourceConfig includes information relating to each resource setting. According to the signaling information, each resource setting may include a resource setting index (csi-ResourceConfigId), a BWP index (bwp-ID), time domain transmission configuration of a resource (resourceType), or a resource set list (csi-RS-ResourceSetList) including at least one resource set. The time domain transmission configuration of the resource may be configured as aperiodic transmission, semi-persistent transmission, or periodic transmission. The resource set list may be a set including resource sets for channel measurement or a set including resource sets for interference measurement. When the resource set list is a set including resource sets for channel measurement, each resource set may include at least one resource, and the at least one resource may be an index of a CSI-RS resource or a SS/PBCH block (SSB). When the resource set list is a set including resource sets for interference measurement, each resource set may include at least one interference measurement resource (CSI interference measurement, CSI-IM).

For example, when the resource set includes a CSI-RS, the base station and the UE may exchange signaling information shown in [Table 19] in order to transmit information relating to the resource set.

TABLE 19

```
-- ASN1START
-- TAG-NZP-CSI-RS-RESOURCESET-START
NZP-CSI-RS-ResourceSet ::= SEQUENCE {
  nzp-CSI-ResourceSetId             NZP-CSI-RS-ResourceSetId,
  nzp-CSI-RS-Resources              SEQUENCE (SIZE (1..maxNrofNZP-CSI-RS-
ResourcesPerSet)) OF NZP-CSI-RS-ResourceId,
  repetition                        ENUMERATED { on, off }
OPTIONAL, -- Need S
  aperiodicTriggeringOffset         INTEGER(0..6)
OPTIONAL, -- Need S
  trs-Info                          ENUMERATED {true}
OPTIONAL, -- Need R
...
}
-- TAG-NZP-CSI-RS-RESOURCESET-STOP
-- ASN1STOP
```

In [Table. 19], the signaling information NZP-CSI-RS-ResourceSet includes information relating to each resource set. According to the signaling information, each resource set may include information relating to at least a resource set index (nzp-CSI-ResourceSetId) or an index set (nzp-CSI-RS-Resources) of the included CSI-RS, and may a part of information (repetition) relating to a spatial domain transmission filter of the included CSI-RS resource or whether the included CSI-RS resource is used for tracking (trs-Info).

The CSI-RS may be the most representative reference signal included in the resource set. The base station and the UE may exchange signaling information shown in [Table 20] in order to transmit information relating to the CSI-RS resource.

TABLE 20

```
-- ASN1START
-- TAG-NZP-CSI-RS-RESOURCE-START
NZP-CSI-RS-Resource ::=         SEQUENCE {
  nzp-CSI-RS-ResourceId           NZP-CSI-RS-ResourceId,
  resourceMapping                 CSI-RS-ResourceMapping,
  powerControlOffset              INTEGER (-8..15),
  powerControlOffsetSS              ENUMERATED{db-3, db0, db3, db6} OPTIONAL,
-- Need R
  scramblingID                    ScramblingId,
  periodicityAndOffset                  CSI-ResourcePeriodicityAndOffset OPTIONAL,
-- Cond PeriodicOrSemiPersistent
  qcl-InfoPeriodicCSI-RS              TCI-StateId                 OPTIONAL, --
Cond Periodic
  ...
}
-- TAG-NZP-CSI-RS-RESOURCE-STOP
-- ASN1STOP
```

In [Table. 20], the signaling information NZP-CSI-RS-Resource includes information relating to each CSI-RS. The information included in the signaling information NZP-CSI-RS-Resource may have the following meaning.

nzp-CSI-RS-ResourceId: CSI-RS resource index resourceMapping: resource mapping information of CSI-RS resource powerControlOffset: a ratio between PDSCH EPRE (Energy Per RE) and CSI-RS EPRE powerControlOffsetSS: a ratio between SS/PBCH block EPRE and CSI-RS EPRE scramblingID: a scrambling index of a CSI-RS sequence periodicityAndOffset: a transmission periodicity and a slot offset of a CSI-RS resource qcl-InfoPeriodicCSI-RS: TCI-state information when a corresponding CSI-RS is a periodic CSI-RS resourceMapping included in the signaling information NZP-CSI-RS-Resource may indicate resource mapping information of a CSI-RS resource, and may include RE mapping for frequency resources, the number of ports, symbol mapping, CDM type, frequency resource density, and frequency band mapping information. The number of ports, frequency resource density, CDM type, and time-frequency domain RE mapping, which may be configured through resourceMapping, may each have a determined value in one of the rows shown in [Table 21].

TABLE 21

| Row | Ports X | Density ρ | cdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0\ 2 + l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0 ,1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0,)$ $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1),$ $(k_0, l_1), (k_1, l_1), (k_2, l_1), (k_0, l_1 + 1), (k_1, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2 | $(k_0, l_0), (k_1, l_0), (k_2, l_0), (k_0, l_1), (k_1, l_1), (k_2, l)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0,) (k_0, l_1), (k_1, l_1),$ $(k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1 2, 3 |

[Table 21] shows a frequency resource density configurable according to the number (X) of CSI-RS ports, CDM type, frequency and time domain starting positions $(\bar{k}, \bar{l})$, of a CSI-RS component RE pattern, and the number (k') of frequency domain REs and the number (l') of time domain REs of a CSI-RS component RE pattern. The CSI-RS component RE pattern may be a basic unit configuring a CSI-RS resource. The CSI-RS component RE pattern may be configured by YZ REs through Y (=1+max(k')) frequency domain REs and Z (=1+max(l')) time domain REs. When the number of CSI-RS ports is 1, a position of a CSI-RS RE may be designated in a PRB without restriction on subcarriers, and may be designated by a bitmap having 12 bits. When the number of CSI-RS ports is {2, 4, 8, 12, 16, 24, 32} and Y is equal to 2, a position of a CSI-RS RE may be designated at every two subcarriers in a PRB, and may be designated by a bitmap having 6 bits. When the number of CSI-RS ports is 4 and Y is equal to 4, a position of a CSI-RS RE may be designated at every four subcarriers in a PRB, and may be designated by a bitmap having 3 bits. Similarly, a position of a time domain RE may be designated by a bitmap having a total of 14 bits. In this case, according to a Z value shown in [Table 21], the length of the bitmap may be changed like a frequency position designation. However, the principle thereof is similar to the above description, and therefore, a redundant description thereof is omitted hereinafter.

According to an embodiment of the present disclosure, the report setting may have a connection relationship with each other by referring to at least one ID of the resource setting. The resource setting(s) having a connection relationship with the report setting provides configuration information including information relating to a reference signal for measuring channel information. When the resource setting(s) having a connection relationship with the report setting is used for measuring channel information, the measured channel information may be used for reporting channel information according to a reporting method configured in the report setting having the connection relationship.

According to an embodiment of the present disclosure, the report setting may include configuration information relating to the CSI reporting method. As an example, the base station and the UE may exchange signaling information shown in [Table 22] in order to transmit information relating to the resource setting.

TABLE 22

```
-- ASN1START
-- TAG-CSI-REPORTCONFIG-START
CSI-ReportConfig ::=                SEQUENCE {
  reportConfigId                        CSI-ReportConfigId,
  carrier                               ServCellIndex          OPTIONAL, -- Need S
  resourcesForChannelMeasurement            CSI-ResourceConfigId,
  csi-IM-ResourcesForInterference CSI-ResourceConfigId OPTIONAL, -- Need R
```

TABLE 22-continued

```
  nzp-CSI-RS-ResourcesForInterference              CSI-ResourceConfigId OPTIONAL,
-- Need R
  reportConfig Type                             CHOICE {
    periodic                                             SEQUENCE {
      reportSlotConfig                          CSI-ReportPeriodicityAndOffset,
      pucch-CSI-ResourceList                                  SEQUENCE (SIZE
(1..maxNrofBWPs)) OF PUCCH-CSI-Resource
    },
    semiPersistentOnPUCCH                                  SEQUENCE {
      reportSlotConfig                                   CSI-ReportPeriodicityAndOffset,
      pucch-CSI-ResourceList                                  SEQUENCE (SIZE
(1..maxNrofBWPs)) OF PUCCH-CSI-Resource
    },
    semiPersistentOnPUSCH                                  SEQUENCE {
      reportSlotConfig                                        ENUMERATED {sl5, sl10,
sl20, sl40, sl80, sl160, sl320},
      reportSlotOffsetList                      SEQUENCE (SIZE (1..maxNrofUL-
Allocations)) OF INTEGER(0..32),
      p0alpha                                                  P0-PUSCH-AlphaSetId
    },
    aperiodic                                            SEQUENCE {
      reportSlotOffsetList                          SEQUENCE (SIZE (1..maxNrofUL-
Allocations)) OF INTEGER(0..32)
    }
  },
  reportQuantity                                CHOICE {
    none                                                      NULL,
    cri-RI-PMI-CQI                                        NULL,
    cri-RI-i1                                            NULL,
    cri-RI-i1-CQI                                        SEQUENCE {
      pdsch-BundleSizeForCSI                                    ENUMERATED {n2, n4}
OPTIONAL -- Need S
    },
    cri-RI-CQI                                           NULL,
    cri-RSRP                                                 NULL,
    ssb-Index-RSRP                                            NULL,
    cri-RI-LI-PMI-CQI                                  NULL
  },
  reportFreqConfiguration                       SEQUENCE {
    cqi-FormatIndicator            ENUMERATED { widebandCQI, subbandCQI }
OPTIONAL, -- Need R
    pmi-FormatIndicator              ENUMERATED { widebandPMI, subbandPMI }
OPTIONAL, -- Need R
    csi-ReportingBand                                    CHOICE {
      subbands3                                                  BIT STRING(SIZE(3)),
      subbands4                                                  BIT STRING(SIZE(4)),
      subbands5                                                  BIT STRING(SIZE(5)),
      subbands6                                                  BIT STRING(SIZE(6)),
      subbands7                                                  BIT STRING(SIZE(7)),
      subbands8                                                  BIT STRING(SIZE(8)),
      subbands9                                                  BIT STRING(SIZE(9)),
      subbands10                                                 BIT STRING(SIZE(10)),
      subbands11                                                 BIT STRING(SIZE(11)),
      subbands12                                                 BIT STRING(SIZE(12)),
      subbands13                                                 BIT STRING(SIZE(13)),
      subbands14                                                 BIT STRING(SIZE(14)),
      subbands15                                                 BIT STRING(SIZE(15)),
      subbands16                                                 BIT STRING(SIZE(16)),
      subbands17                                                 BIT STRING(SIZE(17)),
      subbands18                                                 BIT STRING(SIZE(18)),
      ...,
      subbands19-v1530                                           BIT STRING(SIZE(19))
    } OPTIONAL -- Need S
  }
OPTIONAL, -- Need R
  timeRestrictionForChannelMeasurements                      ENUMERATED {configured,
notConfigured},
  timeRestrictionForInterferenceMeasurements               ENUMERATED {configured,
notConfigured},
  codebookConfig                                                 CodebookConfig
OPTIONAL, -- Need R
  dummy                                                         ENUMERATED {n1, n2}
OPTIONAL, -- Need R
  groupBasedBeamReporting                              CHOICE {
    enabled                                                  NULL,
    disabled                                              SEQUENCE {
      nrofReportedRS                                         ENUMERATED {n1, n2, n3,
n4}                                 OPTIONAL              -- Need S
    }
  },
```

TABLE 22-continued

```
  cqi-Table                ENUMERATED {table1, table2, table3, spare1}
OPTIONAL, -- Need R
  subbandSize                ENUMERATED {value1, value2},
  non-PMI-PortIndication SEQUENCE (SIZE (1..maxNrofNZP-CSI-RS-
ResourcesPerConfig)) OF PortIndexFor8Ranks OPTIONAL, -- Need R
  ...,
  [[
  semiPersistentOnPUSCH-v1530               SEQUENCE {
    reportSlotConfig-v1530                       ENUMERATED {sl4, si8, sl16}
  }
OPTIONAL -- Need R
  ]]
}
```

In [Table. 22], signaling information CSI-ResourceConfig includes information relating to each resource setting. The information included in the signaling information CSI-ReportConfig may have the following meaning.

reportConfigid: report setting index carrier: serving cell index resourcesForChannelMeasurement: resource setting index for channel measurement having connection relationship with report setting csi-IM-ResourcesForInterference: resource setting index having CSI-IM resource for interference measurement having connection relationship with report setting nzp-CSI-RS-ResourcesForInterference: resource setting index having CSI-RS resource for interference measurement having connection relationship with report setting reportConfigType: indicates a time domain transmission configuration and a transmission channel of a channel report, and may have aperiodic transmission, semi-persistent physical uplink control channel (PUCCH) transmission, semi-periodic PUSCH transmission, or periodic transmission configuration.

reportQuantity: indicates a type of channel information to be reported, and may have types of channel information ('cri-RI-PMI-CQI', 'cri-RI-i1', 'cri-RI-i1-CQI', 'cri-RI-CQI', 'cri-RSRP', 'ssb-Index-RSRP', and 'cri-RI-LI-PMI-CQI') when not transmitting channel report ('none') and when transmitting channel report. Elements included in the type of the channel information refer to a channel quality indicator (CQI), a precoding matric indicator (PMI), a CSI-RS resource indicator (CRI), a SS/PBCH block resource indicator (SSBRI), a layer indicator (LI), a rank indicator (RI), and/or L1-reference signal received power (RSRP).

reportFreqConfiguration: indicates whether channel information to be reported includes only information relating to a wideband or information relating to each subband, and may have configuration information relating to the subband including the channel information when information relating to each subband is included.

timeRestrictionForChannelMeasurements: the presence or absence of time domain restriction for reference signal for channel measurement among reference signals referenced by channel information to be reported.

timeRestrictionForinterferenceMeasurements: the presence or absence of time domain restriction for reference signal for interference measurement among reference signals referenced by channel information to be reported.

codebookConfig: codebook information referenced by channel information to be reported groupBasedBeamReporting: presence or absence of beam grouping in channel report cqi-Table: CQI table index referenced by channel information to be reported subbandSize: index indicating the subband size of channel information non-PMI-PortIndication: port mapping information referenced when reporting non-PMI channel information When the base station indicates a channel information report through higher layer signaling or L1 signaling, the UE may perform the channel information report by referring to the configuration information included in the indicated report setting.

The base station may indicate a CSI report to the UE through higher layer signaling including RRC signaling or MAC CE signaling, or L1 signaling (e.g., common DCI, group-common DCI, UE-specific DCI, etc.).

For example, the base station may indicate an aperiodic channel information report (CSI report) to the UE through higher layer signaling or DCI using DCI format 0_1. The base station may set a parameter for the aperiodic CSI report of the UE or a plurality of CSI report trigger states including a parameter for the CSI report through higher layer signaling. The parameter for the CSI report or the CSI report trigger state may include types of channel information including a slot interval between a PDCCH including DCI and a PUSCH including a CSI report, and aggregation including possible slot intervals, a reference signal ID for channel state measurement. When the base station indicates some of CSI report trigger states the UE through DCI, the UE may report channel information according to CSI report configuration of the report setting configured in the indicated CSI report trigger state. The channel information report may be performed through a PUSCH scheduled in DCI format 0_1. The time domain resource allocation of the PUSCH including the CSI report of the UE may be performed through a slot interval with a PDCCH indicated through DCI, a start symbol and a symbol length indication within a slot for time domain resource allocation of a PUSCH, and the like. For example, the position of the slot, in which the PUSCH including the CSI report of the UE is transmitted, may be indicated through the slot interval with the PDCCH indicated through DCI, and the start symbol and the symbol length in the slot may be indicated through the time domain resource assignment field of the DCI described above.

For example, the base station may indicate a semi-persistent CSI report transmitted on the PUSCH to the UE through DCI using DCI format 0_1. The base station may activate or deactivate the semi-persistent CSI report transmitted on the PUSCH through DCI scrambled by SP-CSI-RNTI. When the semi-persistent CSI report is activated, the UE may periodically report channel information according to the configured slot interval. When the semi-persistent CSI report is deactivated, the UE may stop the activated periodic channel information report. The base station may set, through higher layer signaling, a parameter for the semi-persistent CSI report of the UE or a plurality of CSI report trigger states including the parameter for the semi-persistent CSI report. The parameter for the CSI report or the CSI report trigger states may include the slot interval between the PDCCH including the DCI indicating the CSI report and the PUSCH including the CSI report, the aggregation including possible slot intervals, the slot interval between the slot in which higher layer signaling indicating the CSI report is activated and the PUSCH including the CSI report, the slot interval periodicity of the CSI report, and the type of the included channel information. When the base station activates some CSI report trigger states or some report settings to the UE through higher layer signaling or DCI, the UE may report channel information according to the report setting included in the indicated CSI report trigger state or the CSI report setting configured in the activated report setting. The channel information report may be performed through a PUSCH semi-persistently scheduled in DCI format 0_1 scrambled by SP-CSI-RNTI. The time domain resource allocation of the PUSCH including the CSI report of the UE may be performed through the slot interval periodicity of the CSI report, the slot interval with the slot in which higher layer signaling is activated or the slot interval with the PDCCH indicated through DCI, the start symbol and the symbol length indication in the slot for time domain resource allocation of the PUSCH, or the like. For example, the position of the slot, in which the PUSCH including the CSI report of the UE is transmitted, may be indicated through the slot interval with the PDCCH indicated through DCI, and the start symbol and the symbol length in the slot may be indicated through the time domain resource assignment field of DCI format 0_1 described above.

For example, the base station may indicate a semi-persistent CSI report transmitted on the PUCCH to the UE through higher layer signaling, such as MAC-CE. The base station may activate or deactivate the semi-persistent CSI report transmitted on the PUCCH through the MAC-CE signaling. When the semi-persistent CSI report is activated, the UE may periodically report channel information according to the configured slot interval. When the semi-persistent CSI report is deactivated, the UE may stop the activated periodic channel information report. The base station sets a parameter for the semi-persistent CSI report of the UE through higher layer signaling. The parameter for the CSI report may include the PUCCH resource on which the CSI report is transmitted, the slot interval periodicity of the CSI report, the type of the included channel information, and the like. The UE may transmit the CSI report on the PUCCH. Alternatively, when the PUCCH for the CSI report overlaps the PUSCH, the CSI report may be transmitted on the PUSCH. The position of the slot, in which the PUCCH including the CSI report is transmitted, may be indicated through the slot interval periodicity of the CSI report configured through higher layer signaling and the slot interval between the slot in which higher layer signaling is activated and the PUCCH including the CSI report, and the start symbol and the symbol length in the slot may be indicated through the start symbol and the symbol length to which the PUCCH resource configured through higher layer signaling is allocated.

For example, the base station may indicate the periodic CSI report to the UE through higher layer signaling. The base station may activate or deactivate the periodic CSI report through higher layer signaling including RRC signaling. When the periodic CSI report is activated, the UE may periodically report channel information according to the configured slot interval. When the periodic CSI report is deactivated, the UE may stop the activated periodic channel information report. The base station may configure the report setting including the parameter for the periodic CSI report of the UE through higher layer signaling. The parameter for the CSI report may include the PUCCH resource configuration for the CSI report, the slot interval between the slot in which higher layer signaling indicating the CSI report is activated and the PUCCH including the CSI report, the slot interval periodicity of the CSI report, the reference signal ID for channel state measurement, the type of the included channel information, and the like. The UE may transmit the CSI report on the PUCCH. Alternatively, when the PUCCH for the CSI report overlaps the PUSCH, the CSI report may be transmitted on the PUSCH. The position of the slot, in which the PUCCH including the CSI report is transmitted, may be indicated through the slot interval periodicity of the CSI report configured through higher layer signaling and the slot interval between the slot in which higher layer signaling is activated and the PUCCH including the CSI report, and the start symbol and the symbol length in the slot may be indicated through the start symbol and the symbol length to which the PUCCH resource configured through higher layer signaling is allocated.

When the base station indicates the aperiodic CSI report or the semi-persistent CSI report to the UE through DCI, it is possible to determine whether the UE is able to perform a valid channel report through the indicated CSI report, based on a CSI computation time required for the CSI report. For the aperiodic CSI report or the semi-persistent CSI report indicated through DCI, the UE may perform a valid CSI report from an UL symbol after Z symbols from the end of the last symbol included in the PDCCH including the DCI indicating the CSI report. The Z symbols described above may be changed according to the numerology of the DL BWP corresponding to the PDCCH including the DCI indicating the CSI report, the numerology of the UL BWP corresponding to the PUSCH transmitting the CSI report, and the types or characteristics of channel information reported in the CSI report (report quantity, frequency band granularity, the number of ports of the reference signal, the codebook type, etc.). In other words, in order for a certain CSI report to be determined as a valid CSI report (in order for a corresponding CSI report to be a valid CSI report), UL transmission of the corresponding CSI report has not to be performed before a Zref symbol including timing advance. In this case, the Zref symbol is an UL symbol that starts a cyclic prefix (CP) after a time $T_{proc,CSI}=(Z)(2048+144)\cdot\kappa 2^{-1}\cdot T_C$ from the moment the last symbol of the triggering PDCCH ends. A detailed value of Z is the same as described below and $T_c=1/(\Delta f_{max}\cdot N_f)$, $\Delta f_{max}=480\cdot 10^3$ Hz, $N_f=4096$, $\kappa=64$, and are numerology. In this case, may be pre-arranged to use a value causing the greatest $T_{proc,CSI}$ value among $(\mu_{PDCCH},\mu_{CSI\text{-}RS},\mu_{UL})$, $\mu_{PDCCH}$ may refer to subcarrier spacing used for PDCCH transmission, $\mu_{CSI\text{-}RS}$ may refer to subcarrier spacing used for CSI-RS transmission, and $\mu_{UL}$ may refer to subcarrier spacing of an UL channel used for UL control information (UCI) transmission for CSI reporting. As another example, μ may be pre-arranged to use a value causing the greatest $T_{proc,CSI}$ value among $(\mu_{PDCCH},\mu_{UL})$. The definitions of $\mu_{PDCCH}$ and $\mu_{UL}$ are the same as described above. For convenience of description below, satisfying the above condition is referred to as satisfying CSI reporting validity condition 1.

Also, when the reference signal for channel measurement with respect to the aperiodic CSI report indicated to the UE through DCI is an aperiodic reference signal, the UE may perform a valid CSI report from a UL symbol after Z' symbols from the end of the last symbol including the reference signal. The Z' symbols described above may be changed according to the numerology of the DL BWP corresponding to the PDCCH including the DCI indicating the CSI report, the numerology of the bandwidth corresponding to the reference signal for channel measurement with respect to the CSI report, the numerology of the UL BWP corresponding to the PUSCH transmitting the CSI report, and the types or characteristics of channel information reported in the CSI report (report quantity, frequency band granularity, the number of ports of the reference signal, the codebook type, etc.). In other words, in order for a certain CSI report to be determined as a valid CSI report (in order for a corresponding CSI report to be a valid CSI report), UL transmission of the corresponding CSI report has not to be performed before a Zref' symbol including timing advance. In this case, the Zref symbol is an UL symbol that starts a CP after a time $T'_{proc,CSI}=(Z')(2048+144)\cdot\kappa 2^{-\mu}\cdot T_C$ from the moment the last symbol of the aperiodic CSI-RS or the aperiodic CSI-IM triggered by the triggering PDCCH ends. A detailed value of Z' is the same as described below and $T_c=1/(\Delta f_{max}\cdot N_f)$, $\Delta f_{max}=480\cdot 10^3$ Hz, $N_f=4096$, $\kappa=64$ and $\mu$ are numerology. In this case, $\mu$ may be pre-arranged to use a value causing the greatest $T_{proc,CSI}$ value among ($\mu_{PDCCH}$, $\mu_{CSI-RS}$, $\mu_{UL}$), $\mu_{PDCCH}$ may refer to subcarrier spacing used for triggering PDCCH transmission, $\mu_{CSI-RS}$ may refer to subcarrier spacing used for CSI-RS transmission, and $\mu_{UL}$ may refer to subcarrier spacing of an UL channel used for UCI transmission for CSI reporting. As another example, $\mu$ may be pre-arranged to use a value causing the greatest $T_{proc,CSI}$ value among ($\mu_{PDCCH}$, $\mu_{UL}$). In this case, the definitions of $\mu_{PDCCH}$ and $\mu_{UL}$ are the same as described above. For convenience of descriptions below, satisfying the above condition is referred to as satisfying CSI reporting validity condition 2.

When the base station indicates the aperiodic CSI report for the aperiodic reference signal to the UE through DCI, the UE may perform valid CSI reporting from the first UL symbol satisfying both the time point after Z symbols from the end of the last symbol included in the PDCCH including the DCI indicating the CSI report and the time point after Z' symbols from the end of the last symbol including the reference signal. That is, in the case of the aperiodic CSI reporting based on the aperiodic reference signal, the CSI report is determined as valid when both CSI reporting validity conditions 1 and 2 are satisfied.

When the CSI report time point indicated by the base station does not satisfy the CSI computation time requirement, the UE may determine that the CSI report is not valid and may not consider the channel information state update for the CSI report.

The Z and Z' symbols for the CSI computation time calculation may follow [Table 23] and [Table 24] below. For example, the Z and Z' symbols may follow $Z_1$, $Z_1$' values shown in [Table 24] when the channel information to be reported in the CSI report includes only wideband information, the number of ports of the reference signal is 4 or less, the reference signal resource is one, the codebook type is 'typeI-SinglePanel', or the type of channel information to be reported (report quantity) is 'cri-RI-CQI'. This will be referred to as delay requirement 2. In addition, the Z and Z' symbols follow $Z_1$, $Z_1$' values shown in [Table 23] when the PUSCH including the CSI report does not include TB or HARQ-ACK and the CSI processing unit (CPU) occupation of the UE is 0. This will be referred to as delay requirement 1. The CPU occupation is described in detail below. In addition, the Z and Z' symbols follow $Z_3$, $Z_3$' values shown in [Table 24] when the report quantity is 'cri-RSRP' or 'ssb-Index-RSRP'. In [Table 24], $X_1$, $X_2$, $X_3$, and $X_4$ refer to the UE capability for the beam report time, and $KB_1$ and $KB_2$ refer to the UE capability for the beam change time. When not corresponding to the types or characteristics of the channel information reported in the CSI report, the Z and Z' symbols follow the $Z_2$, $Z_2$' values shown in [Table 24].

TABLE 23

| | $Z_1$ [symbols] | |
|---|---|---|
| μ | $Z_1$ | $Z'_1$ |
| 0 | 10 | 8 |
| 1 | 13 | 11 |
| 2 | 25 | 21 |
| 3 | 43 | 36 |

TABLE 24

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3 + KB_1$) | $X_3$ |
| 3 | 97 | 85 | 152 | 140 | min(97, $X_4 + KB_2$) | $X_4$ |

When the base station indicates the aperiodic/semi-persistent/periodic CSI report to the UE, the CSI reference resource may be configured to determine the reference time and frequency for the channel to be reported in the CSI report. The frequencies of the CSI reference resource may be carrier and subband information for measuring CSI, which is indicated in the CSI report configuration, and these may correspond to carrier and reportFreqConfiguration in [Table 22], respectively. The time of the CSI reference resource may be defined based on the time at which the CSI report is transmitted. For example, when CSI report #X is indicated to be transmitted in an UL slot n' of a carrier and a BWP on which the CSI report is to be transmitted, the time of the CSI reference resource of CSI report #X may be defined as a DL slot n-nCSI-ref of a CSI measurement carrier and BWP. The DL slot n is calculated as $$n = \lfloor n' \cdot 2^{\mu_{DL}} / 2^{\mu_{DL}} \rfloor$$

when the numerology of the CSI measurement carrier and BWP is referred to as $\mu_{DL}$ and the numerology of the carrier and BWP on which CSI report #X is transmitted is referred to as $\mu_{UL}$. In a case in which CSI report #X to be transmitted in UL slot n' is the semi-persistent or periodic CSI report, $n_{CSI-ref}$, which is the slot interval between the DL slot n and the CSI reference signal, may follow $n_{CSI-ref}=4\cdot 2^{\mu_{DL}}$ when a single CSI-RS/SSB resource is connected to the CSI report and may follow $n_{CSI-ref}=5\cdot 2^{\mu_{DL}}$ when multiple CSI-RS/SSB resources are connected to the CSI report, according to the number of CSI-RS/SSB resources for channel measurement. When CSI report #X to be transmitted in UL slot n' is the aperiodic CSI report, $$n_{CSI-ref}=\lfloor Z'/N_{symb}^{slot}\rfloor$$

may be calculated based on the CSI computation time Z' for channel measurement.

$$N_{symb}^{slot}$$

described above is the number of symbols included in one slot, and the NR assumes that $$N_{symb}^{slot}=14.$$

When the base station indicates the UE to transmit a certain CSI report in UL slot n' through higher layer signaling or DCI, the UE may report the CSI by performing channel measurement or interference measurement on a CSI-RS resource, a CSI-IM resource, or an SSB resource transmitted no later than the CSI reference resource slot of the CSI report to be transmitted in UL slot n' among CSI-RS resources, CSI-IM resources, or SSB resources, which are associated with the CSI report. The CSI-RS resources, the CSI-IM resources, or the SSB resources, which are associated with the CSI report, may refer to CSI-RS resources, CSI-IM resources, or SSB resources included in the resource set configured in the resource setting referenced by the report setting for the CSI report of the UE configured through higher layer signaling, CSI-RS resources, CSI-IM resources, or SSB resources referenced by the CSI report trigger state including the parameter for the CSI report, or CSI-RS resources, CSI-IM resources, or SSB resources indicated by the ID of the RS set.

In embodiments of the present disclosure, the CSI-RS/CSI-IM/SSB occasion may refer to a transmission time point of CSI-RS/CSI-IM/SSB resource(s) determined by higher layer configuration or a combination of higher layer configuration and DCI triggering. As one example, in the semi-persistent or periodic CSI-RS resource, the slot to be transmitted may be determined according to the slot periodicity and the slot offset configured through higher layer signaling, and intra-slot transmission symbol(s) may be determined with reference to one of the intra-slot resource mapping methods of [Table 21] according to resource mapping information (resourceMapping). As another example, in the aperiodic CSI-RS resource, the slot to be transmitted may be determined according to the slot offset with the PDCCH including the DCI indicating the channel report configured through higher layer signaling, and intra-slot transmission symbol(s) may be determined with reference to one of the intra-slot resource mapping methods of [Table 21] according to resource mapping information (resourceMapping).

The CSI-RS occasion described above may be determined by independently taking into account the transmission time point of each CSI-RS resource or comprehensively taking into account the transmission time of one or more CSI-RS resources included in the resource set. Accordingly, the following two interpretations are possible for the CSI-RS occasion according to each resource set configuration.

Interpretation 1-1: From the start time point of the earliest symbol to the end time point of the latest symbol, at which one specific resource is transmitted among one or more CSI-RS resources included in the resource set(s) configured in the resource setting referenced by the report setting configured for the CSI report.

Interpretation 1-2: From the start time point of the earliest symbol at which the CSI-RS resource transmitted at the earliest time point is transmitted to the end time of the latest symbol at which the CSI-RS resource transmitted at the latest time point is transmitted, among all CSI-RS resources included in the resource set(s) configured in the resource setting referenced by the report setting configured for the CSI report.

Hereinafter, embodiments of the present disclosure may be separately applied by taking into account both the two interpretations for the CSI-RS occasion. Also, both the two interpretations for the CSI-RS occasion may be taken into account for the CSI-IM occasion and the SSB occasion. However, because the principle thereof is similar to the above description, a redundant description thereof is omitted below.

In embodiments of the present disclosure, the CSI-RS/CSI-IM/SSB occasion for CSI report #X to be transmitted in 'UL slot n' may refer to a set of a CSI-RS occasion, a CSI-IM occasion, an SSB occasion not later than a CSI reference resource of CSI report #X to be transmitted in UL slot n' among CSI-RS occasions, CSI-IM occasions, and SSB occasions of CSI-RS resources, CSI-IM resources, and SSB resources included in the resource set configured in the resource setting referenced by the report setting configured for CSI report #X.

In embodiments of the present disclosure, the following two interpretations are possible for the latest CSI-RS/CSI-IM/SSB occasion among CSI-RS/CSI-IM/SSB occasions for CSI report #X to be transmitted in 'UL slot n'.

Interpretation 2-1: A set of occasions including the latest CSI-RS occasion among CSI-RS occasions for CSI report #X to be transmitted in UL slot n', the latest CSI-IM occasion among CSI-RS occasions for CSI report #X to be transmitted in UL slot n', and the latest SSB occasion among SSB occasions for CSI report #0 to be transmitted in UL slot n'.

Interpretation 2-2: The latest occasion among CSI-RS occasion, CSI-IM occasion, and SSB occasion for CSI report #X to be transmitted in UL slot n'.

Hereinafter, in embodiments of the present disclosure, the two interpretations for the latest CSI-RS/CSI-IM/SSB occasion among CSI-RS/CSI-IM/SSB occasions for CSI report #X to be transmitted in 'UL slot n' may be taken into account and applied separately. Also, in embodiments of the present disclosure, by taking into account the two interpretations (Interpretation 1-1 and Interpretation 1-2) for the CSI-RS occasion, the CSI-IM occasion, and the SSB occasion, "the latest CSI-RS/CSI-IM/SSB occasion among CSI-RS/CSI-IM/SSB occasions for CSI report #X to be transmitted in UL slot n" may be applied separately by taking into account four different interpretations (application of Interpretation 1-1 and Interpretation 2-1, application of Interpretation 1-1 and Interpretation 2-2, application of Interpretation 1-2 and Interpretation 2-1, and application of Interpretation 1-2 and Interpretation 2-2).

The base station may indicate the CSI report by taking into account the amount of channel information that the UE is able to simultaneously calculate for the CSI report, that is, the number of CPUs of the UE. When the number of CPUs that the UE is able to simultaneously calculate is $N_{CPU}$, the UE does not expect the CSI report indication of the base station that requires more channel information calculation than $N_{CPU}$, or may not take into account the update of channel information that requires more channel information calculation than $N_{CPU}$. The UE may report $N_{CPU}$ to the base station through higher layer signaling, or the base station may configure $N_{CPU}$ through higher layer signaling.

It is assumed that the CSI report indicated to the UE by the base station occupies all or part of the CPU for channel information calculation among the total number $N_{CPU}$ of channel information that the UE is able to calculate simultaneously. When the number of CPUs required for each CSI report, for example, CSI report $$n(n = 0, 1, \ldots , N-1) \text{ is } O_{CPU}^{(n)},$$

the number of CPUs required for a total of N CSI reports may be $$\sum_{n=0}^{N-1} O_{CPU}^{(n)}.$$

The channel information calculation unit required foreach reportQuantity configured in the CSI report may be set as shown in [Table 25] below.

TABLE 25

| |
|---|
| $O_{CPU}^{(n)} = 0$: A case where reportQuantity configured in CSI report is set to 'none', and trs-info is configured in CSI-RS resource set associated with CSI report |
| $O_{CPU}^{(n)} = 1$: A case where reportQuantity configured in CSI report is set to 'none', 'cri-RSRP', or 'ssb-Index-RSRP', and trs-info is not configured in CSI-RS resource set associated with CSI report |
| A case where reportQuantity configured in CSI report is set to 'cri-RI-PMI-CQI', 'cri-RI-i1', 'cri-RI-i1-CQI', 'cri-RI-CQI', or 'cri-RI-LI-PMI-CQI' |
| >> $O_{CPU}^{(n)} = N_{CPU}$: A case where aperiodic CSI report is triggered and the corresponding CSI report is not multiplexed with both or either of TB/HARQ-ACK, a case where the corresponding CSI report is wideband CSI, corresponds to maximum four CSI-RS ports, and corresponds to a single resource having no CRI report, and codebookType corresponds to 'type1-SinglePanel' or reportQuantity is 'cri-RI-CQI' (The corresponding case is a case corresponding to delay requirement 1 described above and may be regarded as a case where UE rapidly calculates CSI by using all available CPUs and then performs report.) |

TABLE 25-continued

| |
|---|
| >> $O_{CPU}^{(n)} = K_s$: In all cases other than the above cases, $K_s$ indicates the number of CSI-RS resource in CSI-RS resource set for channel measurement. |

When the number of channel information calculations required by the UE for multiple CSI reports at a specific time point is greater than the number $N_{CPU}$ of CPUs that the UE is able to calculate simultaneously, the UE may not take into account the update of channel information for some CSI reports. Among the indicated CSI reports, the CSI report that does not take into account the update of channel information may be determined by taking into account at least the time at which the channel information calculation required for the CSI report occupies the CPU and the priority of channel information to be reported. For example, the update of channel information for the CSI report that is started when the time at which the channel information calculation required for the CSI report occupies the CPU is the latest may not be taken into account, and the update of channel information may not be preferentially taken into account for the report having a low priority of channel information.

The priority of the channel information may be determined with reference to [Table 26] below.

TABLE 26

| |
|---|
| CSI priority value $Pri_{iCSI}(y,k,c,s) = 2 \cdot N_{cells} \cdot M_s \cdot y + N_{cells} \cdot M_s \cdot k + M_s \cdot c + s$, y=0 The case of aperiodic CSI report transmitted on PUSCH, y=1 The case of semi-persistent CSI report transmitted on PUSCH, y=2 The case of semi-persistent CSI report transmitted on PUCCH y=3 The case of periodic CSI report transmitted on PUCCH; |
| k=0 A case where CSI report includes L1-RSRP, k=1 A case where CSI report does not include L1-RSRP; |
| c: Serving cell index, $N_{cells}$: Maximum number (maxNrofServingCells) of serving cells configured through higher layer signaling; |
| s: CSI report configuration index (reportConfigID), $M_s$: maximum number (maxNrofCSI- ReportConfiguration) of CSI report configurations configured through higher layer signaling. |

The CSI priority for the CSI report may be determined through the priority value $Pri_{iCSI}(y,k,c,s)$ in [Table 26]. Referring to [Table 26], the CSI priority value may be determined through the type of channel information included in the CSI report, the time domain report characteristics (aperiodic, semi-persistent, or periodic) of the CSI report, the channel (PUSCH or PUCCH) on which the CSI report is transmitted, the serving cell index, and the CSI report configuration index. The CSI priority for the CSI report is determined through comparison of the priority value $Pri_{iCSI}(y,k,c,s)$. It is determined that the CSI priority for a CSI report with a small priority value is high.

When the time at which the channel information calculation required for the CSI report indicated to the UE by the base station occupies the CPU is the CPU occupation time, the CPU occupation time may be determined by taking into account all or part of the type of channel information included in the CSI report (report quantity), the time domain characteristics (aperiodic, semi-persistent, or periodic) of the CSI report, the slot or symbol occupied by higher layer signaling or DCI indicating the CSI report, or the slot or symbol occupied by the reference signal for channel state measurement.

Figure 10:
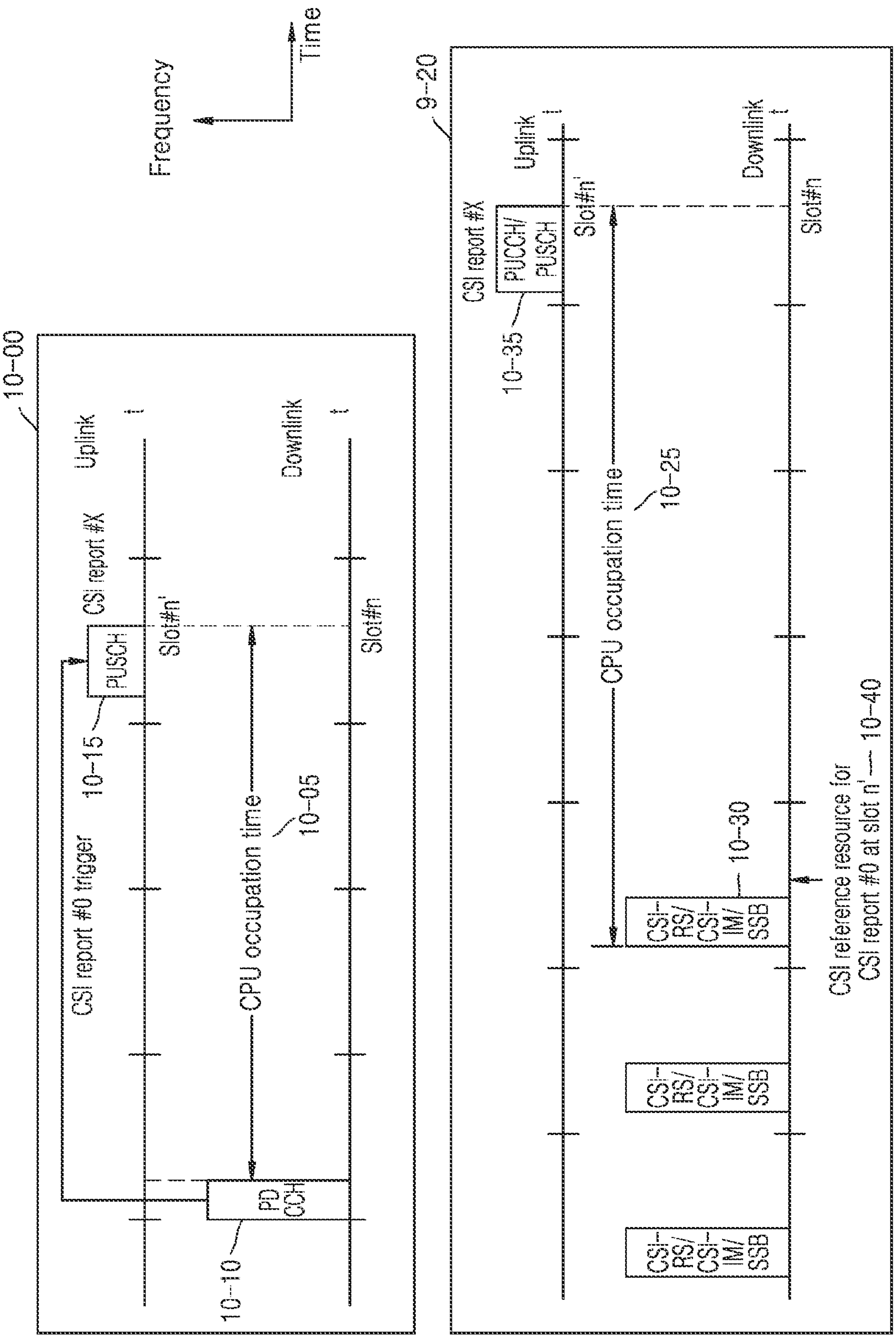
FIG. 10 is a diagram illustrating an example of a channel state information (CSI) processing unit (CPU) occupation time for a CSI report in which a report quantity included in the CSI report is not set to 'none', according to an embodiment of the present disclosure.

FIG. 10 is a diagram illustrating an example of the CPU occupation time for the CSI report in which the report quantity included in the CSI report is not set to 'none', according to an embodiment of the present disclosure.

10-00 of FIG. 10 is a diagram illustrating the CPU occupation time for the aperiodic CSI report in which the report quantity included in the CSI report is not set to 'none', according to an embodiment of the present disclosure. When the base station indicates aperiodic CSI report #X to the UE in UL slot n' through DCI using DCI format 0_1, a CPU occupation time 10-05 for CSI report #X to be transmitted in UL slot n' may be defined from a next symbol of a last symbol occupied by a PDCCH 10-10 including DCI indicating the aperiodic CSI report #X to the last symbol occupied by a PUSCH 10-15 including CSI report #X to be transmitted in UL slot n'.

10-20 of FIG. 10 is a diagram illustrating the CPU occupation time for the periodic or semi-persistent CSI report in which the report quantity included in the CSI report is not set to 'none', according to an embodiment of the present disclosure. When the base station indicates to transmit periodic or semi-persistent CSI report #X in UL slot n' through higher layer signaling or DCI using DCI format 0_1 scrambled by SP-CSI-RNTI, a CPU occupation time 10-25 for CSI report #X to be transmitted in UL slot n' may be defined from the first symbol of the earliest transmitted CSI-RS/CSI-IM/SSB resource corresponding to the latest CSI-RS/CSI-IM/SSB occasion 10-30 among CSI-RS/CSI-IM/SSB occasions for CSI report #X to be transmitted in UL slot n' to the last symbol occupied by a PUCCH or a PUSCH 10-35 including CSI report #X to be transmitted in UL slot n'. The latest CSI-RS/CSI-IM/SSB occasion 10-30 may not be located after a CSI reference resource 10-40 for CSI report #X. Exceptionally, when the base station indicates the semi-persistent CSI report through DCI and the UE performs the first CSI reporting of semi-persistent CSI report #X, the CPU occupation time for the first CSI reporting may be defined from the next symbol of the last symbol occupied by the PDCCH including the DCI indicating semi-persistent CSI report #X to the last symbol occupied by the PUSCH including the first CSI reporting. In this manner, operation causality of the UE on the time domain may be ensured by taking into account the time point at which the CSI report is indicated and the time point at which the CPU occupation time starts.

As an example, the operation of the UE by taking into account the time point at which the CSI report is indicated and the time point at which the CPU occupation time starts may follow the rules shown in [Table 27] below.

TABLE 27

| |
|---|
| For a CSI report with CSI-ReportConfig with higher layer parameter reportQuantity not set to 'none', the CPU(s) are occupied for a number of OFDM symbols as follows: |
| A periodic or semi-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the PUSCH/PUCCH carrying the report. |
| An aperiodic CSI report occupies CPU(s) from the first symbol after the PDCCH triggering the CSI report until the last symbol of the PUSCH carrying the report. |
| An initial semi-persistent CSI report on PUSCH after the PDCCH trigger occupies CPU(s) from the first symbol after the PDCCH until the last symbol of the PUSCH carrying the report. |

Figure 11:
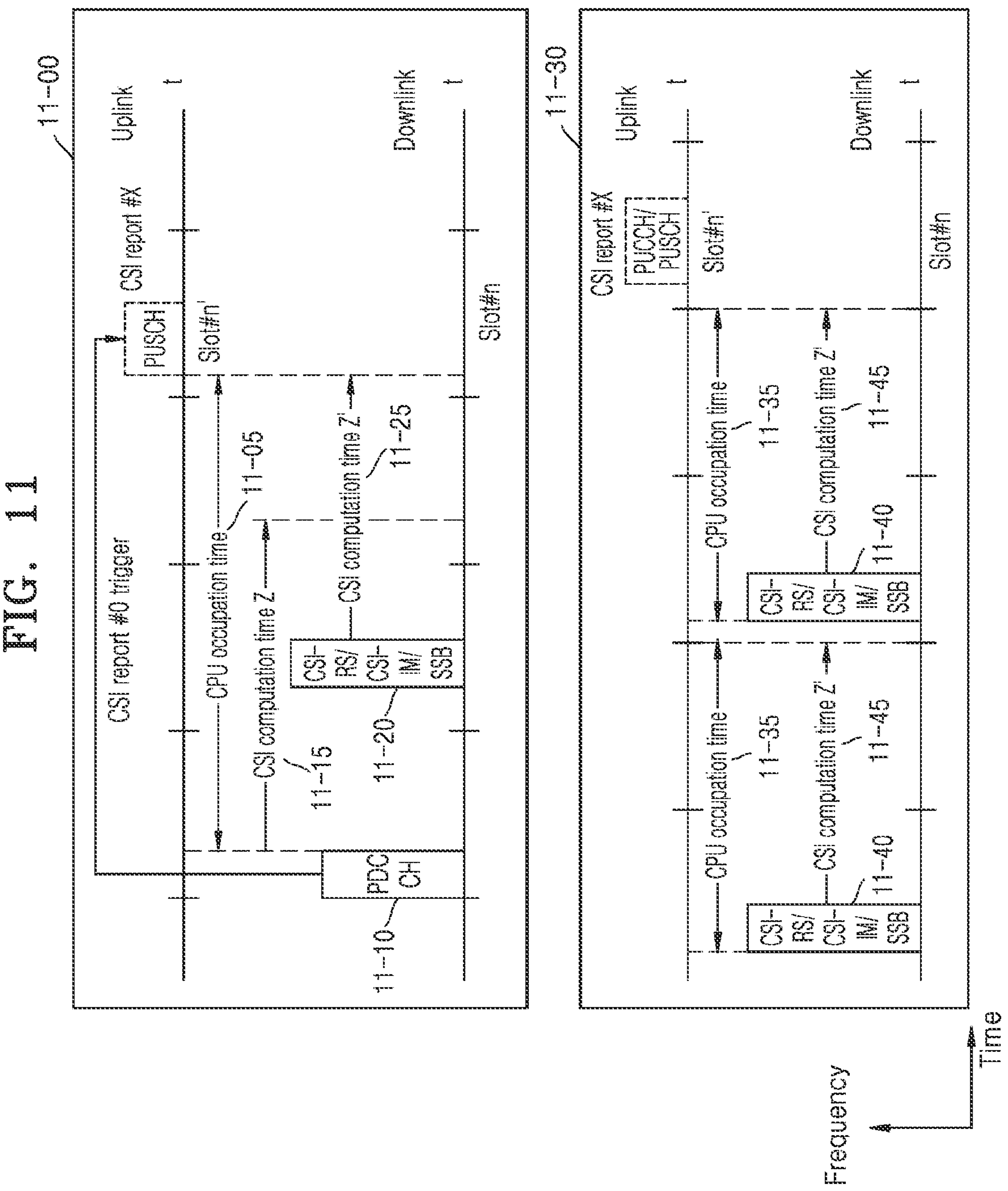
FIG. 11 is a diagram illustrating an example of a CPU occupation time for a CSI report in which a report quantity included in the CSI report is set to 'none', according to an embodiment of the present disclosure.

FIG. 11 is a diagram illustrating an example of the CPU occupation time for the CSI report in which the report quantity included in the CSI report is set to 'none', according to an embodiment of the present disclosure.

11-00 of FIG. 11 is a diagram illustrating the CPU occupation time for the aperiodic CSI report in which the report quantity included in the CSI report is set to 'none', according to an embodiment of the present disclosure. When the base station indicates to transmit aperiodic CSI report #X to in UL slot n' through DCI using DCI format 0_1, a CPU occupation time 11-05 for CSI report #X to be transmitted in UL slot n' may be defined from a next symbol of a last symbol occupied by a PDCCH 11-10 including DCI indicating aperiodic CSI report #X to a symbol at which the CSI computation is completed. The symbol at which the CSI computation is completed may refer to a symbol after a CSI computation time Z 11-15 of the last symbol occupied by the PDCCH including DCI indicating CSI report #X and the latest symbol among the symbols after a CSI computation time Z' 11-25 of the last symbol of the most recent CSI-RS/CSI-IM/SSB occasion 11-20 for CSI report #X to be transmitted in UL slot n'.

11-30 of FIG. 11 is a diagram illustrating the CPU occupation time for the periodic or semi-persistent CSI report in which the report quantity included in the CSI report is set to 'none', according to an embodiment of the present disclosure. When the base station indicates to transmit periodic or semi-persistent CSI report #X in UL slot n' through higher layer signaling or DCI using DCI format 0_1scrambled by SP-CSI-RNTI, a CPU occupation time 11-35 for CSI report #X to be transmitted in UL slot n' may be defined from the first of the earliest transmitted CSI-RS/CSI-IM/SSB resource corresponding to each CSI-RS/CSI-IM/SSB occasion 11-40 for CSI report #X to be transmitted in UL slot n' to a symbol after a CSI computation time Z' 11-45 of the last symbol of the latest transmitted CSI-RS/CSI-IM/SSB resource.

As an example, the rules as shown in [Table 28] below may be followed.

TABLE 28

| |
|---|
| For a CSI report with CSI-ReportConfig with higher layer parameter reportQuantity set to 'none' and CSI-RS-ResourceSet with higher layer parameter trs-Info is not configured, the CPU(s) are occupied for a number of OFDM symbols as follows: |
| A semi-persistent CSI report (excluding an initial semi-persistent CSI report on PUSCH after the PDCCH triggering the report) occupies CPU(s) from the first symbol of the earliest one of each transmission occasion of periodic or semi-persistent CSI-RS/SSB resource for channel measurement for L1-RSRP computation, until $Z'_3$ symbols after the last symbol of the latest one of the CSI-RS/SSB resource for channel measurement for L1-RSRP computation in each transmission occasion. |
| An aperiodic CSI report occupies CPU(s) from the first symbol after the PDCCH triggering the CSI report until the last symbol between $Z_3$ symbols after the first symbol after the PDCCH triggering the CSI report and $Z'_3$ symbols after the last symbol of the latest one of each CSI-RS/SSB resource for channel measurement for L1-RSRP computation. |

Next, a discontinuous reception (DRX) operation of the UE is described.

Figure 12:
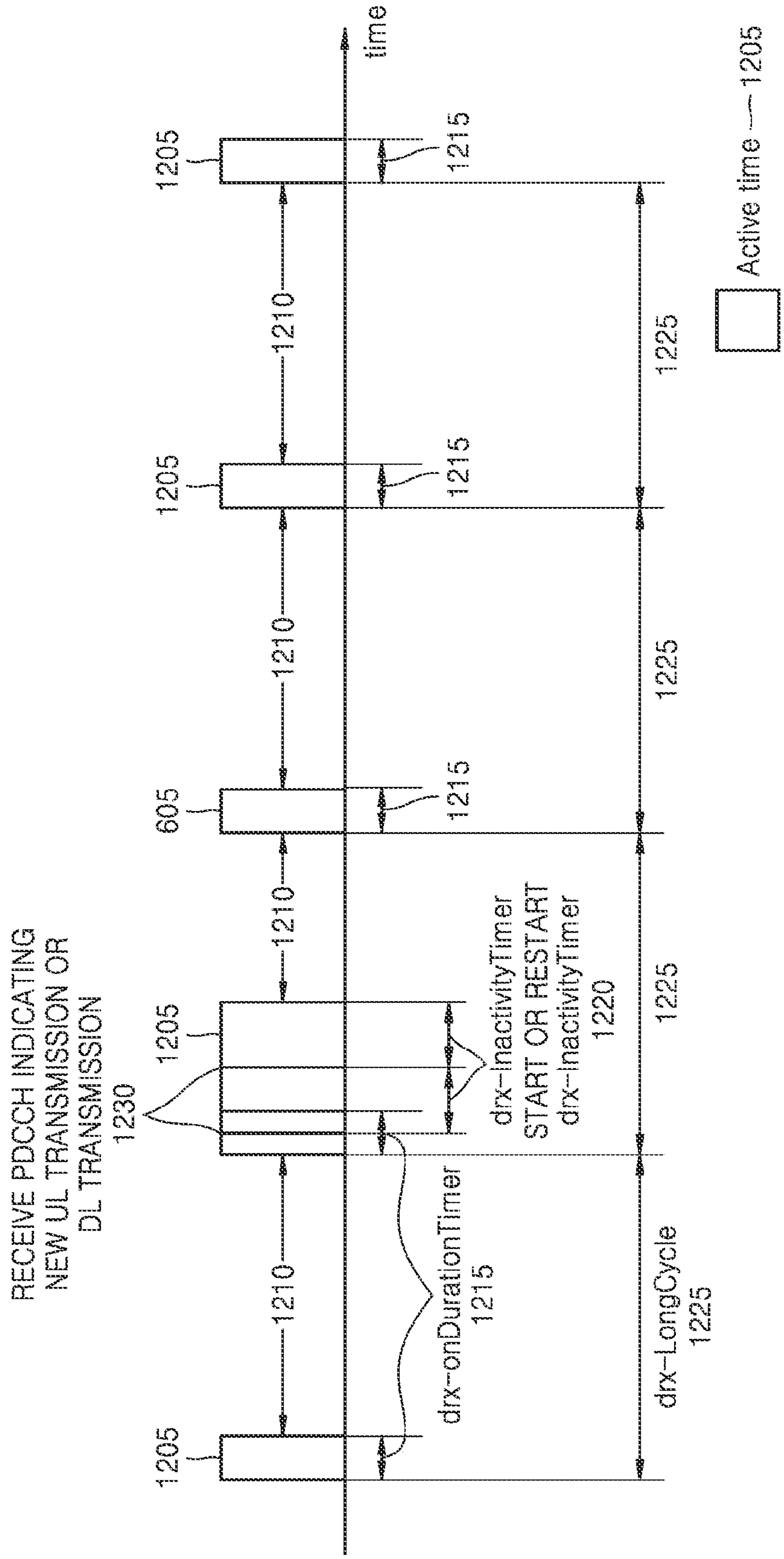
FIG. 12 is a diagram for describing discontinuous reception (DRX).

FIG. 12 is a diagram for describing DRX. DRX is an operation in which the UE using a service discontinuously receives data in an RRC connected state in which a radio link is established between the base station and the UE. When DRX is applied, the UE turns on a receiver at a specific time to monitor a control channel, and when data is not received for a certain periodicity, the UE turns off the receiver to reduce power consumption of the UE. The DRX operation may be controlled by a MAC layer entity based on various parameters and timers.

Referring to FIG. 12, an active time 1205 is a time for which the UE wakes up every DRX cycle and monitors a PDCCH. The active time 1205 may be defined as follows.

- drx-onDurationTimer or drx-InactivityTimer or drx-RetransmissionTimerDL or drx-RetransmissionTimerUL or ra-ContentionResolutionTimer is running; or
- a Scheduling Request is sent on PUCCH and is pending; or
- a PDCCH indicating a new transmission addressed to the C-RNTI of the MAC entity has not been received after successful reception of a Random Access Response for the Random Access Preamble not selected by the MAC entity among the contention-based Random Access Preamble drx-onDurationTimer, drx-InactivityTimer, drx-RetransmissionTimerDL, drx-RetransmissionTimerUL, ra-ContentionResolutionTimer, and the like are timers, the values of which are set by the base station, and have functions of configuring the UE to monitor the PDCCH in a situation in which a certain condition is satisfied.

The drx-onDurationTimer 1215 is a parameter for setting a minimum time for which the UE is awake in a DRX cycle. The drx-InactivityTimer 1220 is a parameter for setting a time for which the UE is additionally awake when a PDCCH indicating new UL transmission or DL transmission is received (1230). The drx-RetransmissionTimerDL is a parameter for setting a maximum time for which the UE is awake in order to receive DL retransmission in a DL HARQ procedure. The drx-RetransmissionTimerUL is a parameter for setting a maximum time for which the UE is awake in order to receive an UL retransmission grant in an UL HARQ procedure. The drx-onDurationTimer, the drx-InactivityTimer, the drx-RetransmissionTimerDL, and the drx-RetransmissionTimerUL may be set as, for example, the time, the number of subframes, the number of slots, and the like. The ra-ContentionResolutionTimer is a parameter for monitoring a PDCCH in a random access procedure.

An inActive time 1210 is a time set not to monitor the PDCCH during a DRX operation and/or a time set not to receive the PDCCH, and the remaining time excluding the active time 1205 from the total time for performing the DRX operation may be the inActive time 1210. When the UE does not monitor the PDCCH for the active time 1205, the UE may enter a sleep or inActive state and reduce power consumption.

The DRX cycle refer to a cycle in which the UE wakes up and monitors the PDCCH. That is, the DRX cycle refers to a time interval or an on duration generation period until monitoring a next PDCCH after the UE monitors the PDCCH. There are two types of DRX cycle, that is, a short DRX cycle and a long DRX cycle. The short DRX cycle may be optionally applied.

The long DRX cycle 1225 is the longest of the two DRX cycles set for the UE. The UE starts the drx-onDurationTimer 1215 again at a time point when the long DRX cycle 1225 has elapsed from a start point (e.g., a start symbol) of the drx-onDurationTimer 1215 while operating in the long DRX. When operating in the long DRX cycle 1225, the UE may start the drx-onDurationTimer 1215 in a slot after drx-SlotOffset in a subframe satisfying [Equation 1] below. The drx-SlotOffset refers to a delay before starting the drx-onDurationTimer 1215. The drx-SlotOffset may be determined based on, for example, the time, the number of slots, and the like, as shown in Equation 1 below.

$$[(SFN\times 10)+\text{subframe number}]\ \text{modulo}(\text{drx-LongCycle})=\text{drx-StartOffset} \qquad \text{[Equation 1]}$$

In this case, drx-LongCycleStartOffset may include the long DRX cycle 1225 and the drx-StartOffset, and may be used to define a subframe in which the long DRX cycle 1225 starts. drx-LongCycleStartOffset may be set as, for example, the time, the number of subframes, the number of slots, and the like.

The short DRX cycle is the shortest of the two DRX cycles defined in the UE. When a certain event, for example, a PDCCH indicating new UL transmission or DL transmission is received in the active time 1250 while the UE operates in the long DRX cycle 1225 (1230), the UE may start or restart the drx-InactivityTimer 1220, and when the drx-InactivityTimer 1220 expires or a DRX command MAC CE is received, the UE may operate in the short DRX cycle. For example, in FIG. 12, the UE may start drx-ShortCycleTimer at a time point when a previous drx-onDurationTimer 1215 or drx-InactivityTimer 1220 expires, and may operate in the short DRX cycle until the drx-ShortCycleTimer expires. When the UE receives a PDCCH indicating new UL transmission or DL transmission (1230), the UE may extend the active time 1205 or delay the arrival of the InActive time 1210 in anticipation of additional UL transmission or DL transmission in the future. While the UE operates in short DRX, the UE starts drx-onDurationTimer 1215 again when a short DRX cycle has elapsed from the start point of the previous on duration. After that, when the drx-ShortCycleTimer expires, the UE operates in the long DRX cycle 1225 again.

When operating in the short DRX cycle, the UE may start the drx-onDurationTimer 1215 after drx-SlotOffset in a subframe satisfying [Equation 2] below. The drx-SlotOffset refers to a delay before starting the drx-onDurationTimer 1215. The drx-SlotOffset may be set as, for example, the time, the number of slots, and the like, as shown in Equation 2 below.

$$[(SFN\times 10)+\text{subframe number}]\ \text{modulo}(\text{drx-ShortCycle})=(\text{drx-StartOffset})\text{modulo}(\text{drx-ShortCycle}) \quad [\text{Equation 2}]$$

drx-ShortCycle and drx-StartOffset may be used to define a subframe at which a short DRX cycle starts. drx-ShortCycle and drx-StartOffset may be set as, for example, the time, the number of subframes, the number of slots, and the like.

The parameters for the DRX operation described above may be set for each cell group. drx-Config in mac-CellGroupConfig for each cell group of Table 16 may include the above-described DRX-related parameters of the corresponding cell, such as drx-onDurationTimer, drx-InactivityTimer, drx-RetransmissionTimerDL, drx-RetransmissionTimerUL, ra-ContentionResolutionTimer, drx-SlotOffset, drx-LongCycle, drx-ShortCycle, and drx-ShortCycleTimer.

The DRX operation has been described with reference to FIG. 12. According to an embodiment, the UE may reduce power consumption of the UE by performing the DRX operation. However, even when the UE performs the DRX operation, the UE does not always receive the PDCCH associated with the UE at the active time 1205. Therefore, in order to save power of the UE more efficiently, the base station may transmit a power saving signal (POSS) to the UE.

The POSS may be transmitted through an L1 signal, and the POSS may be expressed by various names, such as a power control signal and a power setting signal. More specifically, in an embodiment of the present disclosure, the POSS may be referred to as a wake up signal (WUS), a power control signal, a DRX activation signal, an on duration activation signal, a drx-onDurationTimer activation signal, or the like.

According to an embodiment of the present disclosure, the UE may monitor the PDCCH and detect DCI corresponding to the POSS. Hereinafter, in describing the present disclosure, a DCI format corresponding to the POSS will be referred to as DCI format 2_6. DCI format 2_6 is only an example and the present disclosure is not limited to a specific DCI format. A CRC of DCI format 2_6 may be scrambled by a specific RNTI. For example, the specific RNTI may be referred to as a PS-RNTI. Also, the PS-RNTI may be a newly defined RNTI or an existing RNTI. Alternatively, the UE may be configured with the PS-RNTI from the base station through higher layer signaling. The UE may perform reception on the assumption that DCI format 2_6 corresponding to the POSS is scrambled by the PS-RNTI. In this case, when blind decoding is performed on DCI format 2_6, the UE may perform de-scrambling by using the PS-RNTI.

According to an embodiment of the present disclosure, the base station may configure, for the UE, PDCCH configuration information for DCI format 2_6 (which may include, for example, the control resource set-related configuration information and the search space-related configuration information described above) through higher layer signaling. The UE may be configured with PDCCH configuration information for monitoring DCI format 2_6 corresponding to the POSS from the base station through higher layer signaling, and may monitor DCI format 2_6 based on the PDCCH configuration information. When the UE detects DCI format 2_6, the UE may perform a subsequent operation according to indication information in the detected DCI format 2_6. DCI format 26 may include, for example, the following control information.

- First control information: an indicator which controls the PDCCH monitoring operation on the DRX occasion existing after the monitoring occasion for DCI format 2_6 (or which may be expressed as an indicator indicating whether to wake up (wake-up Indication), ps-Index, or the like.)

For example, when a value of this field indicates “0”, the UE may not monitor the PDCCH in the DRX active time that exists thereafter. (Alternatively, the UE may not start drx-onDurationTimer on the DRX occasion that exists thereafter. The above-described operation corresponding to the field value “0” may correspond to the operation of not waking up the UE.)

For example, when a value of this field indicates “1”, the UE may monitor the PDCCH in the DRX active time that exists thereafter. (Alternatively, the UE may start drx-onDurationTimer on the DRX occasion that exists thereafter. The above-described operation corresponding to the field value “1” may correspond to the operation of waking up the UE.)

- Second control information: an indicator indicating a dormancy state or an active state for a secondary cell (SCell)

It may include an N-bit bitmap, and each bit of the bitmap may correspond to one secondary cell or one secondary cell group including a plurality of secondary cells.

For example, when “0” is indicated as one bit value of the bitmap, the UE may set the cell state to the dormancy state with respect to all secondary cells in the secondary cell or the secondary cell group indicated by the corresponding bit.

For example, when “1” is indicated as one bit value of the bitmap, the UE may set the cell state to the active state with respect to all secondary cells in the secondary cell or the secondary cell group indicated by the corresponding bit.

According to an embodiment of the present disclosure, the UE may monitor DCI format 2_6 only in an area other than the DRX active time. More specifically, when the PDCCH monitoring occasion for DCI format 2_6 configured for the UE exists in a time domain other than the DRX active time, the UE may determine that the corresponding PDCCH monitoring occasion is valid. Accordingly, the UE may monitor the PDCCH for DCI format 2_6 of the corresponding occasion. When the PDCCH monitoring occasion for DCI format 2_6 configured for the UE exists in a time domain corresponding to the DRX active time, the UE may determine that the corresponding PDCCH monitoring occasion is not valid. Accordingly, the UE may not monitor the PDCCH for DCI format 2_6 of the corresponding occasion.

In an embodiment of the present disclosure, the UE may determine that the PDCCH monitoring occasion for DCI format 2_6 is not valid in the following situations, and may not monitor DCI format 2_6 on the corresponding PDCCH monitoring occasion.

- In a case where the PDCCH monitoring occasion for the configured DCI format 2_6 exists within the DRX active time
- In a case where a collision occurs with another operation of the UE or a physical channel (or a physical channel with higher priority or an operation related thereto) at the time point corresponding to the PDCCH monitoring occasion for the configured DCI format 26 (for example, in the case of overlapping a SS/PBCH block, or in the case of overlapping a reference signal that is periodically/semi-permanently transmitted or received (e.g., periodic/semi-permanent CSI-RS/SRS, etc.))

In a case where signaling that cancels the PDCCH monitoring operation on the PDCCH monitoring occasion for the configured DCI format 2_6 is received According to an embodiment of the present disclosure, when the UE does not detect DCI format 2_6 on the PDCCH monitoring occasion for the configured DCI format 2_6, the UE may perform the following operation.

When the UE is configured with a fallback operation (or ps-Fallback) from the base station through higher layer signaling, the UE may perform an operation according to the configuration of the base station. The base station may set one of the following two operations as a fallback operation for the case where DCI format 2_6 is not received from the UE.

First operation: The UE monitors the PDCCH in the DRX active time that exists thereafter.

Second operation: The UE does not monitor the PDCCH in the DRX active time that exists thereafter.

When the UE is not configured with a fallback operation from the base station through higher layer signaling, the UE may not monitor the PDCCH in the DRX active time that exists thereafter.

According to an embodiment of the present disclosure, the UE may be configured to monitor DCI format 2_6 in a PCell of a MCG or a PSCell of a SCG, and may monitor DCI format 2_6 based on configuration information. All or part of the contents indicated by DCI format 2_6 may be applied to all SCells in the cell group to which the PCell (or SpCell) belongs (i.e., MCG for PCell and SCG for PSCell). For example, when the UE receives an indicator indicating a wakeup by monitoring DCI format 2_6 in the PCell, the UE may perform a wakeup operation on all primary cells and secondary cells existing in the MCG, and when the UE receives an indicator indicating not to wake up, the UE may not perform a wakeup operation on all primary cells and secondary cells existing in the MCG. Also, when the UE receives an indicator indicating a wakeup by monitoring DCI format 2_6 in the spCell, the UE may perform a wakeup operation on all primary secondary cells and secondary cells existing in the SCG, and when the UE receives an indicator indicating not to wake up, the UE may not perform a wakeup operation on all primary secondary cells and secondary cells existing in the SCG.

After detecting the DCI format by monitoring DCI format 2_6, the UE may perform a subsequent operation according to the received indication information in the DCI format. At this time, the time required for the decoding operation on the PDCCH corresponding to DCI format 2_6 of the UE and the time for preparation or warming up to perform PDCCH monitoring in the subsequent DRX active time according to the instructions of DCI may be required. In consideration of this, the monitoring occasion of DCI format 2_6 may be set to be positioned earlier by a specific time interval before DRX on or Active time (or before the UE starts drx-onDurationTimer in the same way). That is, the PDCCH monitoring occasion for DCI format 2_6 may be set to exist at a time point before a specific offset from the start time of each DRX occasion determined by the DRX cycle.

In LTE and NR, the UE has a procedure for reporting capability supported by the UE to the base station in a state of being connected to the serving base station. In the following description, this is referred to as UE capability (reporting). The base station may transmit a UE capability enquiry message requesting capability report to the UE in the connected state. A UE capability request for each RAT type may be included in the message by the base station. The request for each RAT type may include requested frequency band information. Also, the UE capability enquiry message may request a plurality of RAT types in one RRC message container, or the UE capability enquiry message including the request for each RAT type may be included a plurality of times and transmitted to the UE. That is, the UE capability enquiry may be repeated a plurality of times, and the UE may configure a UE capability information message corresponding thereto and report the UE capability information message a plurality of times. In a next-generation mobile communication system, a UE capability request for MR-DC including NR, LTE, and EN-DC may be made. For reference, the UE capability enquiry message is generally transmitted initially after the UE establishes a connection, but the base station makes a request under any conditions when necessary.

In the above operation, the UE receiving the UE capability report request from the base station configures the UE capability according to the RAT type and band information requested from the base station. A method, performed by the UE, of configuring UE capability in a NR system is summarized below.

1. When the UE receives a list of LTE and/or NR bands as the UE capability request from the base station, the UE configures a band combination (BC) for EN-DC and NR stand alone (SA). That is, a BC candidate list for EN-DC and NR SA is constructed based on the bands requested as FreqBandList by the base station. Also, the bands have priorities in the order described in FreqBandList.

2. When the base station requests the UE capability report by setting an "eutra-nr-only" flag or an "eutra" flag, the UE completely removes NR SA BCs from the configured candidate BC list. This operation may occur only when a LTE base station (eNB) requests "eutra" capability.

3. Thereafter, the UE removes the fallback BCs from the BC candidate list configured in the above operation. A fallback BC corresponds to a case where a band corresponding to at least one SCell is removed from a certain super set BC, and may be omitted because the super set BC may already cover the fallback BC. This operation also applies to MR-DC. That is, LTE bands are also applied. The BCs remaining after this operation are the final "candidate BC list".

4. The UE selects BCs that match the requested RAT type from the final "candidate BC list", and selects BCs to report. In this operation, the UE configures supportedBandCombinationList in the set order. That is, the UE configures the BC and UE capability to be reported in accordance with the preset rat-Type order. (nr→eutra-nr→eutra). Also, featureSetCombination for configured supportedBandCombinationList is configured, and a list of "candidate feature set combinations" is configured from the candidate BC list from which the list for fallback BCs (including capabilities of the same or lower level) has been removed. The "candidate feature set combination" may include both feature set combinations for NR and EUTRA-NR BC, and may be obtained from the feature set combinations of containers of UE-NR-Capabilities and UE-MRDC-Capabilities.

5. Also, when the requested rat Type is eutra-nr and has an effect, featureSetCombinations is included in both containers of UE-MRDC-Capabilities and UE-NR-Capabilities. However, the feature set of NR includes only UE-NR-Capabilities.

After the UE capability is configured, the UE transmits, to the base station, a UE capability information message including the UE capability. The base station performs scheduling and transmission and reception management appropriate for the corresponding UE based on the UE capability received from the UE.

Figure 13:
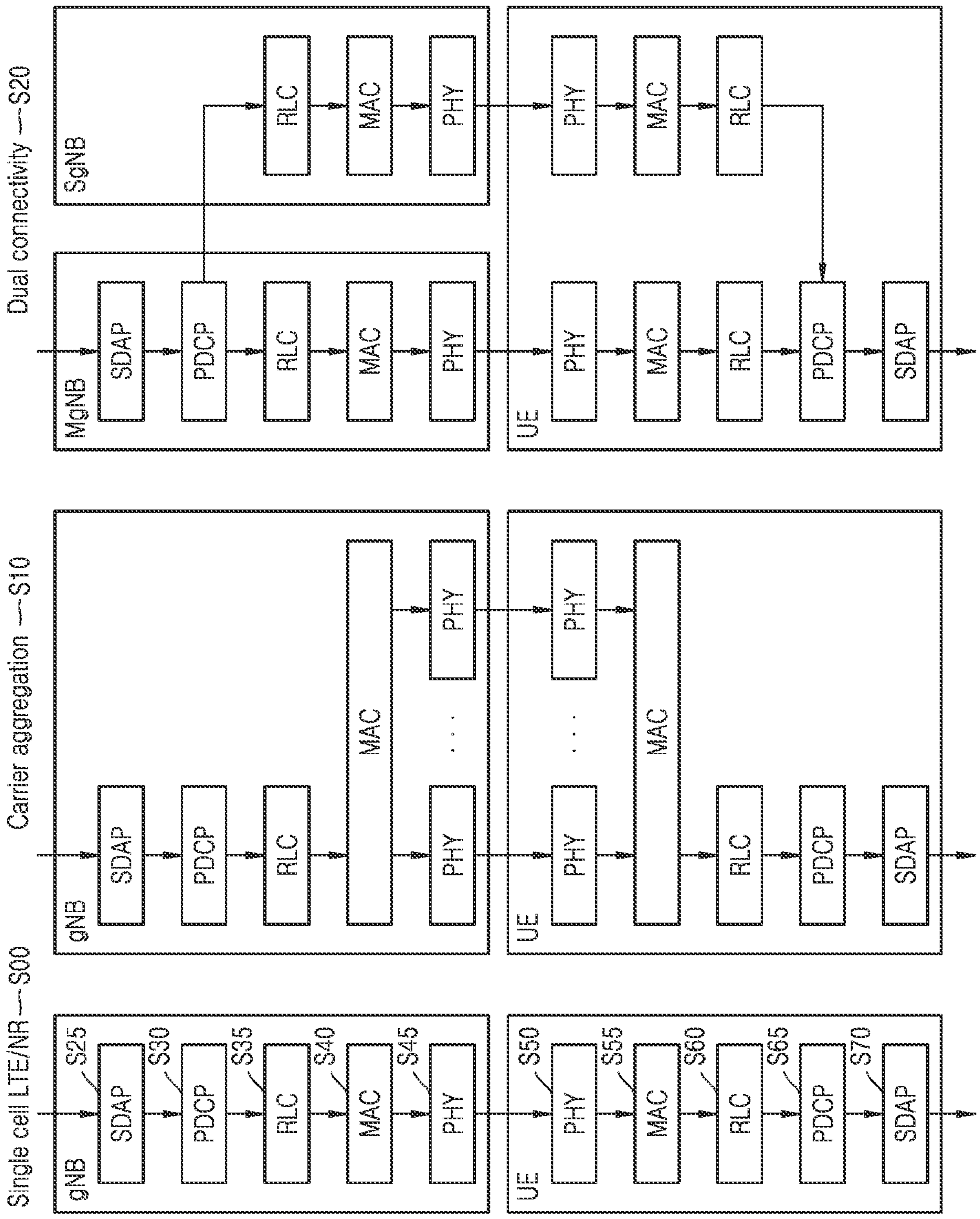
FIG. 13 is a diagram illustrating a structure of radio protocols for a base station and a user equipment when single cell, carrier aggregation, and dual connectivity are performed, according to some embodiments of the present disclosure.

FIG. 13 is a diagram illustrating a structure of radio protocols for a base station and a UE when single cell, carrier aggregation, and dual connectivity are performed, according to some embodiments of the present disclosure.

Referring to FIG. 13, in a UE, a radio protocol of a next-generation mobile communication system includes a NR service data adaptation protocol (SDAP) S70, a NR packet data convergence protocol (PDCP) S65, a NR radio link control (RLC) S60, and a NR medium access control (MAC) S55. In a NR base station, a radio protocol includes a NR SDAP S25, a NR PDCP S30, a NR RLC S35, and a NR MAC S40.

The main functions of the NR SDAPs S25 and S70 may include some of the following functions.

- Transfer of user plane data
- Mapping between a QoS flow and a data radio bearer (DRB) for DL and UL
- Marking QoS flow ID in both DL and UL packets
- Reflective QoS flow to DRB mapping for the UL SDAP PDUs In regard to the SDAP layer entity, the UE may receive an RRC message to configure whether to use the header of the SDAP layer entity or whether to use the function of the SDAP layer entity for each PDCP layer entity, each bearer, or each logical channel. When the SDAP header is configured, the UE may use a 1-bit non-access stratum (NAS) reflective QoS indicator and a 1-bit access stratum (AS) reflective QoS indicator of the SDAP header to indicate the UE to update or reconfigure mapping information between a QoS flow and a data bearer for UL and DL. The SDAP header may include QoS flow ID information indicating QoS. The QoS information may be used as data processing priority, scheduling information, and the like for supporting seamless services.

The main functions of the NR PDCPs 10-30 and 10-65 may include some of the following functions.

- Header compression and decompression: Robust header compression (ROHC) only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink The reordering function of the NR PDCP entities may refer to a function of reordering PDCP PDUs received from the lower layer in sequence based on a PDCP sequence number (SN). The reordering function of the NR PDCP entities may include a function of transmitting data to the upper layer in reordered order, a function of immediately transmitting data without considering the order, a function of reordering PDCP PDUs and recording lost PDCP PDUs, a function of reporting the status of the lost PDCP PDUs to a sender, or a function of requesting retransmission of the lost PDCP PDUs.

The main functions of the NR RLCs S35 and S60 may include some of the following functions.

- Transfer of upper layer PDUs
- In-sequence delivery of upper layer PDUs
- Out-of-sequence delivery of upper layer PDUs
- ARQ function (Error correction through ARQ)
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment The in-sequence delivery function of the NR RLC entities may refer to a function of transmitting RLC SDUs received from the lower layer to the upper layer in sequence. The in-sequence delivery function of the NR RLC entities may include a function of, when one RLC SDU is received after being segmented into a plurality of RLC SDUs, reassembling and transmitting the segmented and received RLC SDUs, a function of reordering the received RLC PDUs based on an RLC SN or a PDCP SN, a function of reordering the RLC PDUs and recording the lost RLC PDUs, a function of reporting the status of the lost RLC PDUs to the sender, a function of requesting retransmission of the lost RLC PDUs, a function of, when there is the lost RLC SDU, transmitting only RLC SDUs up to before the lost RLC SDU to the upper layer in sequence, a function of, when there is the lost RLC SDU but a certain timer has expired, transmitting all RLC SDUs received before the start of the timer to the upper layer in sequence, or a function of, when there is the lost RLC SDU and a certain timer has expired, transmitting all RLC SDUs received so far to the upper layer in sequence. Also, the NR RLC entities may process RLC PDUs in the order of reception (in the order of arrival regardless of the order of serial number and sequence number) and transmit the processed RLC PDUs to the PDCP entity regardless of the order (out-of sequence delivery). When the received RLC PDUs are segments, segments stored in a buffer or to be received in the future may be received, be reconfigured into one complete RLC PDU, and be processed and transmitted to the PDCP layer. The NR RLC layer may not include the concatenation function, and the concatenation function may be performed by the NR MAC layer, or may be replaced with the multiplexing function of the NR MAC layer.

The out-of-sequence delivery function of the NR RLC layer may refer to a function of transmitting RLC SDUs received from the lower layer directly to the upper layer regardless of the order, and may include a function of, when one RLC SDU is received after being segmented into a plurality of RLC SDUs, reassembling and transmitting the segmented and received RLC SDUs, or a function of storing the RLC SN or PDCP SN of the received RLC PDUs, reordering the RLC PDUs, and recording the lost RLC PDUs.

The NR MACs S40 and S55 may be connected to a plurality of NR RLC layer entities configured in one UE, and the main functions of the NR MACs may include some of the following functions.

- Mapping between logical channels and transport channels
- Multiplexing/demultiplexing of MAC SDUs
- Scheduling information reporting
- HARQ function (Error correction through HARQ)
- Priority handling between logical channels of one UE Priority handling between UEs by means of dynamic scheduling
MBMS service identification
Transport format selection
Padding The NR PHY layers S45 and S50 may perform an operation of channel-coding and modulating upper layer data, making the channel-coded and modulated upper layer data into OFDM symbols, and transmitting the OFDM symbols over a radio channel, or demodulating and channel-decoding OFDM symbols received through a radio channel and transmitting the channel-decoded OFDM symbols to the upper layer.

A detailed radio protocol structure may be variously changed according to a carrier (or cell) operating method. For example, when the base station transmits data to the UE based on a single carrier (or cell), the base station and the UE use a protocol structure having a single structure for each layer like S00. On the other hand, when the base station transmits data to the UE based on carrier aggregation (CA) using multiple carriers in a single transmission/reception point (TRP), the base station and the UE have a single structure up to RLC like S10, but use a protocol structure for multiplexing the PHY layer through the MAC layer. As another example, when the base station transmits data to the UE based on DC using multiple carriers in a multi-TRP, the base station and the UE have a single structure up to RLC like S20, but use a protocol structure for multiplexing the PHY layer through the MAC layer.

Referring to the above descriptions, when CSI measurement/report and DRX are configured together, a situation in which CSI measurement and/or CSI report are/is located outside the DRX active time may occur. Because it may be unclear whether the UE performs CSI measurement and/or CSI report in the above situation, it is necessary to define the UE operation in the above situation. In the present disclosure, efficient channel measurement and power consumption reduction of the UE may be achieved by defining a CSI measurement and/or CSI report operation method when one or more DRX groups are configured.

Hereinafter, embodiments of the present disclosure will be described in detail with reference to the accompanying drawings. In describing the present disclosure, when the detailed description of the relevant known functions or configurations is determined to unnecessarily obscure the gist of the present disclosure, the detailed description thereof will be omitted herein. The terms as used herein are those defined by taking into account functions in the present disclosure, but the terms may vary depending on the intention of users or those of ordinary skill in the art, precedents, or the like. Therefore, the definitions should be made based on the contents throughout the specification.

Hereinafter, a base station allocates resources to a terminal, and may include at least one of a gNode B, a gNB, an eNode B, a Node B, a BS, a radio access unit, a base station controller, or a node on a network. Examples of a terminal may include a UE, a mobile station (MS), a cellular phone, a smartphone, a computer, and a multimedia system capable of performing a communication function. Also, although embodiments of the present disclosure will be described below with reference to a NR or LTE/LTE-A system as an example, the embodiments of the present disclosure may also be applied to other communication systems having a similar technical background or channel form. Also, the present disclosure may be applied to other communication systems through some modifications by those of ordinary skill in the art, without departing from the scope of the present disclosure.

The description of the present disclosure is applicable to frequency division duplexing (FDD) and time division duplexing (TDD) systems.

Hereinafter, in the present disclosure, higher layer signaling is a signal transmission method by which a base station transmits a signal to a UE by using a DL data channel of a physical layer, or a UE transmits a signal to a base station by using an UL data channel of a physical layer. The higher layer signaling may also be referred to as RRC signaling, PDCP signaling, or MAC CE.

Also, L1 signaling may be signaling corresponding to at least one or a combination of the following physical layer channels or signaling methods.

PDCCH
DCI
UE-specific DCI
Group common DCI
Common DCI
Scheduling DCI (for example, DCI used for scheduling DL or UL data)
Non-scheduling DCI (for example, DCI not used for scheduling DL or UL data)
PUCCH
UCI Hereinafter in the present disclosure, determining the priority between A and B may be variously described. For example, determining the priority between A and B may be described as selecting one having a higher priority according to a preset priority rule and performing an operation corresponding thereto, or omitting or dropping an operation on one having a lower priority.

Hereinafter, examples are described through a plurality of embodiments in the present disclosure, but these are not independent and one or more embodiments may be applied simultaneously or in combination.

First Embodiment: Configuration of Base Station and UE for DRX Group

In one cell group, traffics between serving cells may be different from each other. For example, traffic frequently occurs in a SpCell for transmission and reception of control information and system information, whereas the frequency of traffic generation may be relatively low in a SCell. In this case, when the same DRX configuration and DRX operation are applied to the SpCell and the SCell, UE power may be wasted due to unnecessary DRX activation in the SCell. For more efficient UE power saving, the UE may be configured with a plurality of cell groups and DRX groups for one cell group (MCG or SCG) from the base station, and the PDCCH monitoring operation of the UE may be controlled for each cell group based on the DRX configuration information of each DRX group. In an embodiment, the UE may be configured with N DRX groups, that is, DRX group #1, DRX group #2, . . . , DRX group #N from the base station, and pieces of DRX configuration information of each DRX group may be respectively applied to cell group #1, cell group #2, . . . , cell group #N. For example, the UE may configure DRX group #1 in cell group #1 including the SpCell and may configure DRX group #2 in cell group #2 including at least one SCell. According to another example, the UE may configure DRX group #1 in cell group #1 including the SpCell and at least some Scells and may configure DRX group #2 in cell group #2 including the remaining SCells.

Figure 14:
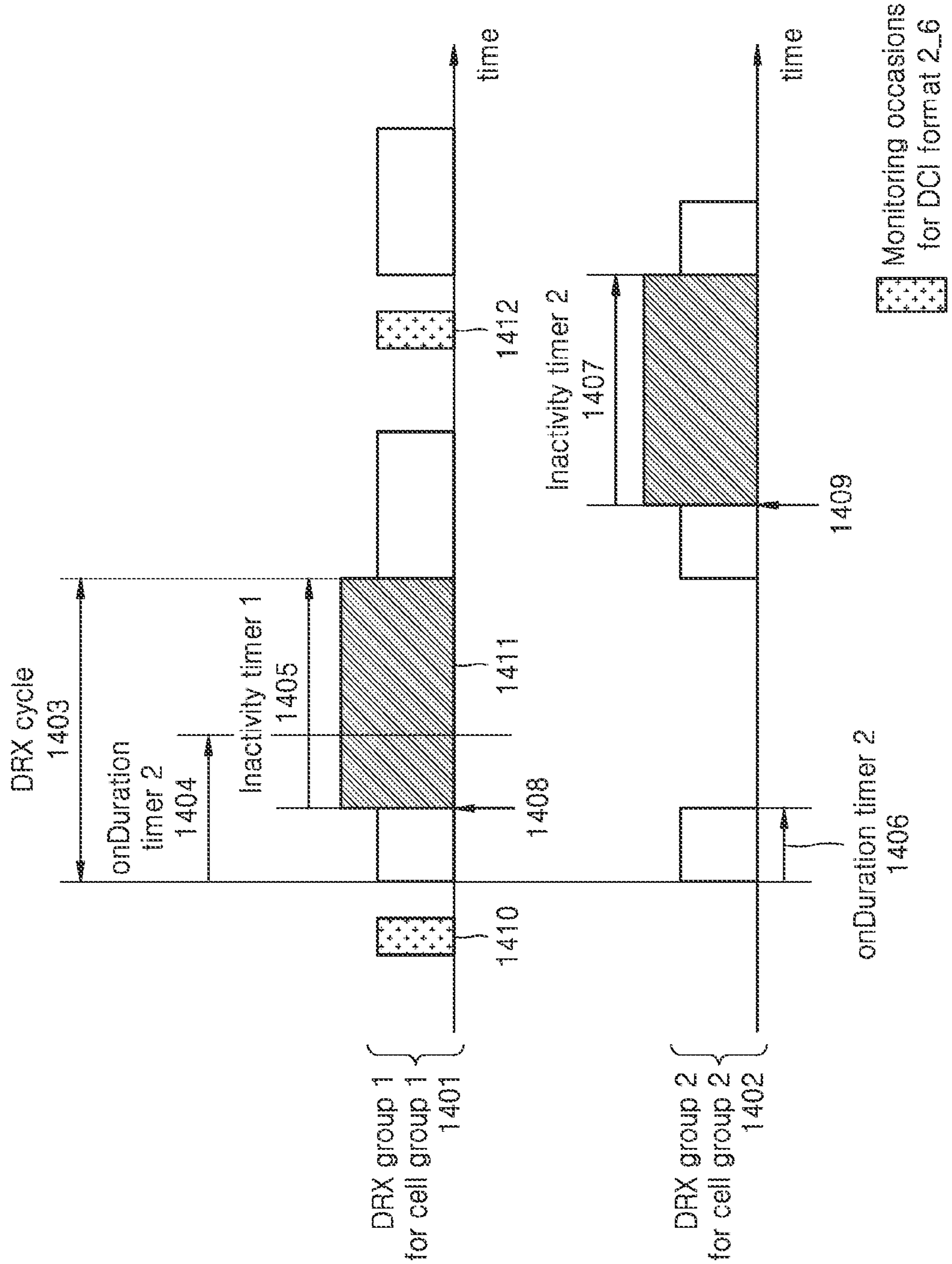
FIG. 14 is a diagram for describing an example in which a plurality of DRX groups are configured, according to an embodiment.

Values corresponding to all or part of the DRX-related configuration parameters of different DRX groups may be the same or different values. FIG. 14 is a diagram for describing an example in which a plurality of DRX groups are configured, according to an embodiment. In FIG. 14, N (=2) DRX groups may be configured. According to an example of FIG. 14, the UE may receive, from the base station, configuration information corresponding to DRX group 1 1401 for cell group 1 and configuration information corresponding to DRX group 2 1402 for cell group 2.

All or part of the DRX configuration parameters of DRX group 1 1401 and DRX group 2 1402 may be configured identically or differently. For example, in FIG. 14, a DRX cycle 1403 of DRX group 1 1401 and a DRX cycle 1403 of DRX group 2 1402 may be set to have the same value, or may share one value. As another example, in FIG. 14, timer values of DRX group 1 1401 and DRX group 2 1402 may be set differently. For example, in FIG. 14, onDuration timer 1 1404 and Inactivity timer 1 1405 may be independently set for DRX group 1 1401, and onDuration timer 2 1406 and Inactivity timer 2 1407 may be independently set for DRX group 2 1402. The UE may perform a DRX operation on cell group 1 based on the DRX parameter set for DRX group 1 1401, and the UE may perform a DRX operation on cell group 2 based on the DRX parameter set for DRX group 2 1402.

Next, an example of a method, performed by the base station, of configuring a plurality of DRX groups for the UE is described. First, a plurality of drx-Configs may be set in mac-CellGroupConfig of Table 16 in order to configure a plurality of DRX groups. Each drx-Config may include all or part of the DRX-related parameters drx-onDurationTimer, drx-InactivityTimer, drx-RetransmissionTimerDL, drx-RetransmissionTimerUL, ra-ContentionResolutionTimer, drx-SlotOffset, drx-LongCycle, drx-ShortCycle, and drx-ShortCycleTimer. As a method regarding to which DRX group to map each drx-Config, a DRX group index may be included in drx-Config. For example, a drx-GroupIndex parameter may be present in drx-Config, and the parameter may have one of two values, for example, 0 or 1. Alternatively, the DRX-related parameter configuration for the first DRX group may be indicated by a drx-Config name, and the DRX-related parameter configuration for the second DRX group may be indicated by another name, for example, drx-ConfigForSecondGroup. Some of the DRX-related parameters belonging to drx-Config may not be present in the drx-ConfigForSecondGroup. For example, because the second DRX group may have the same long DRX cycle as the first DRX group, drx-LongCycle may not be present. Also, because the short DRX cycle may not be activated in the second DRX group, drx-ShortCycle and drx-ShortCycleTimer may not be present. Similarly, DRX parameters for the third and subsequent DRX groups may be configured.

On the other hand, a mapping relationship for which serving cell belongs to each DRX group may be configured. For example, a list of serving cell indexes belonging to each DRX group may be indicated in drx-Config or drx-ConfigForSecondGroup. Alternatively, the DRX group index may be indicated in ServingCellConfig of Table 17. For example, a drxGroupIndex parameter may be present in ServingCellConfig. When the parameter value is set to 0, the DRX-related parameter for the first DRX group may be applied to the corresponding serving cell. Alternatively, when the parameter value is set to 1, the DRX-related parameter for the second DRX group may be applied to the corresponding serving cell. In the case of a serving cell to which the DRX group index is not indicated, a DRX group index set as a default may be applied. For example, a serving cell that does not have a dedicated ServingCellConfig configuration, that is, a serving cell to which ServingCellConfigCommon configuration is applied, may belong to the DRX group set as a default. The DRX group set as the default may be the first DRX group or the DRX group indicated by a drxGroupIndex parameter value of 0.

Second Embodiment: CSI Measurement/Report when Configuring Single DRX Group

As described above, the base station may configure one DRX group and cell group for a master cell group or a secondary cell group of the UE. The UE may equally apply the above-described DRX-related parameters and related operations to all cell groups belonging to the DRX group. The base station and the UE may configure the following principles in relation to CSI measurement and CSI report when configuring a single DRX group.

Principle 1. The UE may report only the CSI report belonging to the DRX active time.

The UE may drop the CSI report outside the DRX active time.

Principle 2. The UE measures the CSI-RS belonging to the DRX active time.

The UE may not measure the CSI-RS outside the DRX active time.

Principle 3. For the CSI report belonging to the DRX active time, when the most recent CSI-RS at the same time or previous time with respect to the CSI reference resource belongs to the DRX active time, the UE may report the CSI report. When the CSI-RS does not belong to the DRX active time, The UE may drop the CSI report.

Figure 15:
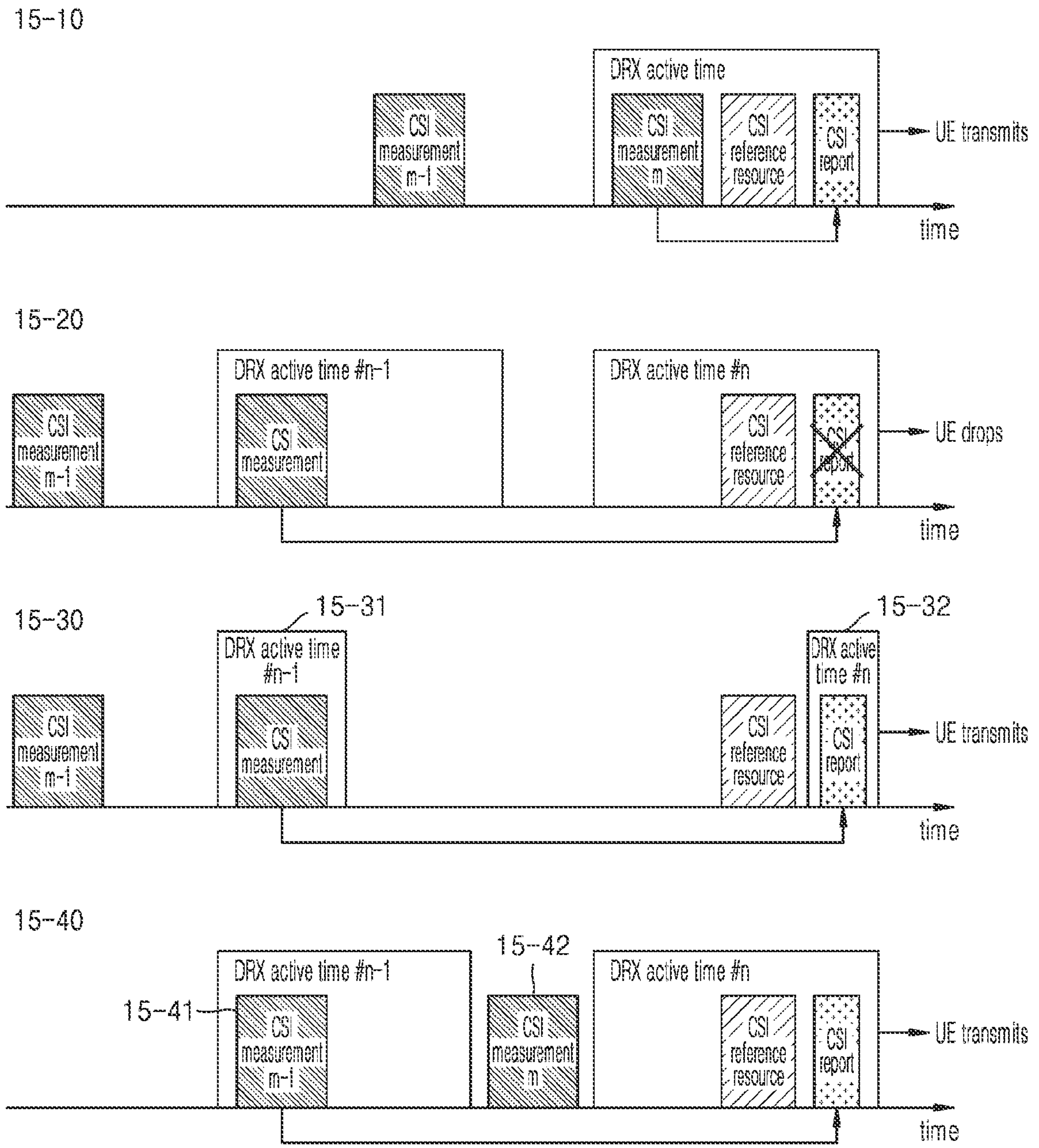
FIG. 15 is a diagram for describing a method of performing CSI reporting based on whether the most recent CSI-reference signal (RS) at the same time or previous time with respect to a CSI reference resource for CSI reporting in a DRX activation periodicity is included in the DRX activation periodicity, according to an embodiment.

An example of DRX active time application for Principle 3 may be the same as in FIG. 15. FIG. 15 is a diagram for describing a method of performing CSI reporting based on whether the most recent CSI-RS at the same time or previous time with respect to a CSI reference resource for CSI reporting in a DRX activation periodicity is included in the DRX activation periodicity, according to an embodiment.

Example 1. The DRX active time to which the CSI report belongs has to be the same as the DRX active time to which the most recent CSI-RS belongs, as in 15-10 of FIG. 15. When the DRX active time to which the CSI report belongs is different from the DRX active time to which the most recent CSI-RS belongs, the UE drops the CSI report, as in 15-20 of FIG. 15. According to the present example, there is an advantage of simplifying the operation of the UE by limiting the CSI report corresponding to the CSI measurement. Example 1 may be expressed as follows.

If the UE is configured with DRX, the most recent CSI measurement occasion occurs in DRX active time for CSI to be reported.

Example 2. As in 15-30 of FIG. 15, the DRX active time 15-32 to which the CSI report belongs may be different from the DRX active time 15-31 to which the most recent CSI-RS belongs. According to the present example, there is an advantage in that the scheduling freedom for each of the CSI-RS and the CSI report is improved, compared to Example 1. Example 2 may be expressed as follows.

If the UE is configured with DRX, the most recent CSI measurement occasion occurs in DRX active time.

Example 3. As in 15-40 of FIG. 15, even when the most recent CSI-RS is not in the DRX active time (15-42), when the CSI-RS received at the previous time belongs to the DRX active time (15-41), the UE may be able to perform CSI reporting therethrough. Therefore, the most recent CSI measurement occasion may not need to belong to the DRX active time.

As in 15-30 of FIG. 15, in an example in which the DRX active time for the CSI report is different from the DRX active time to which the most recent CSI-RS belongs, a CSI reference signal 15-33 for the CSI report may not belong to the DRX active time. Because the CSI reference signal refers to time and frequency resources as a reference for measuring CSI, it may be interpreted that the CSI reference signal time has to belong to the DRX active time. When the CSI reference signal does not belong to the DRX active time, the CSI report may be dropped. Alternatively, because the CSI reference signal is not the time point at which the actual CSI is measured, it may be interpreted that there is no relationship between the CSI reference signal time and the DRX active time. Even when the CSI reference signal does not belong to the DRX active time, the CSI report may be transmitted.

On the other hand, in an embodiment, as described above, when the base station transmits a power saving signal through DCI format 2_6, etc., the power saving signal may not be applied during CSI measurement and CSI report in order to guarantee periodic link quality measurement between the base station and the UE. That is, even when the UE receives DCI format 2_6 and a value of wake-up Indication indicating in the DCI format is "0", the CSI measurement and CSI report operations may be performed during a predefined time interval, for example, during a time interval indicated by the upper layer parameter drx-onDurationTimer.

The CSI measurement and CSI report operations may be operations according to the higher layer indication. For example, the base station may configure the CSI report operation based on the power saving signal for the terminal as the upper layer parameter. The UE may perform the CSI report regardless of the power saving signal only when the upper layer parameter is configured. When the higher layer parameter is not configured, the UE may not perform the CSI measurement and CSI report upon receiving the power saving signal in which the value of the wake-up indication is "0". The operation according to the upper layer parameter configuration may be applied only to a periodic CSI report and CSI measurement associated therewith, and may not be applied to semi-persistent and aperiodic CSI reports and CSI measurement associated therewith. For convenience of explanation, only the CSI measurement and the CSI report have been described, but the above description may be equally applied to the L1-RSRP measurement and the L1-RSRP report. That is, the CSI measurement/report may be replaced with the L1-RSRP measurement/report. Also, the upper layer parameter may be independently configured and applied for each of the L1-RSRP measurement/report and the CSI measurement/report.

Third Embodiment: CSI Measurement/Report when a Plurality of DRX Groups are Configured As described above, the base station may configure a plurality of DRX group and cell groups for a master cell group or a secondary cell group of the UE. The UE may apply different DRX-related parameters for each DRX group and may perform related operations. Because one CSI measurement and CSI reporting associated therewith may be performed in different cells from each other, a cell performing the CSI measurement and a cell performing the CSI report may belong to different DRX groups from each other. Alternatively, a plurality of CSI measurements and/or CSI reports may belong to different DRX groups from each other. At this time, possible operations of the base station and the UE are defined through the present embodiment.

Figure 16:
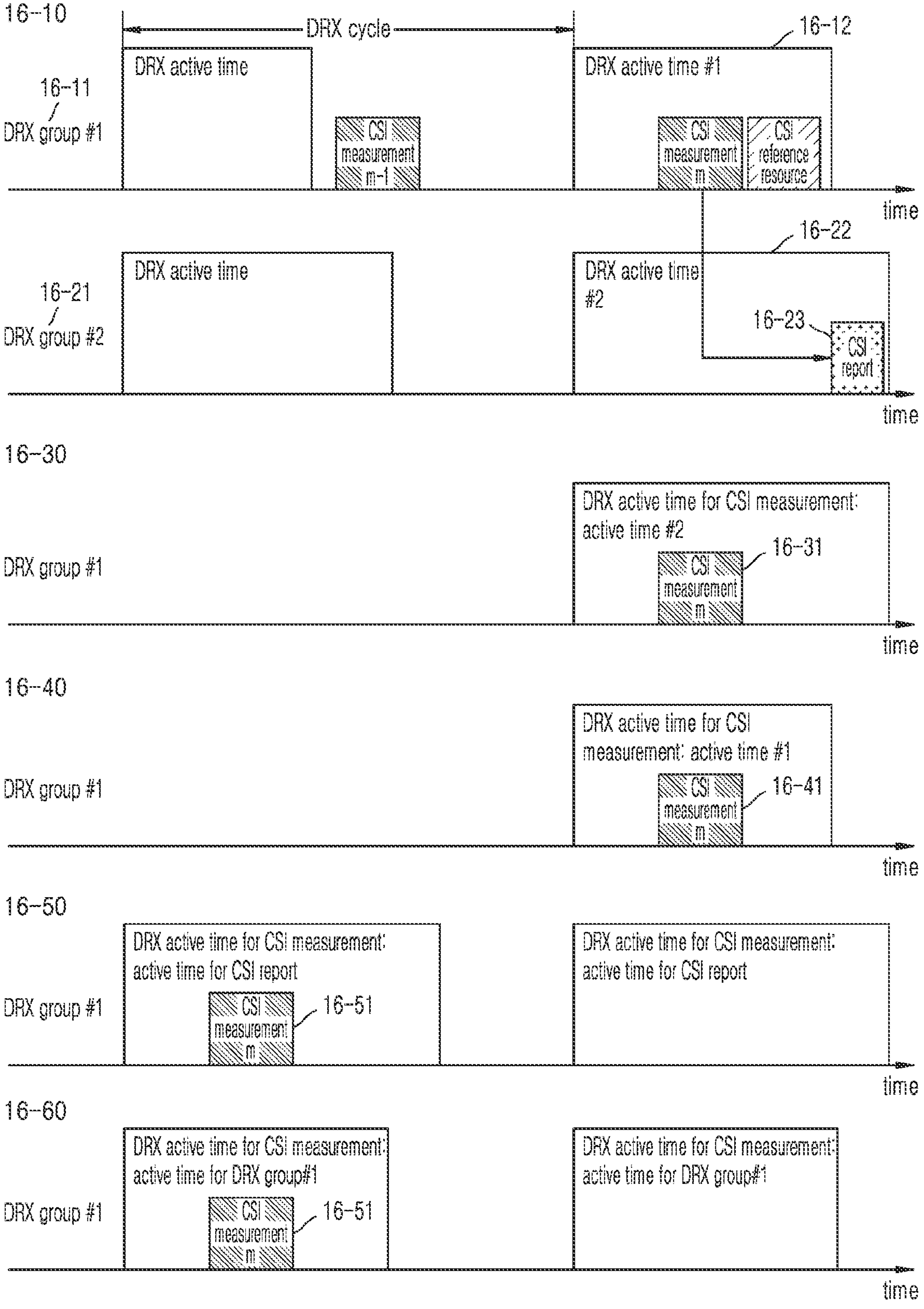
FIG. 16 is a diagram for describing an operation of a user equipment when one CSI measurement and one CSI reporting associated therewith belong to different DRX groups from each other

FIG. 16 is a diagram for describing an operation of a user equipment when one CSI measurement and one CSI reporting associated therewith belong to different DRX groups from each other When the DRX group of the cell performing the CSI measurement is DRX group #1 16-11, the most recent DRX active time in DRX group #1 is active time #1 16-12, the DRX group of the cell performing the CSI report is DRX group #2 16-21, and the most recent DRX active time in DRX group #2 is active time #2 16-22, the CSI measurement and CSI report of the UE may be performed according to the following operations.

Operation 1. When the CSI report 16-23 does not belong to active time #2 16-22, the UE may drop the CSI report. In a case where the CSI report belongs to active time #2 as in 16-30 of FIG. 16, the UE may transmit the CSI report when the transmission time point 16-13 of the most recent CSI-RS associated with the CSI report belongs to active time #2, and the UE may drop the CSI report when the transmission time point of the CSI-RS does not belong to active time #2. The above operation may be expressed as follows.

If the UE is configured with two DRX groups, the most recent CSI measurement occasion occurs in the latest DRX active time of the DRX group for the cell where CSI report is performed.

According to the above operation, a situation in which the UE has to receive a CSI-RS may occur even when it is not DRX active time in a cell in which CSI measurement occurs. For example, even when active time #1 is shorter than active time #2, it may be necessary to receive a CSI-RS belonging to active time #2 for a CSI report. Because this increases the complexity of the DRX-related operation of the UE and the power consumption of the UE, additional constraints may be set in the above operation.

Operation 2. For example, in order for the UE to transmit the CSI report, a constraint that the most recent CSI-RS 16-41 associated with the CSI report has to belong to the most recent active time (i.e., active time #1) for the DRX group (i.e., DRX group #1) of the cell to which the CSI measurement belongs as in 16-40 of FIG. 16 may be additionally set in addition to Operation 1. The operation according to the above constraints may be expressed as follows. According to Operation 2, the UE may perform the report when the measurement occasion of the CSI-RS is included in the interval in which the most recent active time #1 for DRX group #1 overlaps the most recent active time #2 for DRX group #2.

If the UE is configured with two DRX groups, the most recent CSI measurement occasion occurs in The latest DRX active time, respective to the DRX group, for CSI to be reported The latest DRX active time, respective to the DRX group, where CSI measurement is done The above operation may be expressed as follows.

If the UE is configured with DRX, if the UE is configured to monitor DCI format 2_6 and configured by higher layer parameter [PS-Periodic_CSI_TransmitOrNot] to report CSI with the higher layer parameter reportConfigType set to 'periodic' when drx-onDurationTimer is not started, the most recent CSI measurement occasion occurs in DRX active time or during the time duration indicated by drx-onDurationTimer also outside DRX active time for CSI to be reported;

if the UE is configured to monitor DCI format 2_6 and configured by higher layer parameter[PS_Periodic_L1-RSRP_TransmitOrNot] to report L1-RSRP with the higher layer parameter reportConfigType set to 'periodic' and reportQuantity set to cri-RSRP when drx-onDurationTimer is not started, the most recent CSI measurement occasion occurs in DRX active time or during the time duration indicated by drx-onDurationTimer also outside DRX active time for CSI to be reported;

if the UE is configured with two DRX group, for each DRX group, the most recent CSI measurement occasion occurs in DRX active time overlapped with the DRX active time for CSI to be reported.

otherwise, the most recent CSI measurement occasion occurs in DRX active time for CSI to be reported.

On the other hand, as in Example 2 of the second embodiment, in order to improve the scheduling freedom for the CSI report and CSI measurement, not only the most recent active time of each DRX group may be taken into account, but all active times of each DRX group may be taken into account. In this case, possible operations of the base station and the UE may include at least one of the following operations.

Operation 3. When the CSI report does not belong to the active time of DRX group #2, the UE may drop the CSI report. On the other hand, in a case where the CSI report belongs to the active time of DRX group #2 as in 16-50 of FIG. 16, the UE may transmit the CSI report when the transmission time point of the most recent CSI-RS associated with the CSI report belongs to the active time of DRX group #2, and the UE may drop the CSI report when the transmission time point of the CSI-RS does not belong to the active time of DRX group #2. The above operation may be expressed as follows.

If the UE is configured with two DRX groups, the most recent CSI measurement occasion occurs in DRX active time for the serving cell where the corresponding CSI report is configured.

Alternatively, the above operation may be expressed as follows.

If the UE is configured with DRX, if the UE is configured to monitor DCI format 2_6 and configured by higher layer parameter [PS-Periodic_C-S_TransmitOrNot] to report CSI with the higher layer parameter reportConfigType set to 'periodic' when drx-onDurationTimer is not started, the most recent CSI measurement occasion occurs in DRX active time or during the time duration indicated by drx-onDurationTimer also outside DRX active time for CSI to be reported;

if the UE is configured to monitor DCI format 2_6 and configured by higher layer parameter[PS_Periodic_L1-RSRP_TransmitOrNot] to report L1-RSRP with the higher layer parameter reportConfigType set to 'periodic' and reportQuantity set to cri-RSRP when drx-onDuration Timer is not started, the most recent CSI measurement occasion occurs in DRX active time or during the time duration indicated by drx-onDurationTimer also outside DRX active time for CSI to be reported;

if the UE is configured with two DRX group, the most recent CSI measurement occasion occurs in DRX active time for the DRX group for CSI to be reported.

otherwise, the most recent CSI measurement occasion occurs in DRX active time for CSI to be reported.

On the other hand, as described above, an additional constraint may be set in Operation 3 in order not to force CSI-RS reception outside the DRX active time of the cell in which the CSI measurement of the UE occurs.

Operation 4. For example, in order for the UE to transmit the CSI report, a constraint that the most recent CSI-RS associated with the CSI report has to belong to the active time for the DRX group (i.e., DRX group #1) of the cell to which the CSI measurement belongs as in 16-60 of FIG. 16 may be additionally set in addition to Operation 3. The operation according to the above constraints may be expressed as follows. According to Operation 4, the UE may perform the report when the measurement occasion of the most recent CSI-RS is included in the interval in which the active time for DRX group #1 overlaps the active time for DRX group #2.

If the UE is configured with two DRX groups, the most recent CSI measurement occasion occurs in DRX active time for the serving cell where the corresponding CSI report is configured.

DRX active time for the serving cell where CSI measurement is done

Alternatively, the above operation may be expressed as follows.

If the UE is configured with DRX, if the UE is configured to monitor DCI format 2_6 and configured by higher layer parameter [PS-Periodic_CSI_TransmitOrNot] to report CSI with the higher layer parameter reportConfigType set to 'periodic' when drx-onDurationTimer is not started, the most recent CSI measurement occasion occurs in DRX active time or during the time duration indicated by drx-onDurationTimer also outside DRX active time for CSI to be reported;

if the UE is configured to monitor DCI format 2_6 and configured by higher layer parameter[PS_Periodic_L1-RSRP_TransmitOrNot] to report L1-RSRP with the higher layer parameter reportConfigType set to 'periodic' and reportQuantity set to cri-RSRP when drx-onDurationTimer is not started, the most recent CSI measurement occasion occurs in DRX active time or during the time duration indicated by drx-onDurationTimer also outside DRX active time for CSI to be reported;

if the UE is configured with two DRX groups, the most recent CSI measurement occasion occurs in the overlapped time of:

DRX active time for the serving cell where the CSI measurement is configured

DRX active time for the serving cell where the corresponding CSI report is configured otherwise, the most recent CSI measurement occasion occurs in DRX active time for CSI to be reported.

Operation 5. On the other hand, even when the UE does not receive the CSI-RS on the most recent CSI measurement occasion, when there is a CSI-RS received at previous time points, the CSI-report may be possible therethrough. Therefore, the above-described constraints related to the most recent CSI measurement occasion may not be taken into account. That is, even when the most recent CSI measurement occasion does not belong to the active time of DRX group 1 or DRX group 2, the UE may transmit the CSI report when the CSI report belongs to the active time of DRX group 2. At this time, in order not to change the UE operation when the single DRX group is configured, the operation may be limited to a case where two DRX groups are configured and the DRX group of the cell to which CSI measurement belongs is different from the DRX group of the cell to which the CSI report belongs. That is, the above operation may be expressed as follows.

If the UE is configured with DRX, and the serving cell for CSI measurement and that for CSI report are in the same DRX group, the most recent CSI measurement occasion occurs in DRX active time for CSI to be reported.

Alternatively, the above operation may be expressed as follows.

If the UE is configured with DRX,

- if the UE is configured to monitor DCI format 2_6 and configured by higher layer parameter [PS-Periodic_CSI_TransmitOrNot] to report CSI with the higher layer parameter reportConfigType set to 'periodic' when drx-onDurationTimer is not started, the most recent CSI measurement occasion occurs in DRX active time or during the time duration indicated by drx-onDurationTimer also outside DRX active time for CSI to be reported;
- if the UE is configured to monitor DCI format 2_6 and configured by higher layer parameter[PS_Periodic_L1-RSRP_TransmitOrNot] to report L1-RSRP with the higher layer parameter reportConfigType set to 'periodic' and reportQuantity set to cri-RSRP when drx-onDurationTimer is not started, the most recent CSI measurement occasion occurs in DRX active time or during the time duration indicated by drx onDurationTimer also outside DRX active time for CSI to be reported;
- if the UE is configured with two DRX groups, and the serving cell for CSI measurement and that for CSI report are in the same DRX group, the most recent CSI measurement occasion occurs in DRX active time for CSI to be reported.
- if the UE is configured with one DRX group, the most recent CSI measurement occasion occurs in DRX active time for CSI to be reported.

Operation 6. For simplification of the UE operation, the cell to which the CSI report belongs and the cell to which the CSI measurement belongs may be forced to belong to the same DRX group, and a method for the same may include at least one of the following operations.

When two DRX groups are configured, the UE assumes the following for CSI measurement and CSI report.

If the UE is configured with two DRX groups, UE shall assume that the serving cell for CSI measurement and that for CSI report are in the same DRX group.

The above assumption may be expressed as follows.

If the UE is configured with two DRX groups, UE does not expect that the serving cell for CSI measurement and that for CSI report are in different DRX groups.

Alternatively, the above operation may be expressed as follows.

If the UE is configured with DRX,

- if the UE is configured to monitor DCI format 2_6 and configured by higher layer parameter [PS-Periodic_CSI_TransmitOrNot] to report CSI with the higher layer parameter reportConfigType set to 'periodic' when drx-onDurationTimer is not started, the most recent CSI measurement occasion occurs in DRX active time or during the time duration indicated by drx-onDurationTimer also outside DRX active time for CSI to be reported;
- if the UE is configured to monitor DCI format 2_6 and configured by higher layer parameter[PS_Periodic_L1-RSRP_TransmitOrNot] to report L1-RSRP with the higher layer parameter reportConfigType set to 'periodic' and reportQuantity set to cri-RSRP when drx-onDurationTimer is not started, the most recent CSI measurement occasion occurs in DRX active time or during the time duration indicated by drx-onDuration Timer also outside DRX active time for CSI to be reported;
- if the UE is configured with two DRX groups, UE does not expect that the serving cell for CSI measurement and that for CSI report are in different DRX groups.
- the most recent CSI measurement occasion occurs in DRX active time for CSI to be reported.
  - When two DRX groups are configured, the base station sets only the serving cell index in the DRX group to which CSI-ReportConfig belongs in the carrier field indicated in the upper layer parameter CSI-ReportConfig.
  - When two DRX groups are configured, the base station configures at least one PUCCH transmission cell for each DRX group. The PUCCH transmission cell refers to SpCell (PCell or PSCell) or PUCCH-SCell. In this case, the carrier field of the periodic CSI report or the semi-persistent CSI report activated by the MAC-CE sets only the serving cell index within the same DRX group. On the other hand, the PUCCH groups may be respectively regarded as different DRX groups from each other. Therefore, the DRX group may be configured through the PUCCH group without being explicitly configured. Alternatively, even when the DRX group is explicitly configured, the PUCCH group configuration may override the preset DRX group configuration.
  - When two DRX groups are configured, the periodic CSI report or the semi-persistent CSI report activated by the MAC-CE is not allowed in the DRX group that does not include the PUCCH transmission cell when the base station is configured, and only the CSI report transmitted on the PUSCH, that is, the semi-persistent CSI report activated by DCI or the aperiodic CSI report, is allowed.

On the other hand, with respect to Operations 1 to 4, even when the CSI report does not belong to active time #2, the UE may transmit the CSI report when the CSI report belongs to active time #1. In other words, when the CSI report belongs to the union of the active times of the two DRX groups, the UE may transmit the CSI report; otherwise, the CSI report may be dropped. Whether to drop the CSI report may be determined by applying the above-described method to the CSI measurement associated with the CSI report. That is, when the most recent CSI-RS associated with the CSI report belongs to the union of the active times of two DRX groups, the UE may transmit the CSI report; otherwise, the CSI report may be dropped. Alternatively, in order to reduce UE implementation complexity, when the CSI report belongs to the intersection of the active times of the two DRX groups, the UE may transmits the CSI report; otherwise, the CSI report may be dropped. A similar operation may be applied to the CSI measurement associated with the CSI report. That is, when the most recent CSI-RS associated with the CSI report belongs to the intersection of the active times of two DRX groups, the UE may transmit the CSI report; otherwise, the CSI report may be dropped. The union of the active times or the intersection of the active times may indicate only the most recent active time for each DRX group. Alternatively, the union of the active times or the intersection of the active times may indicate all active times for each DRX group.

The above operations may not be mutually exclusive, and the UE operation may vary according to the capability of the UE and the configuration of the base station. For example, the UE may report capability indicating whether CSI measurement and CSI report may be performed in different DRX groups from each other. When the UE does not report the capability or reports that CSI measurement and CSI report are unable to be performed in different DRX groups from each other, for example, the UE may expect the base station to configure CSI measurement and CSI report according to Operation 6. On the other hand, the base station may transmit upper layer configuration for the CSI measurement and the CSI report to the UE based on the capability report of the UE. Also, explicit configuration may be indicated to the UE so that the UE performs CSI measurement and CSI report belonging to different DRX groups from each other. The explicit configuration may be indicated through higher layer signaling and/or L1 signaling. When the base station indicates the UE to perform CSI measurement and CSI report belonging to different DRX groups from each other through the explicit configuration, the UE may operate in Methods 1 to 5; otherwise, the UE may operate in Method 6. On the other hand, the UE may report capability indicating whether CSI measurement is possible outside the DRX active time, and the base station may explicitly/implicitly indicate to perform CSI measurement outside the DRX active time based on the capability. The explicit indication of the base station may be indicated through higher layer signaling and/or L1 signaling. When the UE reports the capability that CSI measurement is possible outside the DRX active time and/or the base station explicitly/implicitly indicates the capability, the UE may operate in one of Operations 1, 3, and 5; otherwise, the UE may operate in one of Operations 2, 4, and 6. On the other hand, the UE may report capability indicating whether CSI measurement is possible outside the DRX active time to which the CSI report belongs, and the base station may explicitly/implicitly indicate to perform CSI measurement outside the DRX active time to which the CSI report belongs, based on the capability. The explicit indication of the base station may be indicated through higher layer signaling and/or L1 signaling. When the UE reports the capability that CSI measurement is possible outside the DRX active time to which the CSI report belongs and/or the base station explicitly/implicitly indicates the capability, the UE may operate in one of Operations 3, 4, and 5; otherwise, the UE may operate in one of Operations 1, 2, and 6. In a case where one DRX group is configured or CSI measurement and CSI report are configured in the same DRX group, when the UE reports the capability that CSI measurement is possible outside the DRX active time to which the CSI report belongs and/or the base station explicitly/implicitly indicates the capability, the UE may operate according to Examples 2 and 3 of the second embodiment for each DRX group.

When a plurality of CSI reports overlap each other on the time domain in a BWP within a specific serving cell, the DRX group to which the CSI-RS associated with each CSI report belongs may be considered in priority in addition to the priority of the channel information. For example, the CSI report for the CSI-RS of DRX group 0 may have priority over the CSI report for the CSI-RS of DRX group 1. The priority for the DRX group may be considered prior to the time domain reporting characteristic of the CSI report. Alternatively, the CSI report for the CSI-RS belonging to the DRX active time may have priority over the CSI report for the CSI-RS belonging to the outside of the DRX active time. This is to prevent a situation in which a valid CSI report associated with the CSI-RS outside the DRX active time is dropped due to the high priority of the invalid CSI report by association with the CSI-RS outside the DRX active time.

Fourth Embodiment: Application of Power Saving Signal for Each DRX Group

When a plurality of DRX groups are configured, it is necessary to define to which DRX group the power saving signal is applied. The power saving signal may be applied to all DRX groups (Case 1), or the power saving signal may be applied to one or more selected DRX groups (Case 2). As a method of configuring Case 2, there may be a method of configuring an indicator indicating whether to wake up for each DRX group with respect to one power saving signal, a method of configuring independent power saving signals that may be identified by DRX group, and the like. There are various methods of identifying the power saving signal by DRX group. For example, there are a method of configuring a flag that identifies the DRX group in the power saving signal, a method of applying the power saving mode only to the DRX group to which the serving cell to which the power saving signal is transmitted belongs, and the like. All possible methods are not listed in order not to obscure the gist of the explanation.

In Case 1, as described in the second embodiment, in order to ensure periodic link quality measurement between the base station and the UE, the base station may indicate an upper layer configuration to the UE in order not to apply the power saving signal during CSI measurement/report and L1-RSRP measurement/report. That is, even when the UE receives DCI format 2_6 and a value of wake-up Indication indicating in the DCI format is "0", an upper layer configuration may be indicated to perform CSI/L1-RSRP measurement and CSI/L1-RSRP report operations during a predefined time interval, for example, during a time interval indicated by the upper layer parameter drx-onDurationTimer.

The upper layer configurations may be configurations commonly applied to all DRX groups (Case 1-1). For example, when a plurality of DRX groups are configured in the UE, one upper layer configuration for whether to apply the power saving signal during CSI measurement/report of all DRX groups may be indicated to the UE, and this upper layer configuration may be commonly applied to all DRX groups. Similarly, one upper layer configuration for whether to apply the power saving signal during L1-RSRP measurement/report of all DRX groups may be indicated to the UE, and this upper layer configuration may be commonly applied to all DRX groups. This simplifies the UE operation related to link quality measurement, and thus, has an advantage of reducing the DRX and channel measurement/report related implementation complexity of the UE.

On the other hand, the upper layer configurations may be indicated and applied for each DRX group (Case 1-2). For example, when a plurality of DRX groups are configured in the UE, the upper layer configuration for whether to apply the power saving signal during the CSI report may be indicated to the UE for each DRX group, and the upper layer configuration may be applied only to the indicated DRX group. Similarly, the upper layer configuration for whether to apply the power saving signal during L1-RSRP measurement/report may be indicated to the UE for each DRX group, and the upper layer configuration may be applied only to the indicated DRX group. This has an advantage of more efficiently reducing the power of the UE by enabling different channel measurement/reporting operations for each DRX group.

In Case 1-1, even when the power saving signal in which the value of the wake-up indication is “0” is received, when CSI measurement/report or L1-RSRP measurement/report is configured to be performed through the upper layer configuration, it is necessary to define a UE operation when the DRX group of the cell in which the CSI/L1-RSRP measurement is performed is different from the DRX group of the cell in which the CSI/L1-RSRP report is performed. As possible UE operations, Operations 1 to 6 of the third embodiment may be applied to a case where the upper layer configuration is indicated. As an example, a case where Operation 2 is applied may be expressed as follows.

If the UE is configured with two DRX groups, the most recent CSI measurement occasion occurs in

- during the time duration indicated by drx-onDurationTimer for the corresponding DRX group outside active time when the UE is configured to monitor DCI format 2_6 and if the UE configured by
  - higher layer parameter [PS-Periodic_CSI_TransmitOrNot] to report CSI or
  - higher layer parameter [PS_Periodic_L1-RSRP_TransmitOrNot] to report L1-RSRP
- Otherwise,
  - The latest DRX active time, respective to the DRX group, for CSI to be reported
  - The latest DRX active time, respective to the DRX group, where CSI measurement is done In Case 1-2, the UE operation when different upper layer configurations are indicated for each DRX group with respect to CSI measurement/report will be described in detail. At this time, when the UE receives the power saving signal in which the value of the wake-up indication is “0”, the UE performs CSI measurement/report in a specific DRX group, for example, DRX group #A, while the UE does not perform CSI measurement/report in another DRX group, for example, DRX group #B. When a certain CSI report belongs to DRX group #A, but a CSI-RS associated with the CSI report belongs to DRX group #B, the CSI report may belong to the DRX active time, while the most recent CSI-RS associated with the CSI report may belong to the outside of the DRX active time. It is necessary to define a UE operation for this case, and a possible UE operation may be at least one of the following operations.

Operation a. The UE receives the CSI-RS associated with the CSI report, regardless of the upper layer configuration of the DRX group (DRX group #B) to which the CSI-RS belongs.

Operation b. The UE does not transmit the CSI report, regardless of the upper layer configuration of the DRX group (DRX group #A) to which the CSI report belongs.

Operation c. The CSI report and the CSI-RS associated therewith belong to the same DRX group. That is, this is similar to Operation 6 above.

For convenience of explanation, a case where the CSI report is within the DRX active time while the CSI-RS is outside the DRX active time has been mainly described, but the above operation is similarly applicable to a case where the CSI report belongs to the outside of the DRX active time and the CSI-RS belongs to the DRX active time. For example, in this case, the UE operation may follow one of the following operations.

Operation ab. The UE transmits the CSI report, regardless of the upper layer configuration of the DRX group (DRX group #B) to which the CSI-RS belongs. Otherwise, the UE does not transmit the CSI report.

Operation bb. The UE transmits the CSI report, regardless of the upper layer configuration of the DRX group (DRX group #A) to which the CSI report belongs. Otherwise, the UE does not transmit the CSI report.

Operation cb. The CSI report and the CSI-RS associated therewith belong to the same DRX group. That is, this is similar to Operation 6 above.

Also, the description related to the CSI measurement and the CSI report may be equally applied to the L1-RSRP measurement and the L1-RSRP report. That is, the CSI measurement/report may be replaced with the L1-RSRP measurement/report.

In Case 2, the upper layer configuration for performing CSI/L1-RSRP measurement and CSI/L1-RSRP report when the power saving signal is received may be configured. For example, the upper layer configurations may be configurations commonly applied to all DRX groups (Case 2-1). Alternatively, the upper layer configurations may be indicated and applied for each DRX group (Case 2-2). For both Case 2-1 and Case 2-2, the DRX group of the cell in which the CSI/L1-RSRP measurement is performed may be different from the DRX group of the cell in which the CSI/L1-RSRP report is performed. In this case, the CSI report may belong to the DRX active time, but the most recent CSI-RS associated with the CSI report may belong to the outside of the DRX active time, according to whether to transmit the power saving signal for each DRX group, the value of the wake-up indication in the power saving signal, and the upper layer configurations for performing the CSI/L1-RSRP measurement and CSI/L1-RSRP report. As a possible UE operation for this case, Operations a to c described above are applicable.

For convenience of explanation, a case where the CSI report is within the DRX active time while the CSI-RS is outside the DRX active time has been mainly described, but the above operation is similarly applicable to a case where the CSI report belongs to the outside of the DRX active time and the CSI-RS belongs to the DRX active time. Also, the description related to the CSI measurement and the CSI report may be equally applied to the L1-RSRP measurement and the L1-RSRP report. That is, the CSI measurement/report may be replaced with the L1-RSRP measurement/report.

Figure 17:
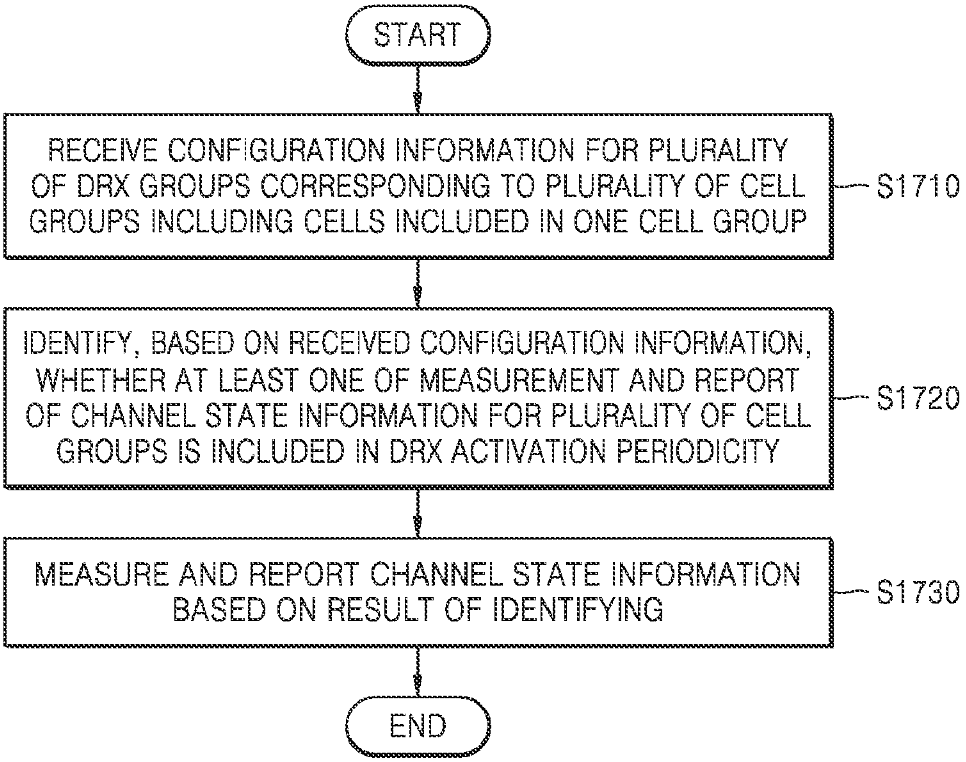
FIG. 17 is a flowchart for describing a method, performed by a user equipment, of providing CSI, according to an embodiment of the present disclosure.

FIG. 17 is a flowchart for describing a method, performed by a UE, of providing CSI, according to an embodiment of the present disclosure.

In operation S1710, the UE may receive configuration information for a plurality of DRX groups corresponding to a plurality of cell groups including cells included in one cell group.

The UE according to an embodiment may obtain, from the configuration information, a plurality of pieces of DRX configuration information that are configurable for the UE. Also, the UE may identify cells to which each of the pieces of DRX configuration information is applied. For example, the UE may obtain a cell index list corresponding to each of the pieces of DRX configuration information. According to another example, the UE may obtain an index of a DRX group corresponding to each of the pieces of DRX configuration information, and may obtain a cell index list corresponding to the index of each DRX group. According to another example, the configuration information may be provided to the UE in a form in which the DRX configuration information or the DRX group index is included in the configuration information for each serving cell of the UE.

In operation S1720, based on the received configuration information, the UE may identify whether at least one of measurement and report of channel state information for a plurality of cell groups is included in the DRX activation periodicity.

The UE according to an embodiment may identify, based on the received configuration information, a first DRX group corresponding to a cell group in which the measurement of the channel state information is performed and a second DRX group corresponding to a cell group in which the report of the channel state information is performed, among a plurality of cell groups. Also, the UE may identify the DRX activation periodicity of each of the first DRX group and the second DRX group. The UE may identify whether the measurement of the channel state information and the report of the channel state information are included in each identified DRX activation periodicity.

In operation S1730, the UE may measure and report the channel state information based on a result of the identifying.

The UE according to an embodiment may measure the channel state information based on the reference signal transmitted in the most recent DRX activation periodicity of the second DRX group. According to another embodiment, the UE may measure the channel state information based on the reference signal transmitted in the most recent DRX activation periodicity of the first DRX group and the most recent DRX activation periodicity of the second DRX group. That is, when the reference signal transmitted in the interval in which the most recent DRX activation periodicities of different groups overlap each other, the UE may measure and report the channel state information based on the reference signal.

According to another embodiment, when the most recent reference signal associated with the report of the channel state information is transmitted in the DRX activation periodicity of the second DRX group, the UE may measure the channel state information based on the reference signal. According to another embodiment, when the most recent reference signal is transmitted in the DRX activation periodicity of the first DRX group and the DRX activation periodicity of the second DRX group, the UE may measure the channel state information based on the reference signal. That is, when the most recent reference signal transmitted in the interval in which DRX activation periodicities of different groups overlap each other is present, the UE may measure and report the channel state information based on the reference signal.

According to another embodiment, as the report of the channel state information is included in the DRX activation periodicity of the DRX group corresponding to the cell group in which the report of the channel state information is performed, the UE may measure the channel state information based on the reference signal associated with the report of the channel state information. According to another embodiment, when a plurality of cell groups are configured, the UE may determine, as the same cell group, the cell group in which the measurement of the channel state information is performed and the cell group in which the report of the channel state information is performed, and may measure and report the channel state information.

On the other hand, the embodiments described above may be performed by taking into account the information about whether to apply the power saving signal to a plurality of DRX groups. A method of taking this into account may correspond to that described above in the fourth embodiment described above.

Figure 18:
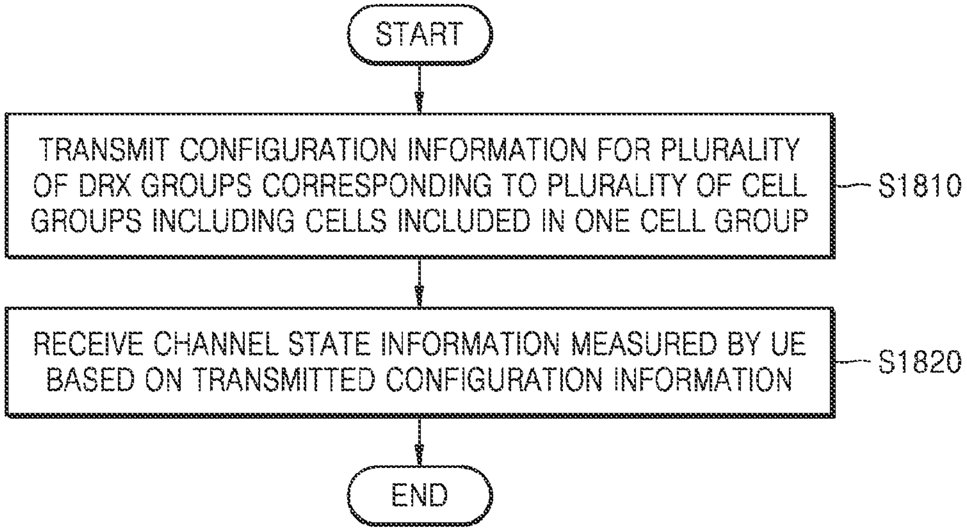
FIG. 18 is a flowchart for describing a method, performed by a base station, of providing CSI, according to an embodiment of the present disclosure.

FIG. 18 is a flowchart for describing a method, performed by a base station, of providing CSI, according to an embodiment of the present disclosure.

In operation S1810, the base station may transmit configuration information for a plurality of DRX groups corresponding to a plurality of cell groups including cells included in one cell group.

In operation S1820, the base station may receive channel state information measured by a UE based on the transmitted configuration information. According to an embodiment, whether at least one of measurement and report of channel state information for a plurality of cell groups is included in a DRX activation periodicity may be identified based on the configuration information, and the UE may measure and report the channel state information based on a result of the identifying. A method of measuring and reporting the channel state information based on the result of the identifying in the UE may correspond to that described above with reference to FIGS. 14 to 17.

Figure 19:
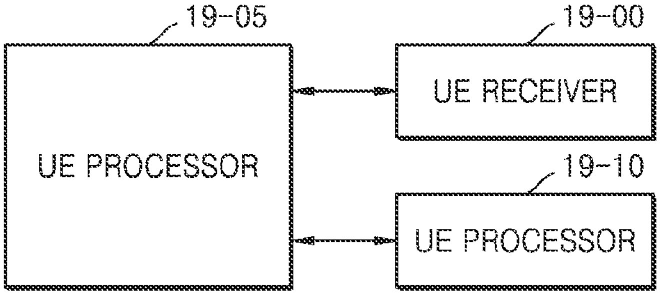
FIG. 19 is a diagram illustrating a structure of a user equipment in a wireless communication system, according to an embodiment of the present disclosure.

FIG. 19 is a diagram illustrating a structure of a UE in a wireless communication system, according to an embodiment of the present disclosure.

Referring to FIG. 19, the UE may include a transceiver 19-00, a memory 19-05, and a processor 19-10. The transceiver 19-00 and the processor 19-10 of the UE may operate according to the communication method of the UE described above. However, the elements of the UE are not limited to the example described above. For example, the UE may include more or fewer elements than the elements described above. In addition, the transceiver 19-00, the memory 19-05, and the processor 19-10 may be implemented in the form of a single chip.

The transceiver 19-00 may transmit and receive signals to and from a base station. The signals may include control information and data. To this end, the transceiver 19-00 may include an RF transmitter that up-converts and amplifies a frequency of a signal to be transmitted, and an RF receiver that low-noise amplifies a received signal and down-converts a frequency of the received signal. However, this is only an embodiment of the transceiver 19-00, and the elements of the transceiver 19-00 are not limited to the RF transmitter and the RF receiver.

Also, the transceiver 19-00 may receive a signal through a radio channel, may output the received signal to the processor 19-10, and may transmit an output signal of the processor 19-10 through the radio channel.

The memory 19-05 may store programs and data necessary for the operation of the UE. Also, the memory 19-05 may store control information or data included in signals transmitted and received by the UE. The memory 19-05 may include a storage medium, such as read-only memory (ROM), random access memory (RAM), hard disk, compact disc-ROM (CD-ROM), and digital versatile disc (DVD), or any combination thereof. Also, a plurality of memories 19-05 may be provided.

Also, the processor 19-10 may control a series of processes so that the UE is able to operate according to the embodiments described above. For example, the processor 19-10 may receive DCI including two layers and control the elements of the UE to simultaneously receive a plurality of PDSCHs. A plurality of processors 19-10 may be provided.

The processor 19-10 may execute a program stored in the memory 19-05 to perform an element control operation of the UE.

Figure 20:
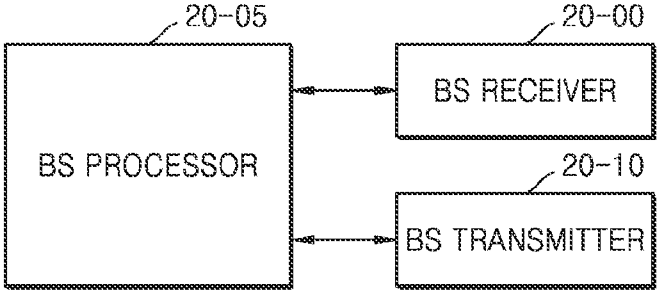
FIG. 20 is a diagram illustrating a structure of a base station in a wireless communication system, according to an embodiment of the present disclosure.

FIG. 20 is a diagram illustrating a structure of a base station in a wireless communication system, according to an embodiment of the present disclosure.

Referring to FIG. 20, the base station may include a transceiver 20-00, a memory 20-05, and a processor 20-10. The transceiver 20-00 and the processor 20-10 of the base station may operate according to the communication method of the base station described above. However, the elements of the base station are not limited to the above-described example. For example, the base station may include more or fewer elements than the above-described elements. In addition, the transceiver 20-00, the memory 20-05, and the processor 20-10 may be implemented in the form of a single chip.

The transceiver 20-00 may transmit and receive signals to and from a UE. The signals may include control information and data. To this end, the transceiver 20-00 may include an RF transmitter that up-converts and amplifies a frequency of a signal to be transmitted, and an RF receiver that low-noise amplifies a received signal and down-converts a frequency of the received signal. However, this is only an embodiment of the transceiver 20-00, and the elements of the transceiver 20-00 are not limited to the RF transmitter and the RF receiver.

Also, the transceiver 20-00 may receive a signal through a radio channel, may output the received signal to the processor 20-10, and may transmit an output signal of the processor 20-10 through the radio channel.

The memory 20-05 may store programs and data necessary for the operation of the base station. Also, the memory 20-05 may store control information or data included in the signal transmitted and received by the base station. The memory 20-05 may include a storage medium, such as ROM, RAM, hard disk, CD-ROM, and DVD, or any combination thereof. Also, a plurality of memories 20-05 may be provided.

The processor 20-10 may control a series of processes so that the base station is able to operate according to the above-described embodiments of the present disclosure. For example, the processor 20-10 may configure DCI of two layers including allocation information for a plurality PDSCHs and may control each element of the base station in order to transmit the DCI. A plurality of processors 20-10 may be provided. The processor 20-10 may execute a program stored in the memory 20-05 to perform an element control operation of the base station.

The methods according to the embodiments of the present disclosure, which are described in the claims or the detailed description, may be implemented as hardware, software, or a combination of hardware and software.

When implemented as software, a computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the present disclosure, which are described in the claims or the specification of the present disclosure.

One or more programs (software modules, software, etc.) may be stored in RAM, non-volatile memory including flash memory, ROM, electrically erasable programmable read-only memory (EEPROM), magnetic disc storage devices, CD-ROM, DVDs, other types of optical storage devices, or magnetic cassette. Alternatively, one or more programs may be stored in a memory provided by a combination of all or part of these devices. In addition, each memory may include a plurality of configured memories.

Also, the programs may be stored in an attachable storage device that is accessible through a communication network such as Internet, Intranet, local area network (LAN), wide LAN (WLAN), or storage area network (SAN), or communication network provided by a combination thereof. These storage devices may be connected through an external port to a device that performs the embodiments of the present disclosure. Moreover, a separate storage device on the communication network may access the device that performs the embodiment of the present disclosure.

In specific embodiments of the present disclosure, the elements included in the present disclosure have been expressed in the singular or plural form according to the suggested specific embodiments of the present disclosure. However, the expression in the singular or plural form is appropriately selected according to the suggested situations for convenience of explanation and is not intended to limit the present disclosure to the single or plural elements. Even when a certain element is expressed in the plural form, it may be provided with a single element, and even when a certain element is expressed in the singular form, it may be provided with a plurality of elements.

On the other hand, the embodiments of the present disclosure, which are described in this specification and drawings, are merely presented as specific examples so as disclosure easily explain the technical idea of the present disclosure and help the understanding of the present disclosure and are not intended disclosure limit the scope of the present disclosure. That is, it will be obvious to those of ordinary skill in the art that other modifications based on the technical idea of the present disclosure may be made. In addition, the respective embodiments may be operated in combination with each other as necessary. For example, parts of one embodiment and another embodiment of the present disclosure may be combined with each other so that the base station and the UE may operate. For example, parts of the first embodiment and the second embodiment of the present disclosure may be combined with each other so that the base station and the UE may operate. Also, although the embodiments described above have been presented based on the FDD LTE systems, other modifications based on the technical idea of the embodiments may be implemented in other systems, such as TDD LTE systems and 5G or NR systems.

The invention claimed is:

1. A method, performed by a user equipment (UE), in a wireless communication system, the method comprising:

receiving configuration information regarding a plurality of discontinuous reception (DRX) groups including a first DRX group of a first cell for a channel state information (CSI) measurement and a second DRX group of a second cell for a CSI report, wherein the first cell and the second cell are included in one cell group and a first DRX active time for the first DRX group and a second DRX active time for the second DRX group are set based on the configuration information;

identifying a latest second DRX active time of the second DRX group of the second cell for the CSI report, based on the configuration information;

identifying a most recent CSI measurement performed on the first cell during the latest second DRX active time of the second DRX group of the second cell for the CSI report;

identifying whether a time for a CSI report associated with the most recent CSI measurement belongs to the latest second DRX active time of the second DRX group; and in case that the time for the CSI report associated with the most recent CSI measurement belongs to the latest second DRX active time of the second DRX group, performing the CSI report associated with the most recent CSI measurement on the second cell, wherein in case that the time for the CSI report associated with the most recent CSI measurement does not belong to the latest second DRX active time of the second DRX group, the CSI report associated with the most recent CSI measurement is dropped.

2. The method of claim 1, wherein performing the CSI report comprises:

in case that the time for the CSI report associated with the most recent CSI measurement belongs to the latest second DRX active time and does not belong to the first DRX active time, performing the CSI report associated with the most recent CSI measurement on the second cell, wherein in case that the time for the CSI report associated with the most resent CSI measurement does not belong to the latest second DRX active time and belongs to the first DRX active time, the CSI report associated with the most recent CSI measurement is dropped.

3. The method of claim 1, wherein the configuration information includes an onDuration timer value and an Inactivity timer value for the first DRX group and an onDuration timer value and an Inactivity timer value for the second DRX group.

4. A method, performed by a base station, in a wireless communication system, the method comprising:

transmitting configuration information regarding a plurality of discontinuous reception (DRX) groups including a first DRX group of a first cell for a channel state information (CSI) measurement and a second DRX group of a second cell for a CSI report, wherein the first cell and the second cell are included in one cell group and a first DRX active time for the first DRX group and a second DRX active time for the second DRX group are set based on the configuration information; and in case that a most recent CSI measurement is performed on the first cell during a latest second DRX active time of the second DRX group of the second cell for the CSI report and a time for a CSI report associated with the most recent CSI measurement belongs to the latest second DRX active time of the second DRX group, receiving, from a user equipment (UE), the CSI report associated with the most recent CSI measurement on the second cell, wherein in case that the most recent CSI measurement is performed on the first cell during the latest second DRX active time of the second DRX group of the second cell for the CSI report and the time for the CSI report associated with the most recent CSI measurement does not belong to the latest second DRX active time of the second DRX group, the CSI report associated with the most recent CSI measurement is dropped.

5. A user equipment (UE) in a wireless communication system, the UE comprising:

a transceiver; and at least one processor coupled with the transceiver and configured to:

receive configuration information regarding a plurality of discontinuous reception (DRX) groups including a first DRX group of a first cell for a channel state information (CSI) measurement and a second DRX group of a second cell for a CSI report, wherein the first cell and the second cell are included in one cell group and a first DRX active time for the first DRX group and a second DRX active time for the second DRX group are set based on the configuration information, identify a latest second DRX active time of the second DRX group of the second cell for the CSI report, based on the configuration information, identify a most recent CSI measurement performed on the first cell during the latest second DRX active time of the second DRX group of the second cell for the CSI report, identifying whether a time for a CSI report associated with the most recent CSI measurement belongs to the latest second DRX active time of the second DRX group, and in case that the time for the CSI report associated with the most recent CSI measurement belongs to the latest second DRX active time of the second DRX group, perform the CSI report associated with the most recent CSI measurement on the second cell, wherein in case that the time for the CSI report associated with the most recent CSI measurement does not belong to the latest second DRX active time of the second DRX group, the CSI report associated with the most recent CSI measurement is dropped.

6. The user equipment of claim 5, wherein the at least one processor is further configured to:

in case that the time for the CSI report associated with the most recent CSI measurement belongs to the latest second DRX active time and does not belong to the first DRX active time, perform the CSI report associated with the most recent CSI measurement on the second cell, wherein in case that the time for the CSI report associated with the most recent CSI measurement does not belong to the latest second DRX active time and belongs to the first DRX active time, the CSI report associated with the most recent CSI measurement is dropped.

7. The user equipment of claim 5, wherein the configuration information includes an onDuration timer value and an Inactivity timer value for the first DRX group and an onDuration timer value and an Inactivity timer value for the second DRX group.

8. The UE of claim 5, wherein the at least one processor is further configured to:

receive downlink control information (DCI) including a power saving (PS)-index that indicates not to wake up the UE, wherein in case that a higher layer parameter indicating not to apply the PS-index during the CSI report is configured at the UE, the CSI report is performed after receiving the PS-index.

9. A base station for providing channel state information in a wireless communication system, the base station comprising:

a transceiver; and at least one processor coupled with the transceiver and configured to:

transmit configuration information regarding a plurality of discontinuous reception (DRX) groups including a first DRX group of a first cell for a channel state information (CSI) measurement and a second DRX group of a second cell for a CSI report, wherein the first cell and the second cell are included in one cell group and a first DRX active time for the first DRX group and a second DRX active time for the second DRX group are set based on the configuration information, and in case that a most recent CSI measurement is performed on the first cell during a latest second DRX active time of the second DRX group of the second cell for the CSI report and a time for a CSI report associated with the most recent CSI measurement belongs to the latest second DRX active time of the second DRX group, receive, from a user equipment (UE), the CSI report associated with the most recent CSI measurement on the second cell, wherein in case that the most recent CSI measurement is performed on the first cell during the latest second DRX active time of the second DRX group of the second cell for the CSI report and the time for the CSI report does not belong to the latest second DRX active time of the second DRX group, the CSI report associated with the most recent CSI measurement is dropped.

10. The method of claim 1, further comprising:

receiving downlink control information (DCI) including a power saving (PS)-index that indicates not to wake up the UE, wherein in case that a higher layer parameter indicating not to apply the PS-index during the CSI report is configured at the UE, the CSI report is performed after receiving the PS-index.

* * * * *